US009291749B2

(12) United States Patent
Miyajima et al.

(10) Patent No.: US 9,291,749 B2
(45) Date of Patent: Mar. 22, 2016

(54) IMAGING OPTICAL SYSTEM AND METHOD FOR MANUFACTURING LENS ARRAY

(71) Applicant: CANON KABUSHIKI KAISHA, Tokyo (JP)

(72) Inventors: Yu Miyajima, Utsunomiya (JP); Takeyoshi Saiga, Tokyo (JP); Masayasu Teramura, Utsunomiya (JP); Osamu Morisaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/435,133

(22) PCT Filed: Oct. 4, 2013

(86) PCT No.: PCT/JP2013/077683
§ 371 (c)(1),
(2) Date: Apr. 10, 2015

(87) PCT Pub. No.: WO2014/058036
PCT Pub. Date: Apr. 17, 2014

(65) Prior Publication Data
US 2015/0268386 A1    Sep. 24, 2015

(30) Foreign Application Priority Data

Oct. 12, 2012    (JP) ................................ 2012-226900

(51) Int. Cl.
*H04N 1/04*      (2006.01)
*G02B 3/00*      (2006.01)
(Continued)

(52) U.S. Cl.
CPC ............ *G02B 3/0062* (2013.01); *G02B 3/0031* (2013.01); *G02B 3/0056* (2013.01);
(Continued)

(58) Field of Classification Search
CPC .. G02B 3/0031; G02B 3/0056; G02B 3/0062; G03G 15/04; H04N 1/0312; H04N 1/192; H04N 2201/0081; H04N 2201/0082; H04N 2201/02487
USPC ........................... 358/474; 359/738; 399/218
See application file for complete search history.

(56) References Cited

U.S. PATENT DOCUMENTS

| 4,960,326 A | 10/1990 | Dauvergne |
| 2008/0080057 A1 | 4/2008 | Yamamura |

(Continued)

FOREIGN PATENT DOCUMENTS

| CN | 101153920 A | 4/2008 |
| EP | 2386883 A1 | 11/2011 |

(Continued)

*Primary Examiner* — Negussie Worku
(74) *Attorney, Agent, or Firm* — Canon USA Inc. IP Division

(57) ABSTRACT

An imaging optical system includes a plurality of lens optical system rows each including a plurality of lens optical systems arranged in a first direction. The plurality of lens optical system rows is arranged in a second direction perpendicular to the first direction and to an optical axis direction. Each of the plurality of lens optical systems in each of the plurality of lens optical system rows is configured to form an erect equal-magnification image in a cross section perpendicular to the second direction and configured to form an inverted image in across section perpendicular to the first direction. Ina cross section perpendicular to the optical axis direction, optical axes of the respective plurality of lens optical systems in adjoining ones of the plurality of lens optical system rows are separate from one another in the first direction and are located on the a line.

24 Claims, 52 Drawing Sheets

(51) Int. Cl.
  *H04N 1/031*     (2006.01)
  *G03G 15/04*    (2006.01)
  *H04N 1/192*    (2006.01)

(52) U.S. Cl.
  CPC ............ *G03G 15/04* (2013.01); *H04N 1/0312* (2013.01); *H04N 1/192* (2013.01); *H04N 2201/0081* (2013.01); *H04N 2201/0082* (2013.01); *H04N 2201/02487* (2013.01)

(56) References Cited

U.S. PATENT DOCUMENTS

| | | | |
|---|---|---|---|
| 2009/0041504 A1* | 2/2009 | Yamaguchi et al. | 399/220 |
| 2009/0091734 A1* | 4/2009 | Visser et al. | 355/67 |
| 2011/0280628 A1 | 11/2011 | Kim | |
| 2012/0120462 A1* | 5/2012 | Nagata | 358/475 |
| 2012/0274993 A1* | 11/2012 | Yamamura | 358/474 |
| 2012/0300308 A1* | 11/2012 | Yamamura | 359/619 |
| 2013/0265619 A1* | 10/2013 | Kobayashi | 358/475 |
| 2014/0036377 A1* | 2/2014 | Kurtz et al. | 359/708 |
| 2014/0092459 A1* | 4/2014 | Mizuta | 359/201.2 |
| 2014/0160573 A1* | 6/2014 | Teramura et al. | 359/619 |
| 2014/0240559 A1* | 8/2014 | Ueno et al. | 348/294 |

FOREIGN PATENT DOCUMENTS

| | | |
|---|---|---|
| JP | S58-030726 A | 2/1983 |
| JP | 61-093149 A | 5/1986 |
| JP | S63-274915 A | 11/1988 |
| JP | H01-019127 B2 | 4/1989 |
| JP | H11-233708 A | 8/1990 |
| JP | H07-027996 A | 1/1995 |
| JP | 2003-337300 A | 11/2003 |
| JP | 2008-092006 A | 4/2008 |
| JP | 2012-247565 A | 12/2012 |
| JP | 2013-024961 A | 2/2013 |

* cited by examiner

IMAGING OPTICAL SYSTEM AND METHOD FOR MANUFACTURING LENS ARRAY

TECHNICAL FIELD

The present invention relates to an imaging optical system, and is suitable for an imaging optical system for use in an image forming apparatus or an image reading apparatus, for example.

BACKGROUND ART

Image forming apparatuses and image reading apparatuses using a lens array optical system (imaging optical system) including a small-diameter lens array have been developed recently. For example, image forming apparatuses and image reading apparatuses that include a built-in unit in which a lens array optical system is held in a housing with an array light source (light-emitting diode (LED)) or a line sensor have been known. The use of the lens array optical system can reduce the size and cost of such apparatuses.

A lens array optical system has the problems that an imaging light amount and imaging performance on an image plane (referring to a sensor surface in the case of an image reading apparatus, and a photosensitive surface in the case of an image forming apparatus) tend to drop, and that variations occur in the imaging light amount and the imaging performance. Techniques for solving such problems are discussed in Japanese Patent Application Laid-Open No. 63-274915 and U.S. Patent Application Publication No. 2008/0080057.

Japanese Patent Application Laid-Open No. 63-274915 discusses a lens array optical system in which a plurality of lens optical systems is arranged in one direction (main array direction). The lens array optical system is configured so that the plurality of lens optical systems is arranged in a single row when seen in a direction (sub array direction) perpendicular to the main array direction and to an optical axis direction. Light fluxes incident on the respective plurality of lens optical systems form erect equal-magnification images in a cross section perpendicular to the sub array direction, and inverted equal-magnification images in a cross section perpendicular to the main array direction. According to such a configuration, lens power needed in the sub array direction is lower than with an optical system where erect equal-magnification images are formed in the cross section perpendicular to the main array direction. Favorable imaging performance can thus be obtained even with smaller F values, which can ensure compatibility between the imaging light amount and the imaging performance.

U.S. Patent Application Publication No. 2008/0080057 discusses a lens array optical system in which two lens optical system rows each including lens optical systems arranged in a main array direction are arranged in a sub array direction. The lens optical systems are arranged in a staggered arrangement. More specifically, the optical axes of the respective lens optical systems of the lens optical system rows are separate from one another in the main array direction. According to such a configuration, the number of lens optical systems for a light flux from each light emitting point of an array light source to pass through can be increased to average the imaging light flux at each light emitting point position. As a result, variations in the imaging light amount and the imaging performance can be reduced.

The lens array optical system discussed in Japanese Patent Application Laid-Open No. 63-274915 includes a single row of lens optical systems in the sub array direction. Such a configuration is disadvantageous in terms of reducing variations in the imaging light amount and the imaging performance. The lens array optical system discussed in U.S. Patent Application Publication No. 2008/0080057 is not applicable to a system where inverted images of an object are formed in the cross section perpendicular to the main array direction. Such a configuration is disadvantageous in terms of ensuring comparability between the imaging light amount and the imaging performance.

Suppose that lens optical systems are arranged in two rows in the sub array direction (Z direction) as discussed in U.S. Patent Application Publication No. 2008/0080057. FIG. 36 illustrates cross-sectional views of such configurations perpendicular to the main array direction (ZX cross-sectional views). Each lens optical system includes two lenses juxtaposed in the direction of an optical axis which is illustrated by a dashed-dotted line (X direction). The lenses are represented by ideal lenses (arrows in the diagram). As can be seen from FIG. 36, in the system that forms erect equal-magnification images of an object, the upper and lower lens optical systems form the images in the same position. On the other hand, in the system that forms inverted images of an object, the lens optical systems form the images in separate positions in the sub array direction. The imaging positions do not coincide with each other.

That is, simply combining the techniques discussed in Japanese Patent Application Laid-Open No. 63-274915 and U.S. Patent Application Publication No. 2008/0080057 cannot provide a solution to both the problems that the imaging light amount and the imaging performance tend to drop and that variations occur in the imaging light amount and the imaging performance.

SUMMARY OF INVENTION

The present invention is directed to an imaging optical system that can ensure compatibility between the imaging light amount and the imaging performance, and can reduce variations in the imaging light amount and the imaging performance.

According to an aspect of the present invention, an imaging optical system includes a plurality of lens optical system rows each including a plurality of lens optical systems arranged in a first direction, wherein the plurality of lens optical system rows is arranged in a second direction perpendicular to the first direction and to an optical axis direction, wherein each of the plurality of lens optical systems in each of the plurality of lens optical system rows is configured to form an erect equal-magnification image in a cross section perpendicular to the second direction and configured to form an inverted image in a cross section perpendicular to the first direction, and wherein, in a cross section perpendicular to the optical axis direction, optical axes of the respective plurality of lens optical systems in adjoining ones of the plurality of lens optical system rows are separate from one another in the first direction and are located on a same line.

Further features of the present invention will become apparent from the following description of exemplary embodiments with reference to the attached drawings.

DESCRIPTION OF EMBODIMENTS

Various exemplary embodiments, features, and aspects of the invention will be described in detail below with reference to the drawings.

Figure 1A:
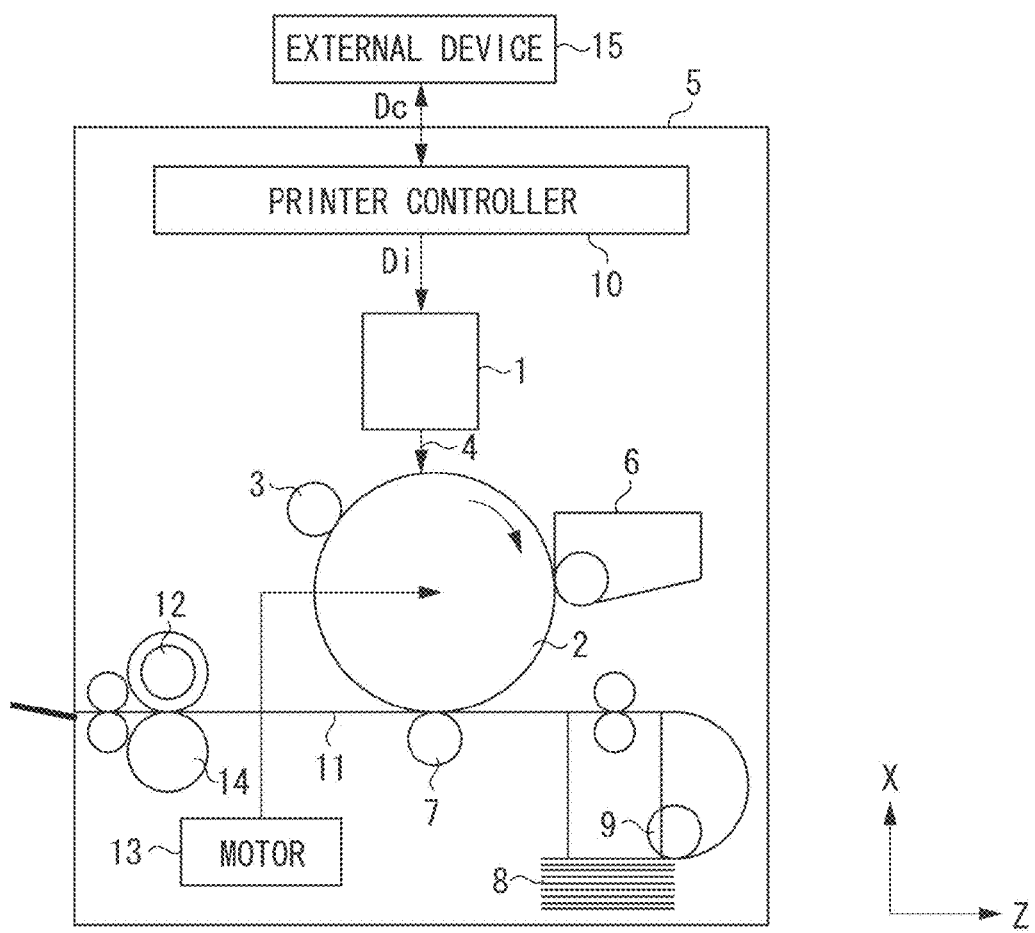
FIG. 1A is a schematic diagram illustrating an image forming apparatus according to an exemplary embodiment.
Figure 1B:
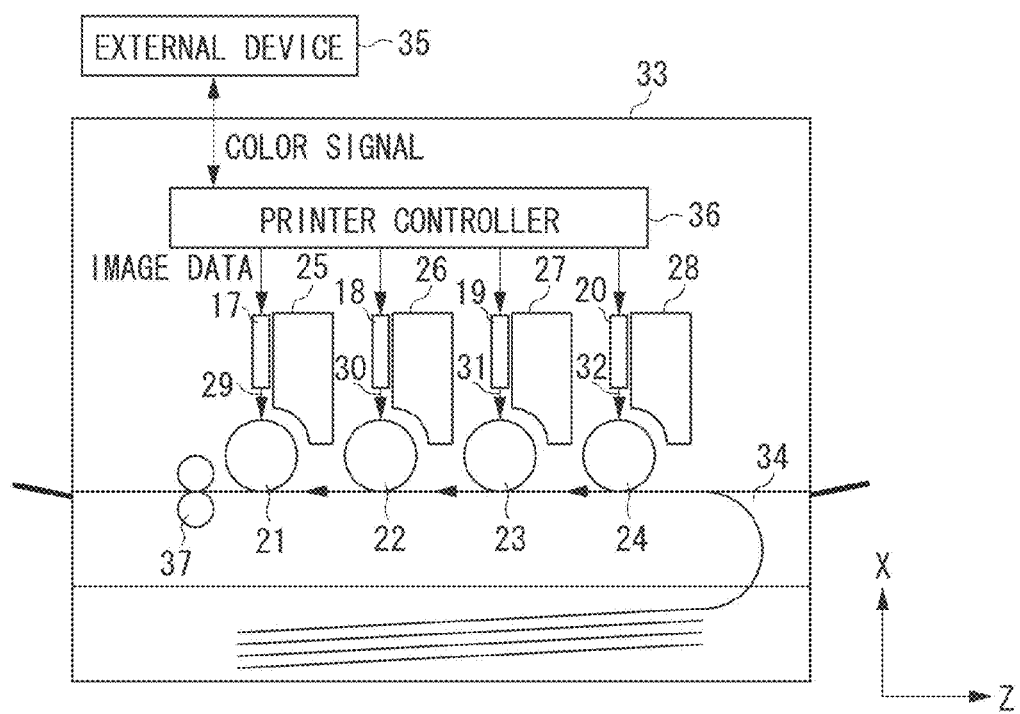
FIG. 1B is a schematic diagram illustrating a color image forming apparatus according to the present exemplary embodiment.

FIGS. 1A and 1B are schematic diagrams illustrating an image forming apparatus and a color image forming apparatus according to the present exemplary embodiment, respectively (details will be given below). In the present exemplary embodiment, an exposure unit 1 of the image forming apparatus and exposure units 17 to 20 of the color image forming apparatus include an imaging optical system (lens array optical system). The use of the imaging optical system according to the present exemplary embodiment can make the exposure units 1 and 17 to 20 compact and reduce the size of the entire image forming apparatuses.

Figure 2:
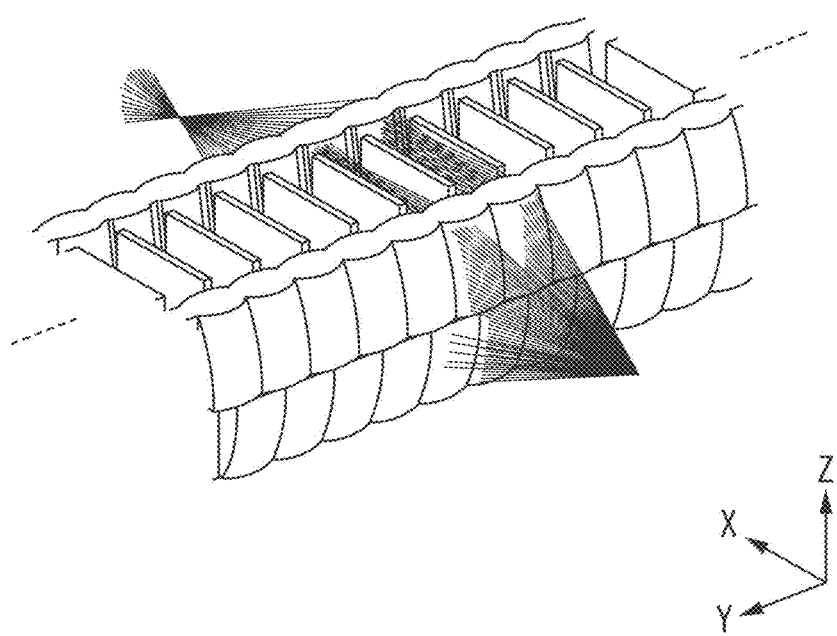
FIG. 2 is a schematic diagram illustrating an imaging optical system according to the present exemplary embodiment.

As illustrated in FIG. 2, the imaging optical system according to the present exemplary embodiment includes a plurality of lens optical system rows each including a plurality of lens optical systems arranged in a main array direction (Y direction), which is a first direction. Specifically, the plurality of lens optical system rows is arranged in a sub array direction (Z direction), which is a second direction. In a cross section (YZ cross section) perpendicular to an optical axis direction (X direction), rows of optical axes (optical axis rows) of the plurality of lens optical systems included in the lens optical system rows are all located on the same line. In other words, the positions of optical axis rows of the respective lens optical system rows are made equal in the sub array direction. More specifically, the imaging positions, on an image plane, of object points whose positions are equal in the sub array direction on an object plane are made equal in the sub array direction between the lens optical system rows. (Object points that are located at the same position on the object plane in the sub array direction are imaged on the same position in the sub array direction by the lens optical system rows.) Such a configuration provides a shifted arrangement (staggered arrangement) of systems that form an inverted image of an object in a cross section (ZX cross section) perpendicular to the main array direction. Hereinafter, a system that forms an erect equal-magnification image will be referred to as an erect equal-magnification imaging system. A system that forms an inverted image of an object will be referred to as an inverted imaging system.

As employed in the present exemplary embodiment, the "shifted arrangement (staggered arrangement)" refers to a configuration such that the optical axes of the respective plurality of lens optical systems in adjoining ones of the plurality of lens optical system rows are separate from one another in the main array direction. In the present exemplary embodiment, that the lens optical system rows are arranged to adjoin in the sub array direction is expressed as "the plurality of lens optical system rows are arranged in the sub array direction." Such an expression covers the configuration of the shifted arrangement where the lens optical system rows are arranged as shifted from one another in the main array direction. As employed in the present exemplary embodiment, "lens optical system rows adjoining in the sub array direction" refers to ones lying closest in the sub array direction. For example, suppose that lens optical system rows are arranged with an intermediate member therebetween so that the lens optical system rows are, in a strict sense, not in close contact with each other. Even in such a case, the lens optical system rows are referred to as "adjoining lens optical system rows."

The imaging optical system according to the present exemplary embodiment can provide a shifted arrangement of inverted imaging systems. This can ensure compatibility between an imaging light amount and imaging performance and reduce variations in the imaging light amount and the imaging performance.

The imaging optical system according to the present exemplary embodiment will be described in detail below in conjunction with specific exemplary embodiments.

Figure 3A:
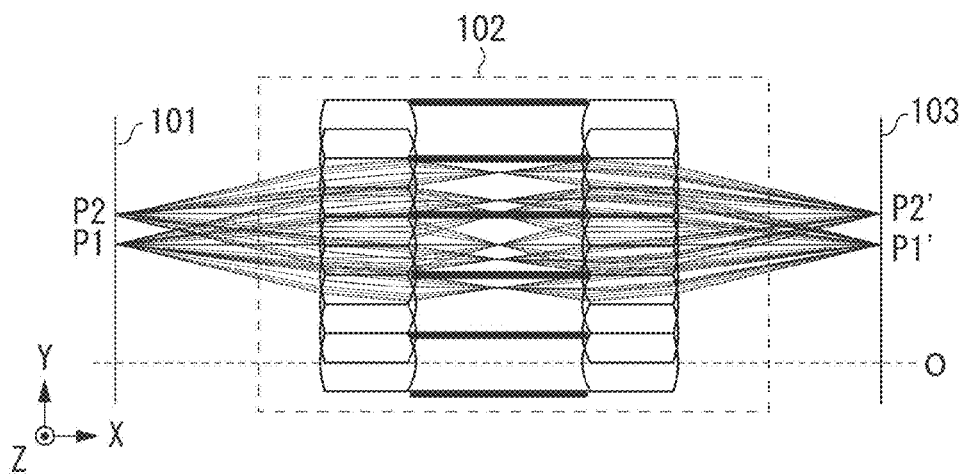
FIGS. 3A, 3B, and 3C are schematic diagrams illustrating essential components of an imaging optical system according to a first exemplary embodiment.
Figure 3B:
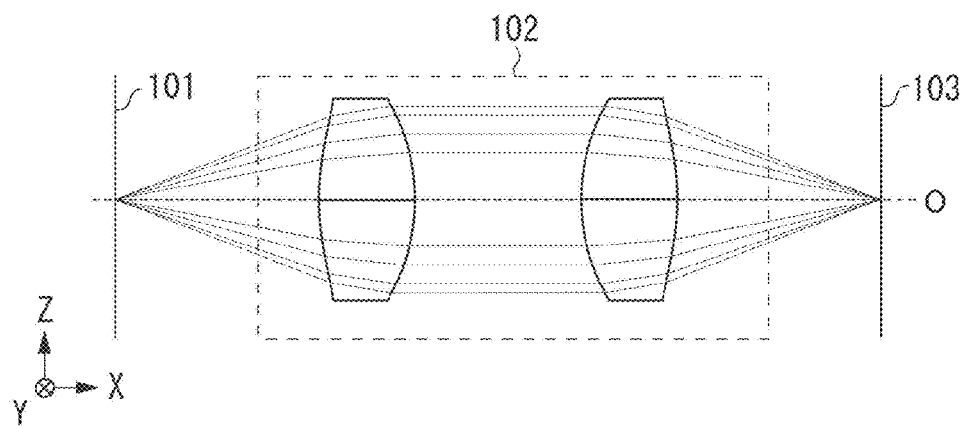
Figure 3C:
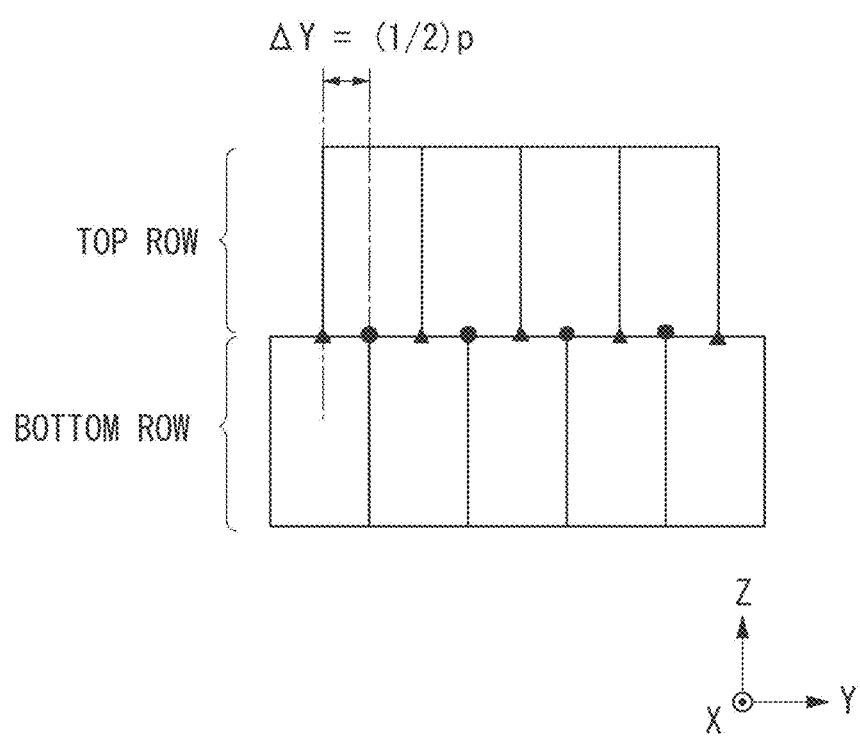

FIGS. 3A, 3B, and 3C are schematic diagrams illustrating essential components of an imaging optical system 102 according to a first exemplary embodiment. FIG. 3A illustrates an XY cross section, FIG. 3B a ZX cross section, and FIG. 3C a YZ cross section. Hereinafter, the XY cross section (cross section perpendicular to the sub array direction) will be referred to as a main array cross section. The ZX cross section (cross section perpendicular to the main array direction) will be referred to as a sub array cross section. The present exemplary embodiment is described on the assumption that the imaging optical system 102 is arranged in the exposure unit 1 of the image forming apparatus.

The imaging optical system 102 according to the present exemplary embodiment includes two lens optical system rows arranged in the sub array direction (Z direction). The lens optical system rows each include a plurality of lens optical systems arranged in the main array direction (Y direction). As illustrated in FIG. 3A, light fluxes emitted from a light emitting point of a light source 101 are passed through lens optical systems and collected to a point on a photosensitive unit 103. For example, light fluxes from a light emitting point P1 of the light source 101 are collected to point P1'. Light fluxes from a light emitting point P2 are collected to point P2'. Such a configuration enables exposure corresponding to the light emitting state of the light source 101. In FIGS. 3A and 3B, the optical axis O of a lens optical system is illustrated by a broken line.

The light source 101 includes a plurality of light emitting points arranged at regular distances in the main array direction. The distance between adjoining light emitting points is several tens of micrometers. The distance between adjoining light emitting points is sufficiently smaller than a distance between adjoining lens optical systems (several hundreds of micrometers or more). Hereinafter, the light emitting points will thus be regarded as lying generally continuously. The light source 101 may include a staggered arrangement of a plurality of light emitting points, which are formed by arranging in the sub array direction a plurality of rows of a plurality of light emitting points arranged at regular distances in the main array direction. Such a configuration allows sufficient distances between the light emitting points adjoining in the main array direction. Examples of the light source 101 may include an LED array.

The light emitting points of the light source 101 are each imaged as an erect equal-magnification image in the main array cross section (XY cross section) illustrated in FIG. 3A, and as an inverted image in the sub array cross section (ZX cross section) illustrated in FIG. 3B. As illustrated in FIG. 3C, the two lens optical system rows arranged in the sub array direction will be referred to as a top row (first lens optical system row) and a bottom row (second lens optical system row), respectively. The optical axes of the respective lens optical systems constituting the top row are represented by filled circles (●). The optical axes of the respective lens optical systems constituting the bottom row are represented by filled triangles (▲). The lens optical systems of both the top and bottom rows have an array pitch p of 0.76 mm in the main array direction.

As illustrated in FIG. 3C, the optical axes of the top row and the optical axes of the bottom row are located on the same line (optical axis row). Assuming that the optical axis row is Z=0, lens surfaces of the bottom row lie in the range of Z=−1.22 mm to 0 mm. Lens surfaces of the top row lie in the range of Z=0 mm to 1.22 mm. The top and bottom rows are shifted from each other in the main array direction by $\Delta Y$, whereby the optical axes of the top and bottom rows are separate from one another in the main array direction to constitute a staggered arrangement. A minimum distance between the optical axes of the top and bottom rows will be denoted by $\Delta Y$. With reference to the optical axis of a lens optical system of the bottom row, $\Delta Y$ refers to the minimum distance to the optical axis of a lens optical system of the top row closest to the optical axis in the main array direction. In the present exemplary embodiment, the minimum distance $\Delta Y$ is half the array pitch p of the lens optical systems in the main array direction. $\Delta Y=(\frac{1}{2})p$ (=0.38 mm).

Table 1 shows array design values of the imaging optical system 102.

TABLE 1

| | Top row | Bottom row |
| --- | --- | --- |
| Range of Z (mm) | 1.22 to 0 | 0 to −1.22 |
| Array pitch p (mm) | 0.76 | 0.76 |
| $\Delta Y$ (top - bottom) (mm) | 0.38 | |

The lens optical systems each include a first lens G1 and a second lens G2. Entrance surfaces R1 and exit surfaces R2 of the first and second lenses G1 and G2 (G1R1 surface, G1R2 surface, G2R1 surface, and G2R2 surface) are formed as anamorphic aspheric surfaces. Suppose that the intersection of each lens surface and the optical axis (X-axis) of that lens optical system is an origin, an axis in the main array direction orthogonal to the optical axis is the Y axis, and an axis in the sub array direction orthogonal to the optical axis is the Z axis. The shape of the anamorphic aspheric surfaces is expressed by the following aspherical equation (1):

$$X = \Sigma_{i,j} C_{i,j} Y^i Z^j \qquad (1)$$

$C_{i,j}$ (i, j=0, 1, 2, . . . ) are aspherical coefficients. At least either one of the lens surfaces of each of the lens optical systems constituting the leans optical system rows is an anamorphic aspheric surface that has non-zero power in the main array direction and the sub array direction. Such a configuration can improve the imaging performance. All the lens surfaces of the lens optical systems can be configured as anamorphic aspheric surfaces.

Table 2 shows optical design values of the lens optical systems.

As shown in Table 2, in the present exemplary embodiment, an intermediate imaging magnification β (to be described in detail below) in the main array cross section of each lens optical system is set to −0.45. β may take any value as long as the lens optical systems serve as erecting equal-magnification optical systems in the main array direction.

Furthermore, it is understood from the coefficient C2,0 (a coefficient corresponding to paraxial refractive power within the main row cross section) listed in Table 2 that both the G1R1 surface (G2R2 surface) and the G1R2 surface (G2R1 surface) have positive refractive power in the vicinity of the optical axis. In addition, as understandable from the comparison of magnitudes of absolute values of the coefficient C2,0, the refractive power of the G1R2 surface (G2R1 surface) is larger than that of the G1R1 surface (G2R2 surface). In other words, the absolute value of the radius of curvature in the vicinity of the optical axis of the G1R2 surface (G2R1 surface) is smaller than that of the G1R1 surface (G2R2 surface). Such a configuration enables a favorable imaging function reduced in spherical aberration and curvature of filed when the intermediate imaging magnification β takes a value within the range of 0 to −1 (−0.45 in the present exemplary embodiment).

TABLE 2

| | | |
|---|---|---|
| Light source wavelength | 780 | nm |
| G1 refractive index (light source wavelength) | 1.4859535 | |
| G2 refractive index (light source wavelength) | 1.4859535 | |
| Distance between object plane and G1R1 | 2.64997 | mm |
| Distance between G1R1 and G1R2 | 1.25122 | mm |
| Distance between G1R2 and G2R1 | 2.16236 | mm |
| Distance between G2R1 and G2R2 | 1.25122 | mm |
| Distance between G2R2 and image plane | 2.64997 | mm |
| Effective diameter on intermediate imaging plane | 0.7 | mm |
| Intermediate imaging magnification in main array cross section | −0.45 | |

| Aspherical coefficient | G1R1 | G1R2 | G2R1 | G2R2 |
|---|---|---|---|---|
| C2, 0 | 0.5027743 | −0.8254911 | 0.8254911 | −0.5027743 |
| C4, 0 | −0.5125937 | 0.2916421 | −0.2916421 | 0.5125937 |
| C6, 0 | −2.47E−01 | −0.5597057 | 0.5597057 | 0.2471568 |
| C8, 0 | 0.08356994 | −0.01894198 | 0.01894198 | −0.08356994 |
| C10, 0 | −6.92E+00 | −0.7824901 | 0.7824901 | 6.918249 |
| C0, 2 | 0.1564267 | −0.1950417 | 0.1950417 | −0.1564267 |
| C2, 2 | −0.1587308 | 0.09481253 | −0.09481253 | 0.1587308 |
| C4, 2 | −0.1505496 | −0.3002326 | 0.3002326 | 0.1505496 |
| C6, 2 | 5.66E+00 | 3.065612 | −3.065612 | −5.659195 |
| C8, 2 | −13.83601 | −6.539772 | 6.539772 | 13.83601 |
| C0, 4 | −0.03678572 | −0.007561912 | 0.007561912 | 0.03678572 |
| C2, 4 | 0.1479884 | 0.03211153 | −0.03211153 | −0.1479884 |
| C4, 4 | −1.037058 | −0.5900471 | 0.5900471 | 1.037058 |
| C6, 4 | −1.894499 | −0.6987603 | 0.6987603 | 1.894499 |
| C0, 6 | 1.27E−02 | 0.001105971 | −0.001105971 | −0.01269685 |
| C2, 6 | −0.07714526 | −0.001013351 | 0.001013351 | 0.07714526 |
| C4, 6 | 9.71E−01 | 0.4132734 | −0.4132734 | −0.9714155 |
| C0, 8 | −0.006105566 | −0.00104791 | 0.00104791 | 0.006105566 |
| C2, 8 | −0.01341726 | −0.0182659 | 0.0182659 | 0.01341726 |
| C0, 10 | 0.001280955 | 9.61807E−05 | −9.61807E−05 | −0.001280955 |

Figure 4A:
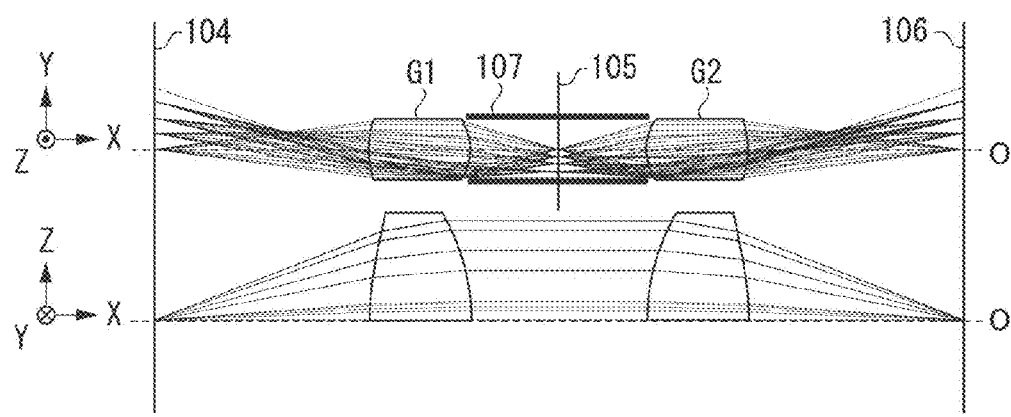
FIGS. 4A and 4B are main array cross-sectional views and sub array cross-sectional views of lens optical systems according to the first exemplary embodiment.
Figure 4B:
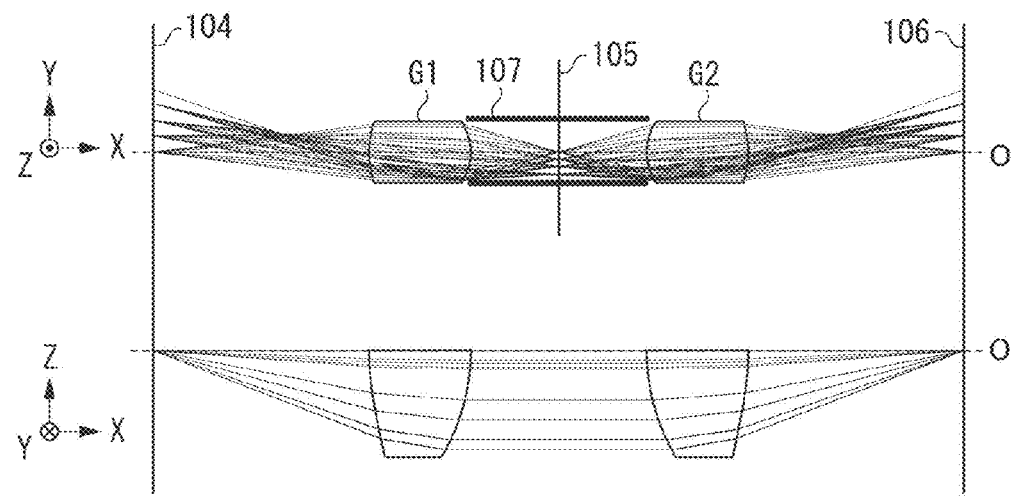

FIGS. 4A and 4B each illustrate a main array cross-sectional view (XY cross-sectional view) and a sub array cross-sectional view (ZX cross-sectional view) of one of the lens optical systems constituting the imaging optical system 102 according to the present exemplary embodiment.

FIG. 4A illustrates a lens optical system of the top row. FIG. 4B illustrates a lens optical system of the bottom row.

A comparison of FIGS. 4A and 4B shows that the lens optical systems constituting the top and bottom rows have the same configuration in the main array cross section, and symmetrical configurations about the optical axis O in the sub array cross section. The lens optical systems constituting the top and bottom rows each include a first optical system (first lens G1) and a second optical system (second lens G2) which are arranged on the same optical axis O. The first optical system refers to an optical system that forms an intermediate image of each light emitting point of a light source 104. A plane where the first optical system forms the intermediate image will be referred to as an intermediate imaging plane 105. The second optical system refers to an optical system that forms an image of the intermediate image formed on the intermediate imaging plane 105 upon an image plane 106. In the present exemplary embodiment, the first optical system includes only the first lens G1. The second optical system includes only the second lens G2.

Light blocking members 107 are arranged between the first and second lenses G1 and G2. The light blocking members 107 function to block light fluxes that are passed through the first lenses G1 of the respective lens optical systems and incident on the second lens optical systems of other lens optical systems (stray light that does not contribute to imaging).

As illustrated in FIG. 2, the aperture of the light blocking member 107 is set larger than the effective diameter of the lens surface of the lens optical system, and a light flux from each light emitting point is restricted by the lens surface of each lens optical system. In other words, the light blocking member 107 is configured not to block a light flux that contributes to imaging but to block only stray light that does not contribute to imaging. With such a configuration, the compatibility between the amount of imaging and the function of imaging can be attained.

If the aperture of the light blocking member 107 is smaller than the effective diameter of the lens surface, the light blocking member 107 might undesirably block a light flux that contributes to imaging. To address this issue, a method of enlarging the effective diameter of the lens surface to secure the amount of imaging may be conceived. However, in a case where the light blocking member 107 is employed to block a light flux, any positioning error occurring in the light blocking members 107 or the lens optical systems may vary the area of the lens surface through which a light flux passes, thus making it difficult to obtain a favorable imaging function.

In the main array cross section, light fluxes emitted from the light source 104 pass through the first lens G1, form an intermediate image on the intermediate imaging plane 105, pass through the second lens G2, and form an erect equal-magnification image on the image plane 106. The paraxial imaging magnification of the first lens G1 on the intermediate imaging plane 105 is referred to as the intermediate imaging magnification $\beta$. In the sub array cross section, the light fluxes emitted from the light source 104 pass through the first lens G1, pass through the second lens G2 without forming an intermediate image, and form an inverted image of the image plane 106. In such a manner, the imaging optical system 102 according to the present exemplary embodiment is configured as an inverted imaging system in the sub array direction.

Such a configuration can increase the light capturing angle while maintaining the imaging performance, whereby the compatibility between the imaging light amount and the imaging performance is ensured.

The top lens optical system row includes a plurality of lens optical systems illustrated in FIG. 4A. The bottom lens optical system row includes a plurality of lens optical systems illustrated in FIG. 4B. A plurality of first lenses G1 arranged in the main array direction will be referred to as a first lens row. A plurality of second lenses G2 arranged in the main array direction will be referred to as a second lens row. By such terms, the imaging optical system 102 can be described to be configured by connecting a first lens array including two first lens rows arranged in the sub array direction, a second lens array including two second lens rows arranged in the sub array direction, and the light blocking members 107.

The present exemplary embodiment includes the first lenses G1 as the first optical systems and the second lenses G2 as the second optical systems, and each lens optical system includes two lenses. However, each lens optical system may include three or more lenses. In other words, at least either one of the first and second optical systems may include two or more lenses. Since the lens optical systems including three or more lenses increase the parts count, the two-lens configuration like the present exemplary embodiment is desirable. Alternatively, the lens optical systems constituting the imaging optical system 102 according to the present exemplary embodiment may each include a single lens, instead of being divided into the first and second optical systems. Even in such a case, the single lens can be configured to serve as an erect equal-magnification imaging system in the main array cross section and an inverted imaging system in the sub array cross section. Such a configuration can be considered the same as the foregoing configuration with two or more lenses.

In the present exemplary embodiment, the lens optical systems constituting the top and bottom rows have a configuration corresponding to respective shapes into which a lens optical system is cut and divided by the main array cross section including the optical axis (surface vertexes). More specifically, suppose that the minimum distance $\Delta Y$ from the optical axis of a lens optical system of the bottom row to the optical axis of a lens optical system of the top row closest to the optical axis in the main array direction is 0 (without a staggered arrangement). In such a case, the lens surfaces of the lens optical systems constituting the adjoining top and bottom rows are configured to have a shape that can be expressed by the same equation. Even if the top and bottom rows are arranged with an intermediate member therebetween, the lens surfaces of the lens optical systems constituting the top and bottom rows may be configured to have a shape that can be expressed by the same equation, which can facilitate formation.

In the present exemplary embodiment, the first optical systems (first lenses G1) and the second optical systems (second lenses G2) of the lens optical systems constituting each of the top and bottom rows are symmetrically configured about the intermediate imaging plane 105. With such a configuration, the same members can be used for both the optical systems. All the lens optical systems constituting the imaging optical system 102 desirably have a lens surface with an aperture of rectangular shape. More specifically, the first and second optical systems of the lens optical systems can be configured to have a rectangular aperture plane with respect to a light flux having an on-axis object height. With such a configuration, the lens surfaces can be arranged as closely as possible for improved light use efficiency. Note that the rectangular shape may include one in which at least one of the sides of the rectangle is configured as a curve, and a generally circular shape and a generally elliptical shape without vertexes.

Figure 5A:
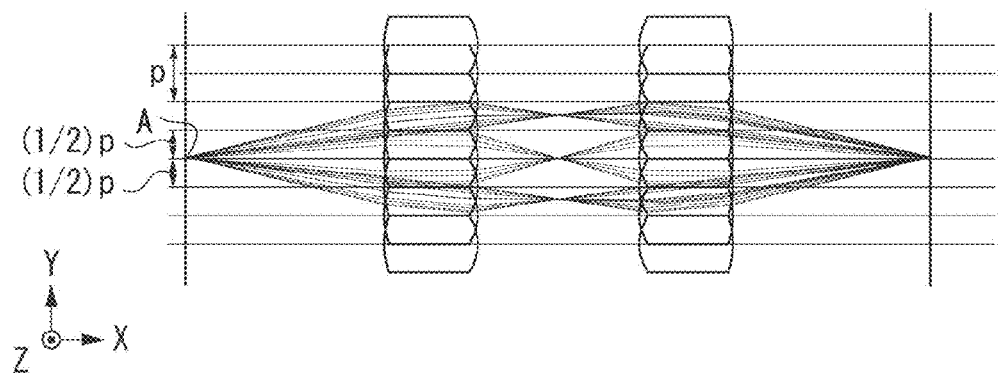
FIGS. 5A, 5B, and 5C are main array cross-sectional views illustrating imaging light fluxes from respective light emitting point positions according to the first exemplary embodiment.
Figure 5B:
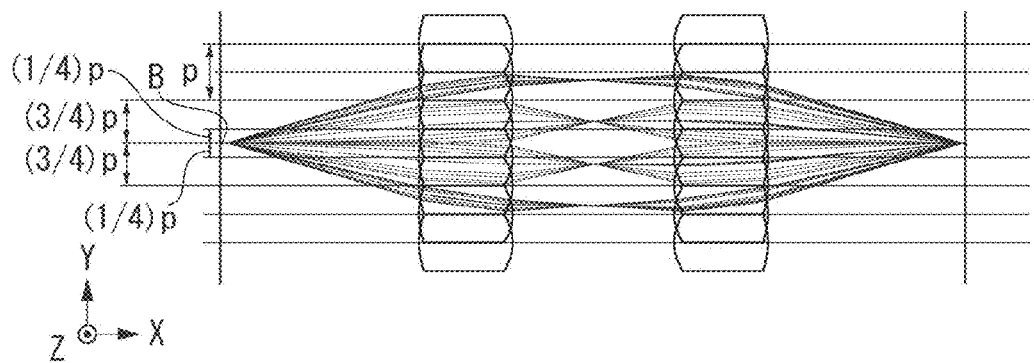
Figure 5C:
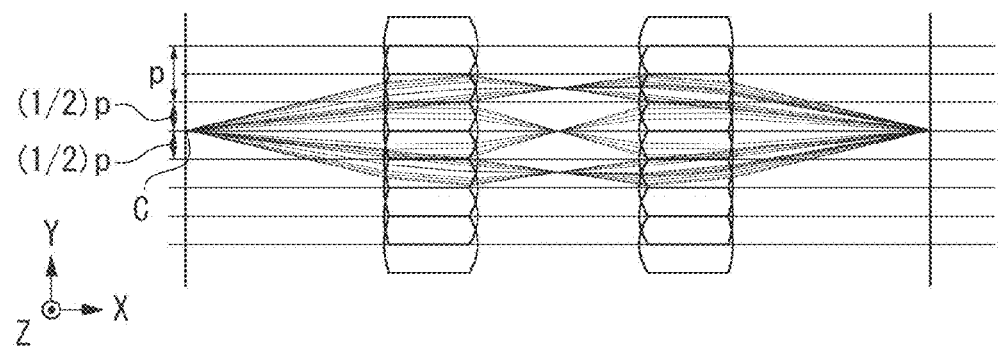

Next, imaging light fluxes including light fluxes emitted from respective light emitting points will be described with reference to FIGS. 5A to 5C. FIGS. 5A to 5C are diagrams illustrating imaging light fluxes emitted from light emitting point positions A to C in the main array cross section, respectively.

As illustrated in FIGS. 5A to 5C, the imaging optical system according to the present exemplary embodiment has such a configuration that the optical axes of the respective lens optical systems of the lens optical system rows are separate from one another in the main array direction between the adjacent lens optical system rows. In this configuration, each lens optical system is an erecting equal-magnification imaging system within the main array cross section. Accordingly, although the imaging positions on the intermediate imaging plane of light emitting points whose positions in the main array direction are equal on the object plane are different in the main array direction, the imaging positions on the image plane are equal in the main array direction.

FIG. 5A illustrates the light emitting point position A which is an object position on the optical axis of a lens optical system. The imaging light flux from the light emitting point position A includes a lens light flux of the lens optical system with an object height of 0 (on the optical axis) and lens light fluxes of two other lens optical systems with an object height of (½)p. FIG. 5B illustrates the light emitting point position B which is a position ¼ the array pitch P away from the light emitting point position A in the main array direction. The imaging light flux from the light emitting point position B includes lens light fluxes of two lens optical systems with an object height of (¼)p and lens optical fluxes of two other lens optical systems with an object height of (¾)p. FIG. 5C illustrates the light emitting point position C which is a position ½ the array pitch p away from the light emitting point position A in the main array direction. The imaging light flux from the light emitting point position C includes lens light fluxes of two lens optical systems with an object height of (½)p and a lens optical flux of another lens optical system on the optical axis.

As a comparative example, consider an imaging optical system including only one lens optical system in the sub array direction (without a staggered arrangement of lens optical system rows). More specifically, the comparative example assumes an imaging optical system where the optical axes of the top and bottom lens optical system rows according to the present exemplary embodiment are not separate from one another in the main array direction (minimum distance ΔY=0). In other respects, the imaging optical system according to the comparative example has the same configuration (optical design values) as that of the imaging optical system 102 according to the present exemplary embodiment.

Figure 6A:
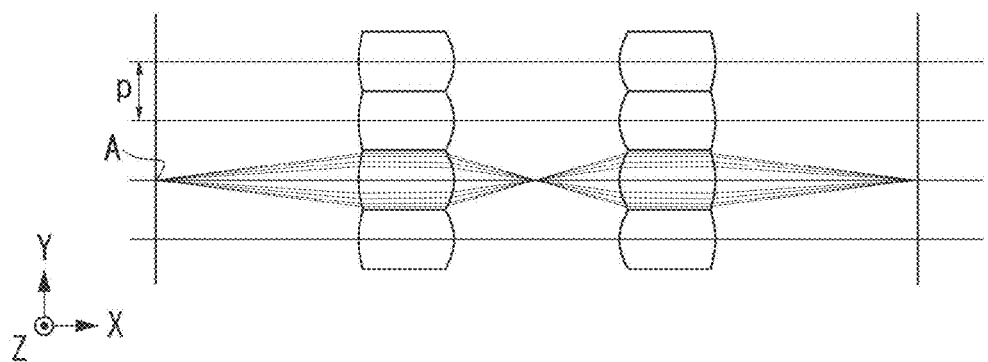
FIGS. 6A, 6B, and 6C are main array cross-sectional views illustrating imaging light fluxes from respective light emitting point positions according to a comparative example.
Figure 6B:
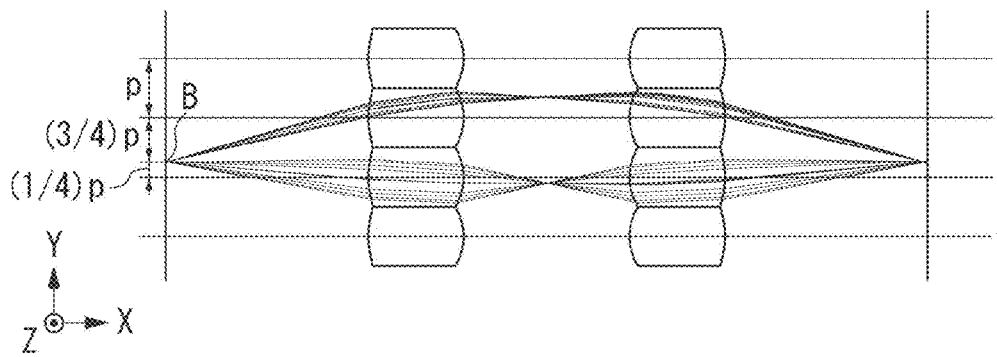
Figure 6C:
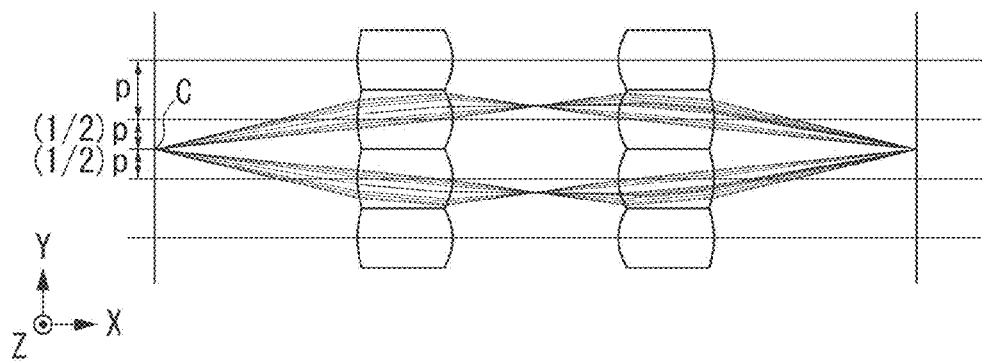

FIGS. 6A to 6C illustrate imaging light fluxes including light fluxes emitted from respective light emitting point positions A to C in the imaging optical system according to the comparative example. The imaging light flux from the light emitting point position A includes only a lens light flux of one lens optical system with an object height of 0 (FIG. 6A). The imaging light flux from the light emitting point position B includes a lens light flux of one lens optical system with an object height of (¼)p and a lens light flux of an adjoining lens optical system with an object height of (¾)p (FIG. 6B). The imaging light flux from the light emitting point position C includes two lens light fluxes of two adjoining lens optical systems with an object height of (½)p each. In the comparative example, the imaging light flux from each light emitting point position includes fewer lens light fluxes. A difference in the light amount of the lens light flux(es) between the light emitting point positions thus has a higher impact on a difference in the imaging light amount.

As illustrated in FIGS. 5A to 5C, in the imaging optical system 102 according to the present exemplary embodiment, the application of the shifted arrangement to the top and bottom lens optical system rows can increase the number and types (different object heights) of lens light fluxes constituting an imaging light flux. The imaging light fluxes in the respective light emitting point positions can thus be averaged to provide the effect of reducing variations in the imaging light amount and the imaging performance. In particular, in the present exemplary embodiment, the amount of separation ΔY between the optical axes of the top and bottom rows is set to be half the array pitch P of the lens optical systems in the main array direction. This can make the imaging light fluxes of the light emitting point positions A and C the same.

Figure 7:
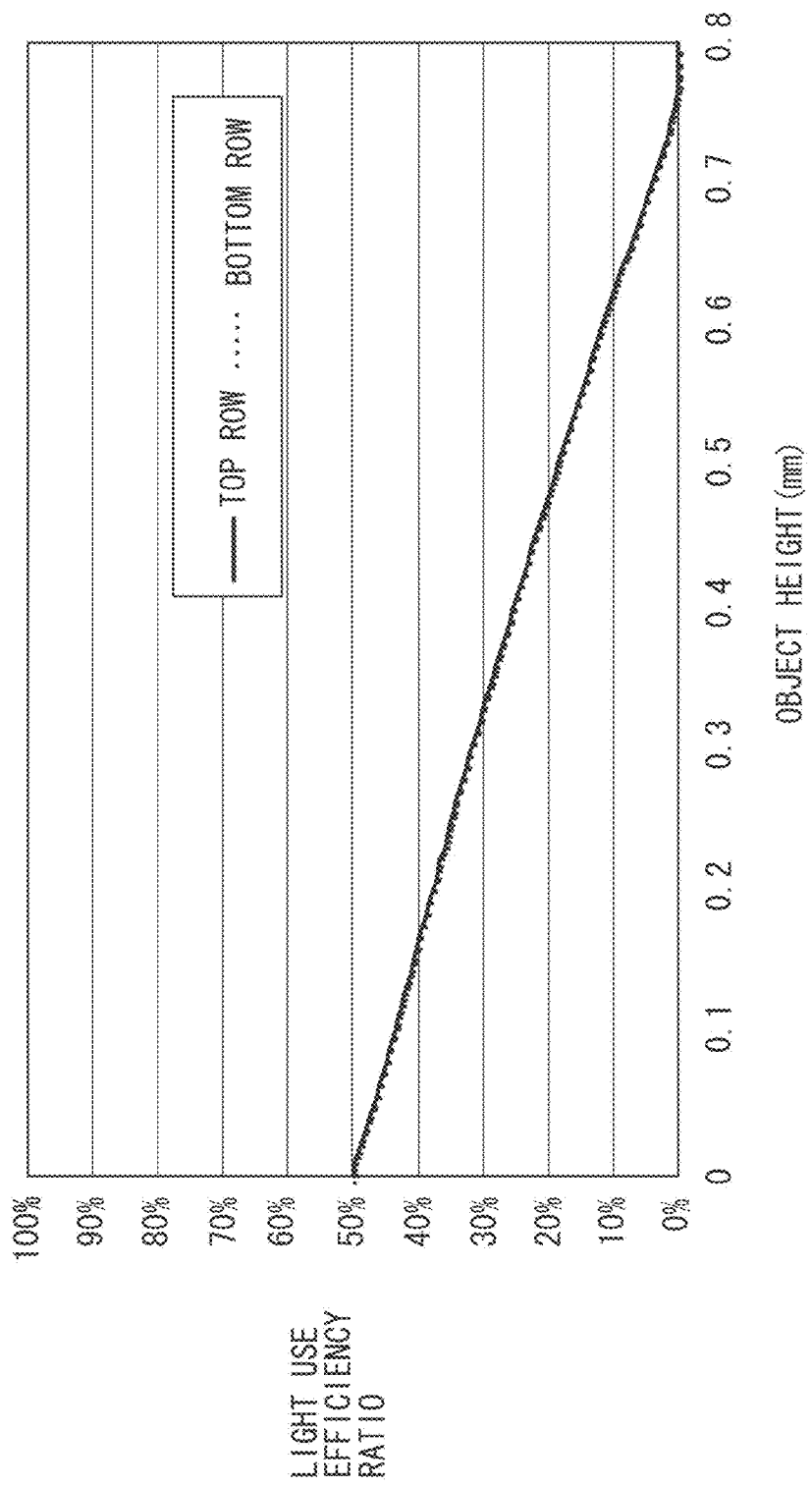
FIG. 7 is a chart illustrating the relationship between an object height and a light use efficiency ratio according to the first exemplary embodiment.

FIG. 7 is a chart illustrating a light use efficiency ratio of a lens optical system according to the present exemplary embodiment at each object height. FIG. 7 is normalized with the light use efficiency on the optical axis (object height of 0) as 100% when the optical axes of the respective lens optical systems in the top and bottom lens optical system rows are not separate from one another in the main array direction (minimum distance ΔY=0). To examine the ratio between the light amount of a light flux emitted from the object plane (light source) and the light amount of the light flux imaged on the image plane (photosensitive unit), the light use efficiency is obtained by integrating the aperture efficiency (generally proportional to the passing area of the light flux) and the transmittance of the lens optical system. As illustrated in FIG. 7, the imaging optical system 102 according to the present exemplary embodiment is designed so that the light use efficiency ratio decreases as the object height increases. The light use efficiency ratio is designed to be 0% when the object height coincides with the array pitch p (0.76 mm). As illustrated in FIGS. 4A and 4B, the lens optical systems of the top row and those of the bottom row are symmetrically configured about the optical axis O in the sub array cross section. The lens optical systems thus have the same light use efficiency ratio at each object height.

Figure 8A:
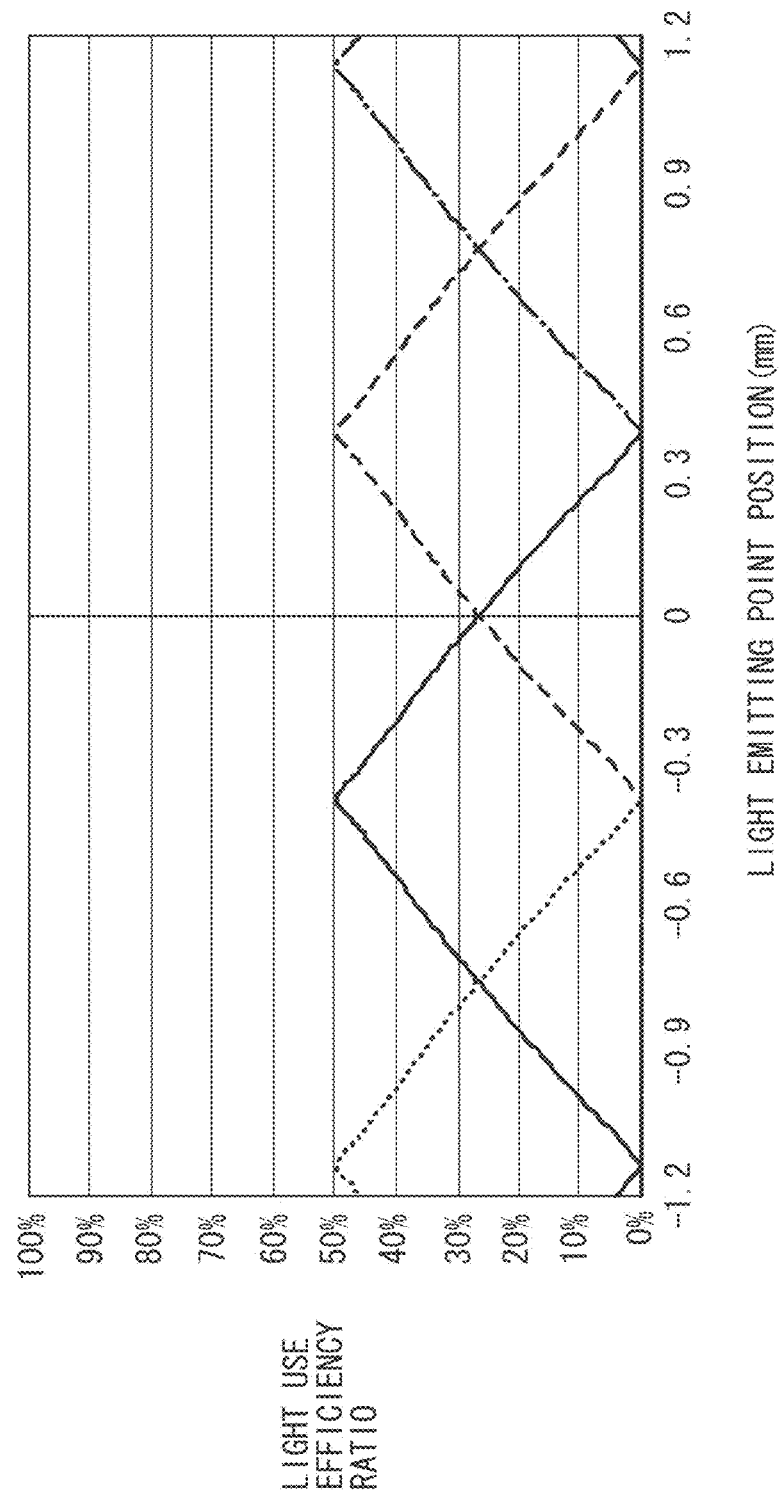
FIGS. 8A and 8B are charts illustrating the relationship between a light emitting point position and the light use efficiency ratio according to the first exemplary embodiment.
Figure 8B:
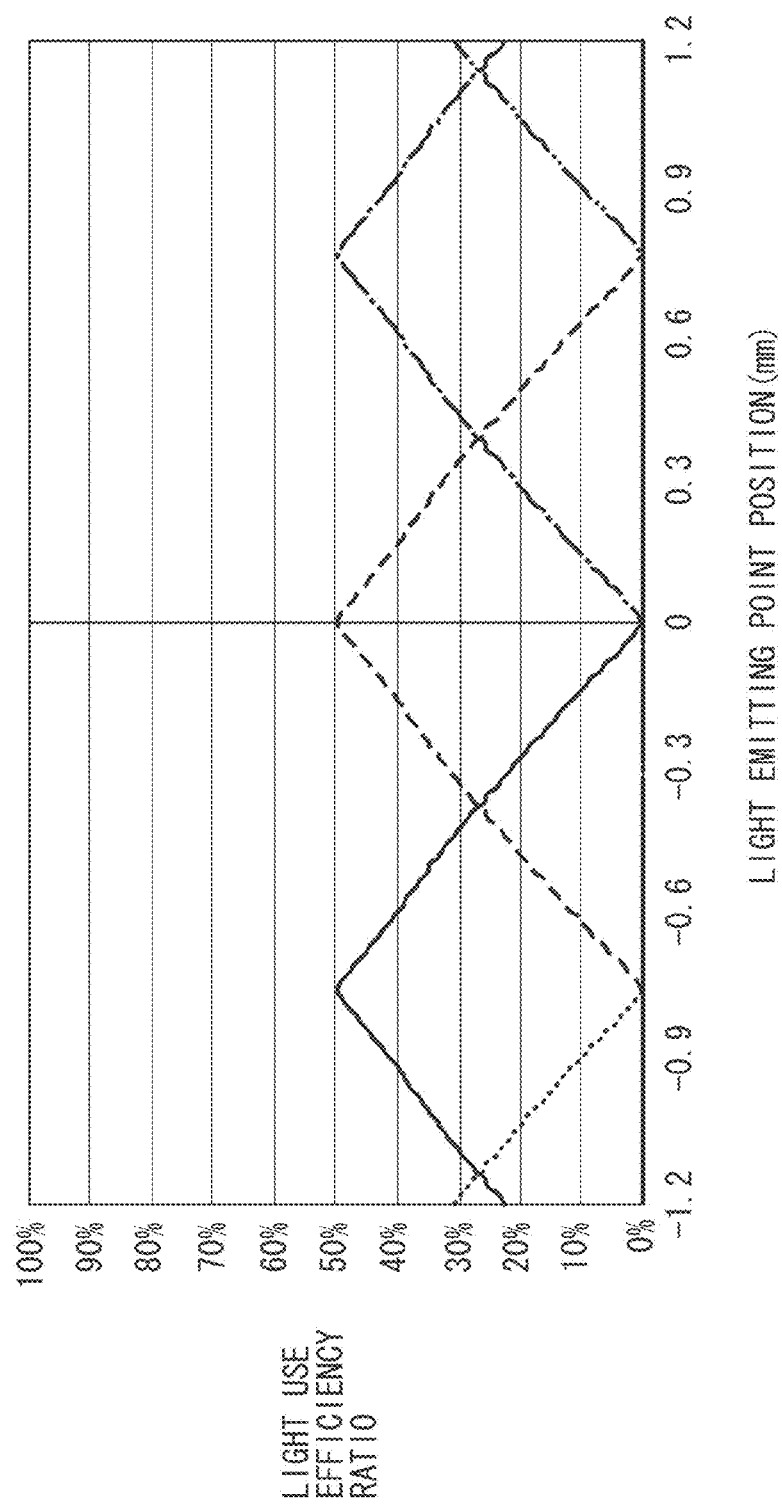

FIGS. 8A and 8B are charts illustrating the light use efficiency ratios of the lens optical system rows at each light emitting point position. FIG. 8A corresponds to the top lens optical system row. FIG. 8B corresponds to the bottom lens optical system row. The light emitting point position on the optical axis of a lens optical system in the bottom row is assumed as the origin. The light emitting points of the light source exist generally continuously in the main array direction. As can be seen from FIGS. 8A and 8B, the light use efficiency ratios have a mountain-like distribution peaking at array pitches p (0.76 mm). The peaks correspond to the optical axes of the respective lens optical systems. A comparison of FIGS. 8A and 8B shows that the distributions of the light use efficiency ratios of the top and bottom lens optical system rows are shifted by the minimum distance ΔY of their optical axes.

Figure 9:
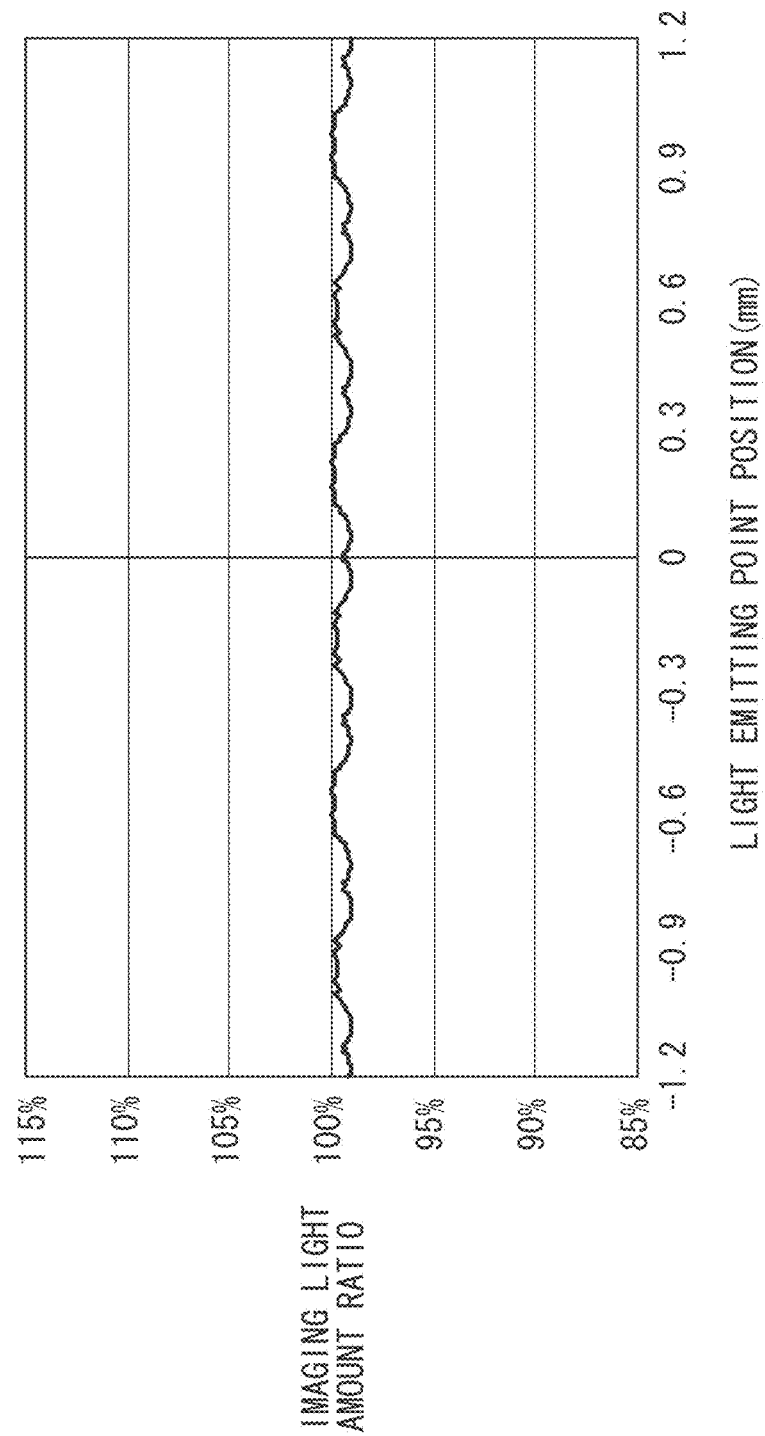
FIG. 9 is a chart illustrating the relationship between the light emitting point position and an imaging light amount ratio according to the first exemplary embodiment.

To evaluate variations in the imaging light amount, FIG. 9 illustrates an imaging light amount ratio at each light emitting point position. The imaging light amount at each light emitting point position is proportional to the sum of the light use efficiencies of lens light fluxes constituting the imaging light flux. The imaging light amounts are normalized with the imaging light amount at the light emitting point position on the optical axis of a lens optical system as 100%. From FIG.

Figure 10:
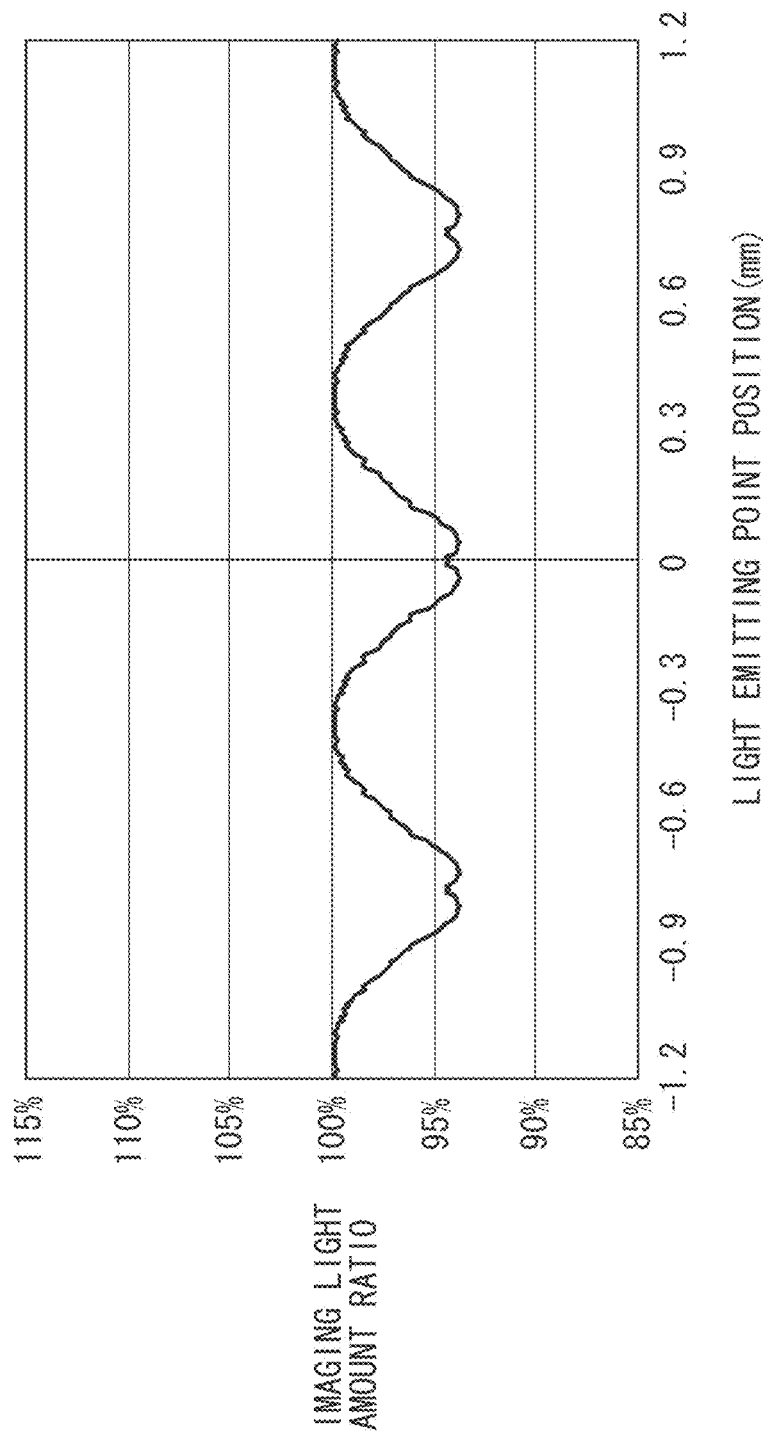
FIG. 10 is a chart illustrating the relationship between the light emitting point position and the imaging light amount ratio according to the comparative example.

9, it can be seen that there is a difference of 1.0% between the maximum and minimum values of the imaging light amount ratio in the present exemplary embodiment. FIG. 10 illustrates the imaging light amount ratios corresponding to each light emitting point position in the imaging optical system according to the foregoing comparative example. There is a difference of 6.2% between the maximum and minimum values of the imaging light amount ratio. A comparison of FIGS. 9 and 10 shows that the imaging optical system 102 according to the present exemplary embodiment provides a smaller difference between the maximum and minimum values of the imaging light amount ratio, with reduced variations in the imaging light amount.

Figure 11A:
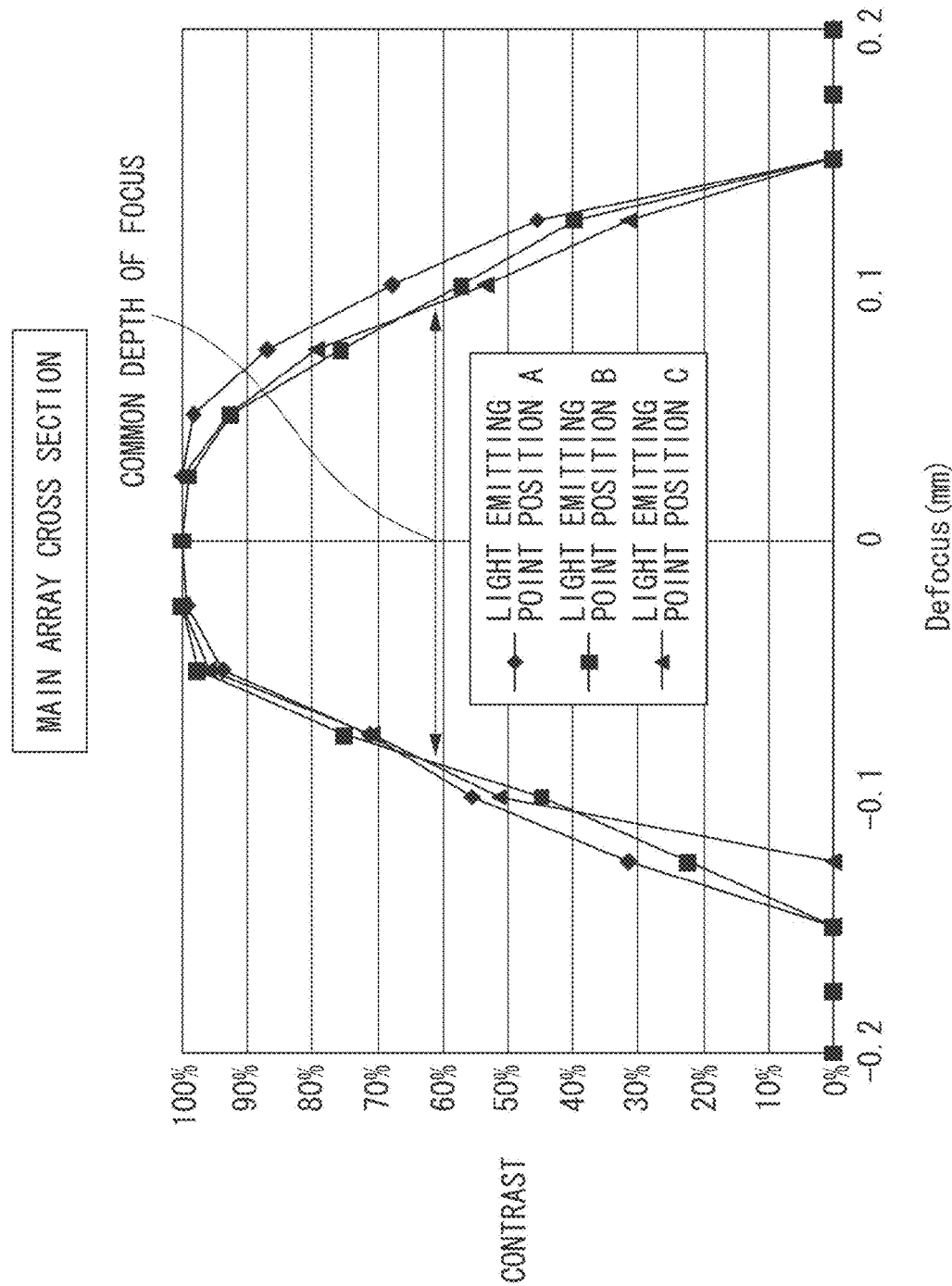
FIGS. 11A and 11B are charts illustrating imaging performance of the imaging light fluxes from the respective light emitting point positions according to the first exemplary embodiment.
Figure 11B:
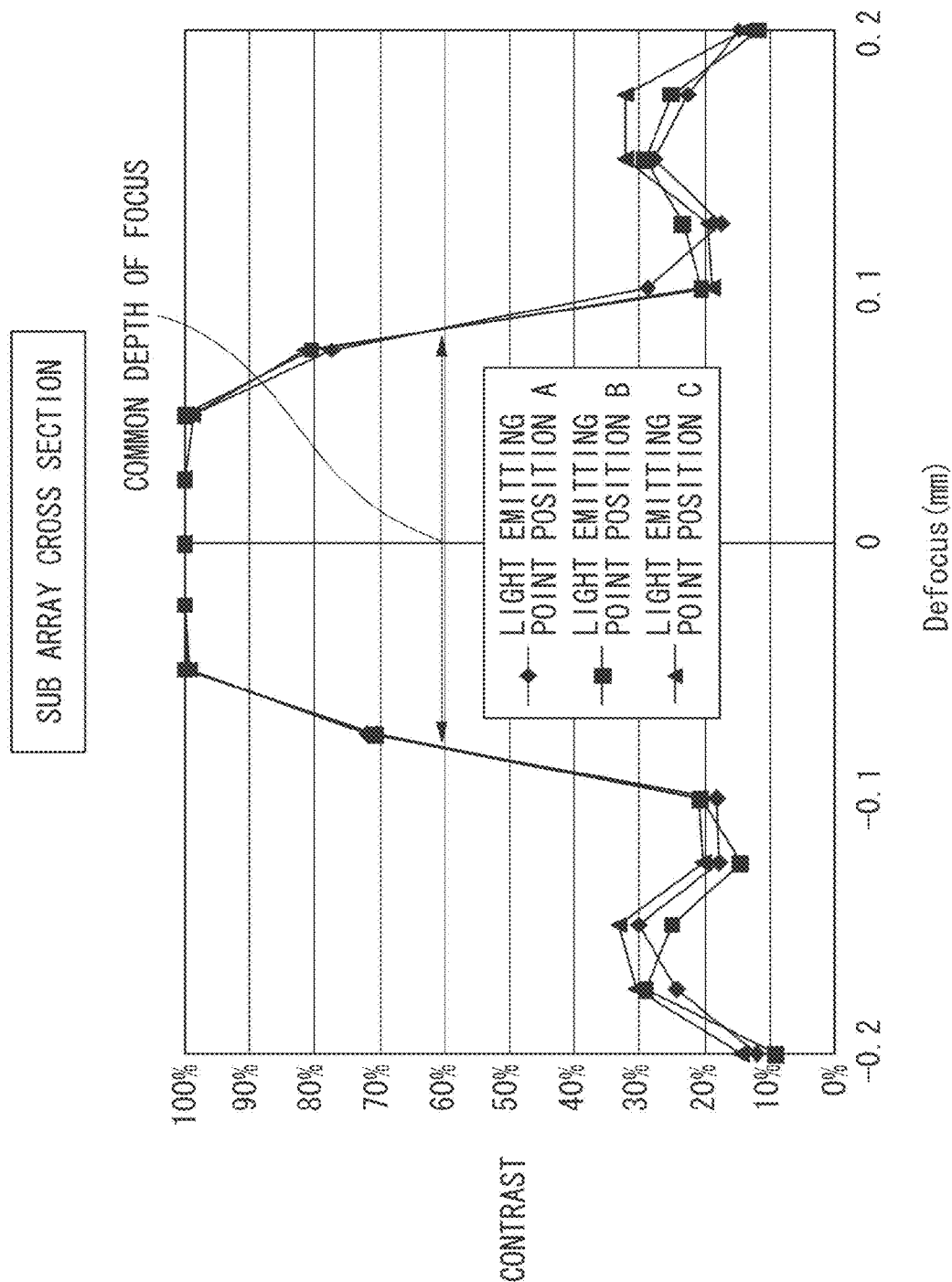

To evaluate variations in the imaging performance, the imaging performance of the imaging light fluxes in the respective light emitting point positions will be examined. The imaging performance of an imaging light flux refers to that of a plurality of superposed lens light fluxes constituting the imaging light flux. Unlike the imaging light amount (light use efficiency), the imaging performance cannot be calculated by simply adding up the imaging performance of each of the plurality of lens light fluxes. To evaluate the imaging performance corresponding to each of the foregoing light emitting point positions A to C, FIGS. 11A and 11B illustrate the relationship between contrast and defocus. FIG. 11A illustrates a common depth of focus in the main array cross section. FIG. 11B illustrates a common depth of focus in the sub array cross section. The contrast was calculated by using the distribution of a line spread function (LSF) of the imaging light flux, repeatedly added at cycles of 84.6 µm (equivalent to 600-dpi line pair), when a light emitting point having a width of 42.3 µm in the main array direction and 25.3 µm in the sub array direction was made to emit light.

Figure 12A:
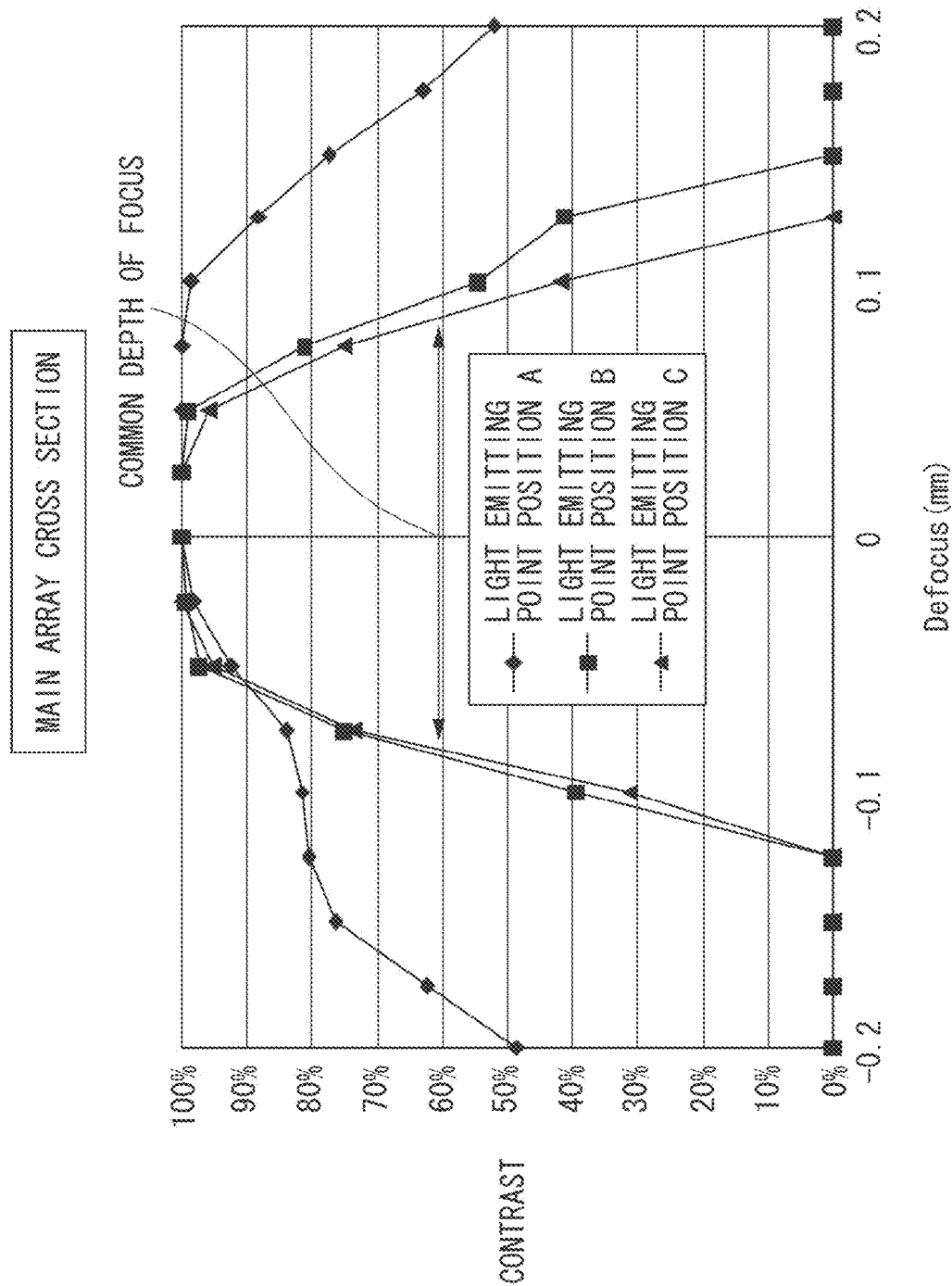
FIGS. 12A and 12B are charts illustrating the imaging performance of the imaging light fluxes from the respective light emitting point positions according to the comparative example.
Figure 12B:
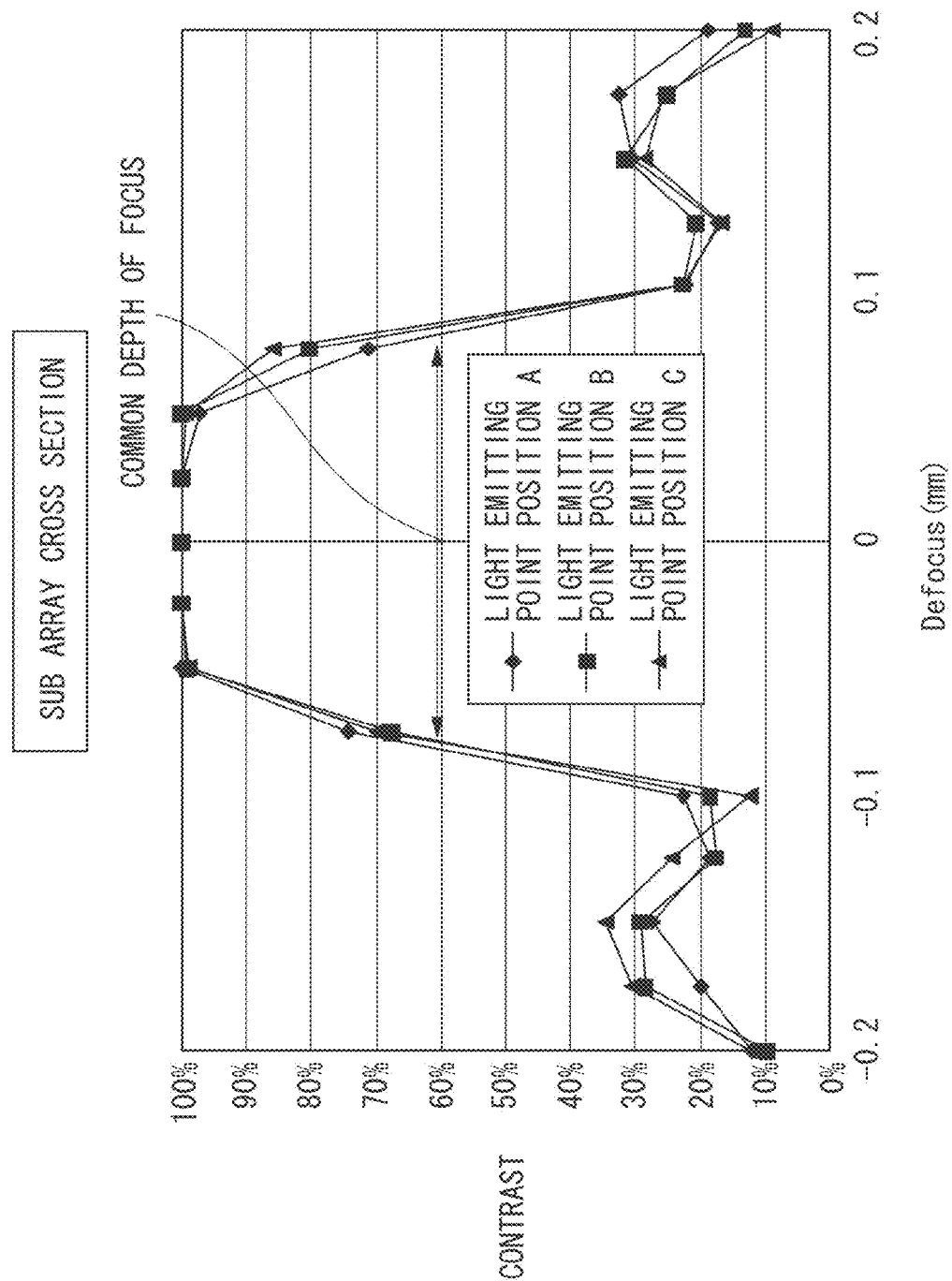

FIGS. 12A and 12B similarly illustrate the relationship between the contract and defocus of the imaging optical system according to the foregoing comparative example. In view of a demand for a high-definition output image, the depth of focus for contrast values of 60% and above will be described. A comparison of FIGS. 11A and 11B and FIGS. 12A and 12B shows that the imaging light fluxes from the respective light emitting point positions A to C vary little in the depth of focus in the sub array cross section. In the main array cross section, the depth of focus according to the comparative example (FIG. 12A) varies largely with the light emitting point position. The depth of focus according to the present exemplary embodiment (FIG. 11A) varies significantly less with the light emitting point position. In other words, the imaging optical system 102 according to the present exemplary embodiment can reduce changes in the depth of focus with the light emitting point position, thereby allowing a reduction of variations in the imaging performance.

The imaging performance of an imaging optical system is evaluated in terms of the common depth of focus which is the common range of the depths of focus corresponding to the respective light emitting point positions. In the main array cross section, the common depth of focus of the comparative example is 0.160 mm. The common depth of focus of the present exemplary embodiment is 0.180 mm. The present exemplary embodiment thus provides imaging performance more favorable than that of the comparative example.

As described above, the imaging optical system 102 according to the present exemplary embodiment can increase the numbers and types of lens light fluxes constituting imaging light fluxes, thereby averaging the imaging light fluxes in the respective light emitting point positions. This provides the effect of reducing variations in the imaging light amount and the imaging performance.

Each light emitting point has an object height as small as half the size (25.3 µm) of the light emitting points, or 12.7 µm, in the sub array direction. The application of the shifted arrangement to the configuration of the present exemplary embodiment thus causes approximately zero change in the imaging light amount. As can be seen from the contrast peaks in the sub array cross section of FIG. 11B, the imaging performance also varies little. That is, the compatibility between the imaging light amount and the imaging performance in the sub array cross section can be maintained even with the use of the shifted arrangement.

As described above, the imaging optical system 102 according to the present exemplary embodiment forms inverted imaging systems in the sub array cross section and uses the shifted arrangement. This can ensure compatibility between the imaging light amount and the imaging performance, and reduce variations in the imaging light amount and the imaging performance.

The imaging light amounts and the imaging performance of the lens optical system rows at each light emitting point position vary periodically at the array pitches p. As can be seen from FIGS. 9, 11A, and 11B, the variations are such that general peaks and general bottoms occur at the light emitting point positions on the optical axes of the lens optical systems (corresponding to the light emitting point position A) and positions ½ the array pitch p shifted from the light emitting point positions (corresponding to the light emitting point position C), respectively. In the present exemplary embodiment, the top and bottom rows have the same array pitch p. The minimum distance $\Delta Y$ between the optical axis rows is ½ the array pitch p. With such a configuration, general peaks (and general bottoms) of the top row and general bottoms (and general peaks) of the bottom row can be cancelled out. As illustrated in FIGS. 5A to 5C, the effect can also be seen from the fact that the imaging light fluxes at the light emitting point positions A and C are equal to each other. In other words, the configuration of the imaging optical system 102 according to the present exemplary embodiment can increase the effect of averaging the imaging light fluxes, thereby providing the effect of further reducing variations in the imaging light amount and the imaging performance.

Suppose that the number of lens optical system rows in the sub array direction is k. There are as many methods (arrangement patterns of the lens optical system rows) for averaging variations in the imaging light amount and the imaging performance as the number of positive integers n satisfying $k \geq n \geq 2$, i.e., (k−1) patterns. To average variations in the imaging light amount and the imaging performance by combining the k lens optical system rows, the lens optical system rows can be combined in (n−1) ways. The averaging is effected by adding up general peaks (and general bottoms) and general bottoms (and general peaks) of the variations of the lens optical system rows. In such a case, a higher averaging effect is obtained if any two lens optical system rows of the imaging optical system 102 are combined so that the minimum distance $\Delta Y$ between the optical axes is p/n.

Assume that n is a positive integer satisfying $k \geq n \geq 2$. From the foregoing, $(p/n) - \frac{1}{2} \times (p/n) = p/(2n) \leq \Delta Y \leq (p/n) + \frac{1}{2} \times (p/n) = 3p/(2n)$. Consequently, an exemplary embodiment of the present invention provides a sufficient effect when the lens optical system rows fall within the range of the condition given by:

$$p/(2n) \leq \Delta Y \leq 3p/(2n) \qquad (2)$$

Exceeding such a range, general peaks and general bottoms reinforce each other to fail to provide the averaging effect.

In the present exemplary embodiment, the number of lens optical system rows k=2. The only positive integer n satisfying k≥n≥2 is 2. There is thus one (k−1=2−1=1) arrangement pattern of the lens optical system rows. The number of combinations of the lens optical system rows is also one, and (n−1)=1 yields n=2. The top and bottom rows have an array pitch p=0.76 mm and the optical axis rows have a minimum distance ΔY=(½)p. The minimum distance ΔY of (½)p is found to satisfy expression (2) for n=2, i.e., p/4≤ΔY≤3p/4.

In the present exemplary embodiment, the number and types of lens light fluxes have been described to be increased to average the imaging light flux in each light emitting point position. The number of lens light fluxes constituting an imaging light flux is known to depend also on the optical design values of the lens optical systems. Specifically, the number of lens light fluxes constituting an imaging light flux from a light emitting point having an object height of 0 (on the optical axis) is determined as follows:

In the main array cross section, the maximum object height (outermost off-axis object height) a lens optical system can capture is approximated by (−R/2)÷β=R/(2β), where R is the effective diameter of the lens optical system on the intermediate imaging plane and β is the intermediate imaging magnification. That is, the half value (R/2) of the effective diameter R corresponds to the imaging position of the intermediate image of the outermost off-axis object height in the main array direction. The effective diameter R is determined by R=(R1+R2)/2, where R1 is the effective diameter of the first optical system constituting the lens optical system, and R2 is the effective diameter of the second optical system. If the first optical system (first lens G1) and the second optical system (second lens G2) have the same effective diameter like the present exemplary embodiment, the effective diameter R on the intermediate imaging plane coincides with the effective diameter of the first and second optical systems.

The light emitting point position (object height) on the optical axis of a lens optical system in a lens optical system row can be expressed as n×p, where n is an integer and p is the array pitch. Considering positive and negative object heights, the number of lens light fluxes included in the imaging light flux from the light emitting point on the optical axis is given by an integer n that satisfies n×p<|R/(2β)|.

The number of lens light fluxes can be increased to reduce variations in the imaging light amount and the imaging performance. However, if the lens light fluxes are increased in number, the resulting optical design values include a more acute angle of view for capturing a light flux. Consequently, spherical aberrations and the curvature of field become more difficult to eliminate. In view of such a drawback, appropriate optical design values are determined so that the number of lens light fluxes constituting an imaging light flux from a light emitting point position on the optical axis of a lens optical system in each lens optical system row is three or less. More specifically, the range of the optical design values where the number of lens light fluxes is three or less can be expressed by the following expression (3):

$$|R/(2\beta p)| \leq 2 \quad (3)$$

If the optical design values are determined to satisfy expression (3), the imaging optical system 102 can favorably correct aberrations and provide the effect of reducing variations in the imaging light amount and the imaging performance. In the present exemplary embodiment, the lens optical systems constituting the top and bottom rows both have an intermediate imaging magnification β=−0.45, an effective diameter R=0.70 mm on the intermediate imaging plane, and an array pitch p=0.76 mm. Thus, |R/(2βp)|=1.02<2, which satisfies the foregoing expression (3).

A second exemplary embodiment of the present invention will be described below. The same or similar components to those of the first exemplary embodiment are designated by the same reference numerals. A description thereof will be simplified or omitted.

Figure 13:
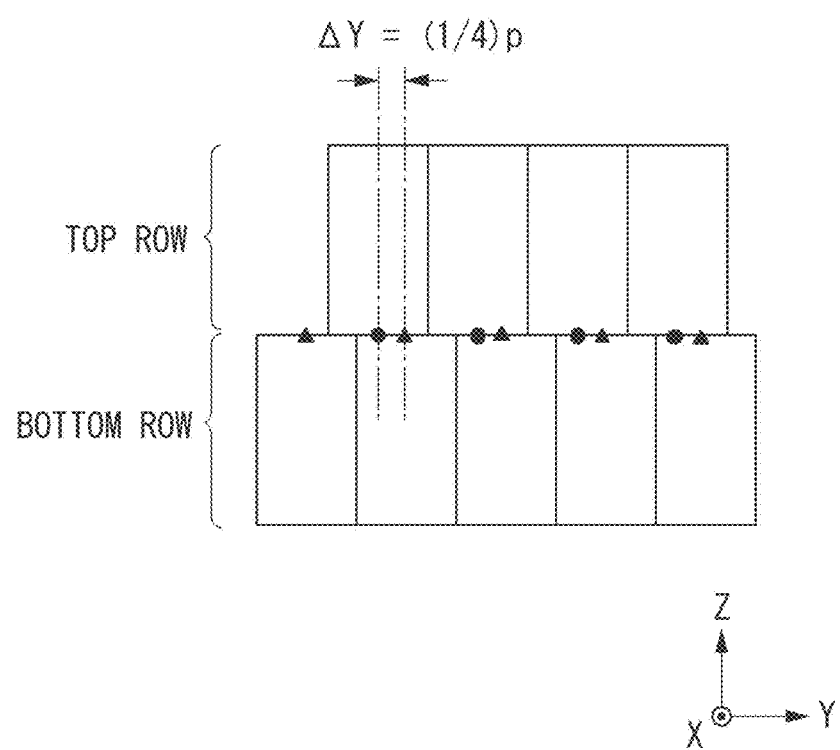
FIG. 13 is a front cross-sectional view of an imaging optical system according to a second exemplary embodiment.

FIG. 13 is a front view (YZ cross-sectional view) of an imaging optical system according to the present exemplary embodiment. Like the first exemplary embodiment, the present exemplary embodiment is configured so that the optical axis rows of the top and bottom rows are located on the same line. The configuration of the present exemplary embodiment differs from that of the first exemplary embodiment in that the minimum distance ΔY between the optical axes of the top and bottom rows in the main array direction is (¼)p (=0.19 mm). Table 3 shows design values of the array of the lens optical systems according to the present exemplary embodiment.

TABLE 3

|  | Top row | Bottom row |
| --- | --- | --- |
| Range of Z (mm) | 1.22 to 0 | 0 to −1.22 |
| Array pitch p (mm) | 0.76 | 0.76 |
| ΔY (top - bottom) (mm) | 0.19 | |

Like the first exemplary embodiment, imaging light fluxes including light fluxes emitted from the respective light emitting point positions A to C according to the present exemplary embodiment will be described.

The imaging light flux from the light emitting point position A (object plane position on the optical axis of a lens optical system in the bottom row) includes a lens light flux of the lens optical system with an object height of 0 (on the optical axis), a lens light flux of a lens optical system with an object height of (¼)p, and a lens light flux of a lens optical system with an object height of (¾)p. The imaging light flux from the light emitting point position B includes a lens light flux of the lens optical system with an object height of (¼)p and two lens light fluxes of lens optical systems with an object height of (½)p. The image light flux from the light emitting point position C includes two lens light fluxes of lens optical systems with an object height of (½)p and a lens light flux of a lens optical system with an object height of (¼)p.

Like the first exemplary embodiment, the numbers and types of lens light fluxes constituting the imaging light fluxes can thus be increased to average the imaging light fluxes in the respective light emitting point positions.

Figure 14A:
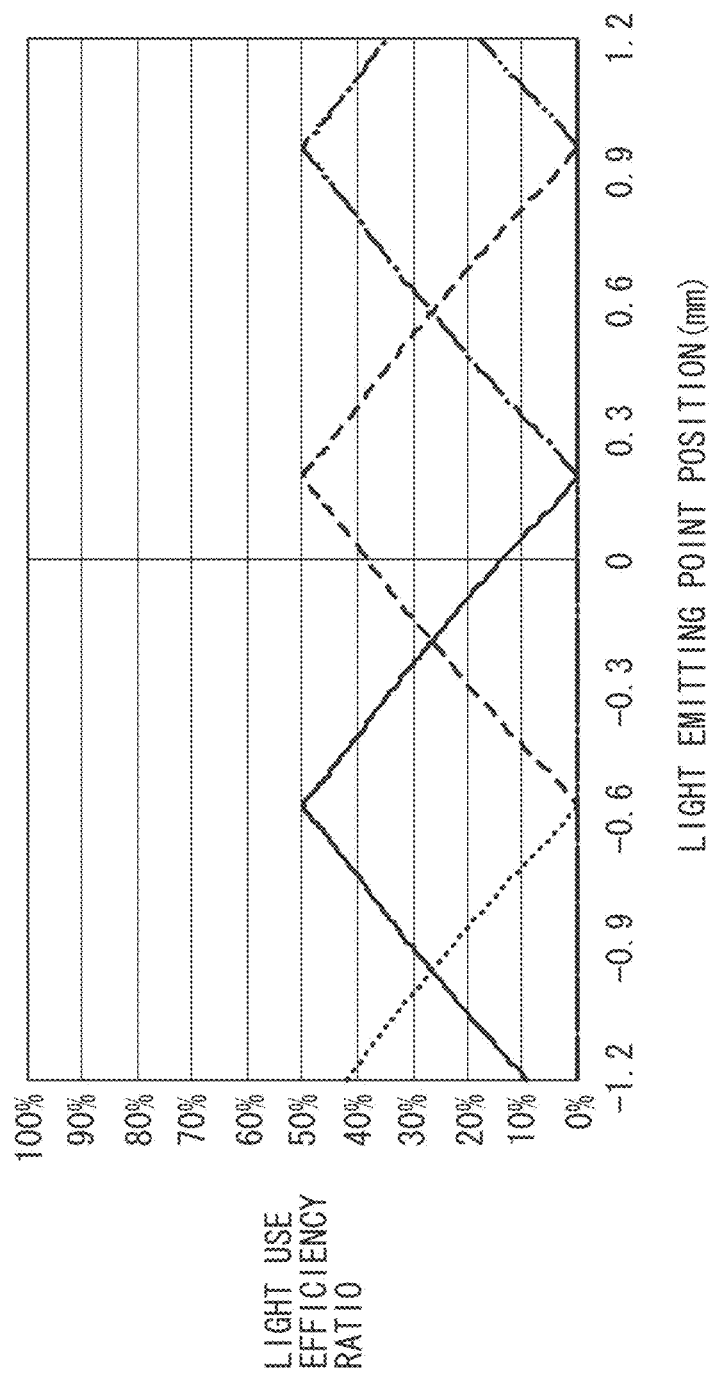
FIGS. 14A and 14B are charts illustrating the relationship between the light emitting point position and the light use efficiency ratio according to the second exemplary embodiment.
Figure 14B:
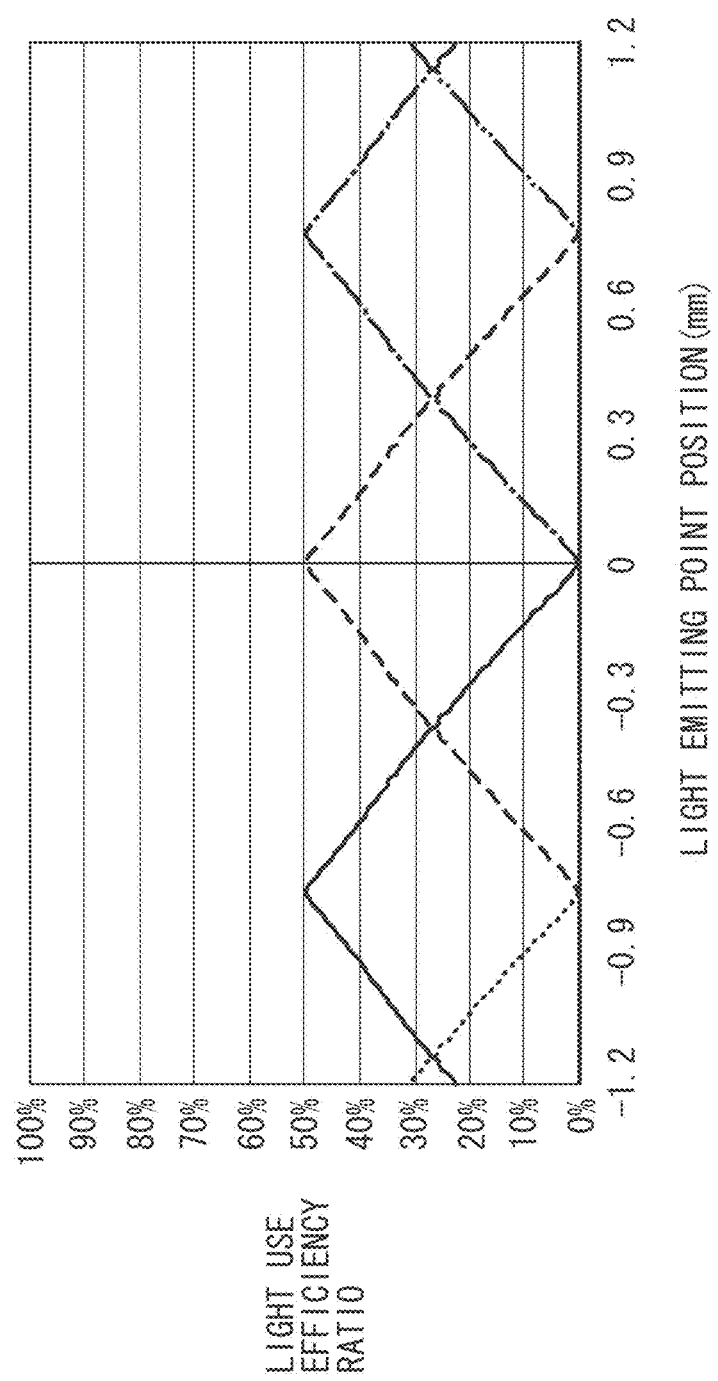
Figure 15:
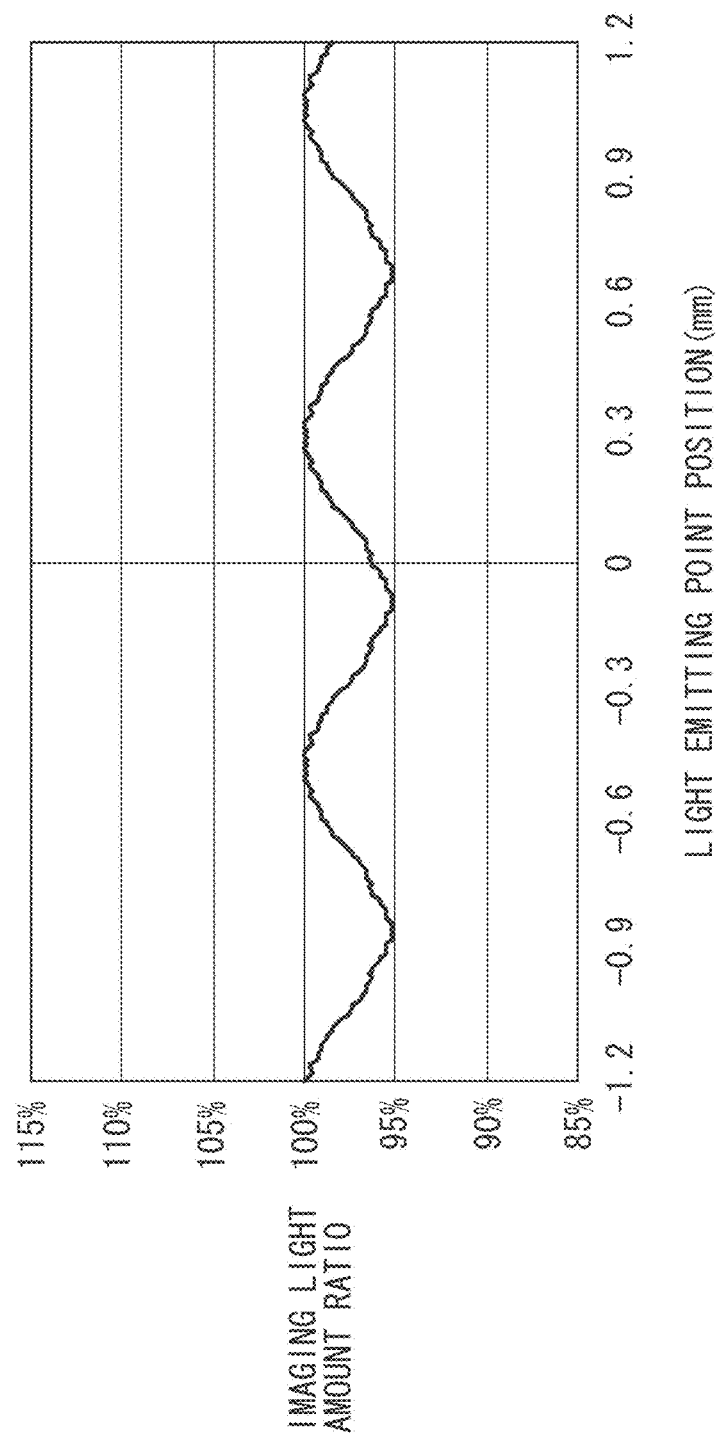
FIG. 15 is a chart illustrating the relationship between the light emitting point position and the imaging light amount ratio according to the second exemplary embodiment.

In the present exemplary embodiment, each of the lens optical systems in the top and bottom rows is configured the same as in the first exemplary embodiment. The light use efficiency ratios at respective object heights are therefore the same as illustrated in FIG. 7. FIG. 14A (top row) and FIG. 14B (bottom row) illustrate the light use efficiency ratios at each light emitting point positions. A comparison of FIGS. 14A and 14B shows that the distributions of the light use efficiency ratios are shifted by the minimum distance ΔY between the optical axes of the lens optical system rows. FIG. 15 illustrates the imaging light amount ratio at each light emitting point position according to the present exemplary embodiment. In the present exemplary embodiment, the maximum and minimum values of the imaging light amount ratio have a difference of 4.8%, which is smaller than that of the comparative example (6.2%) illustrated in FIG. 10. This shows that variations in the imaging light amount are smaller.

Figure 16A:
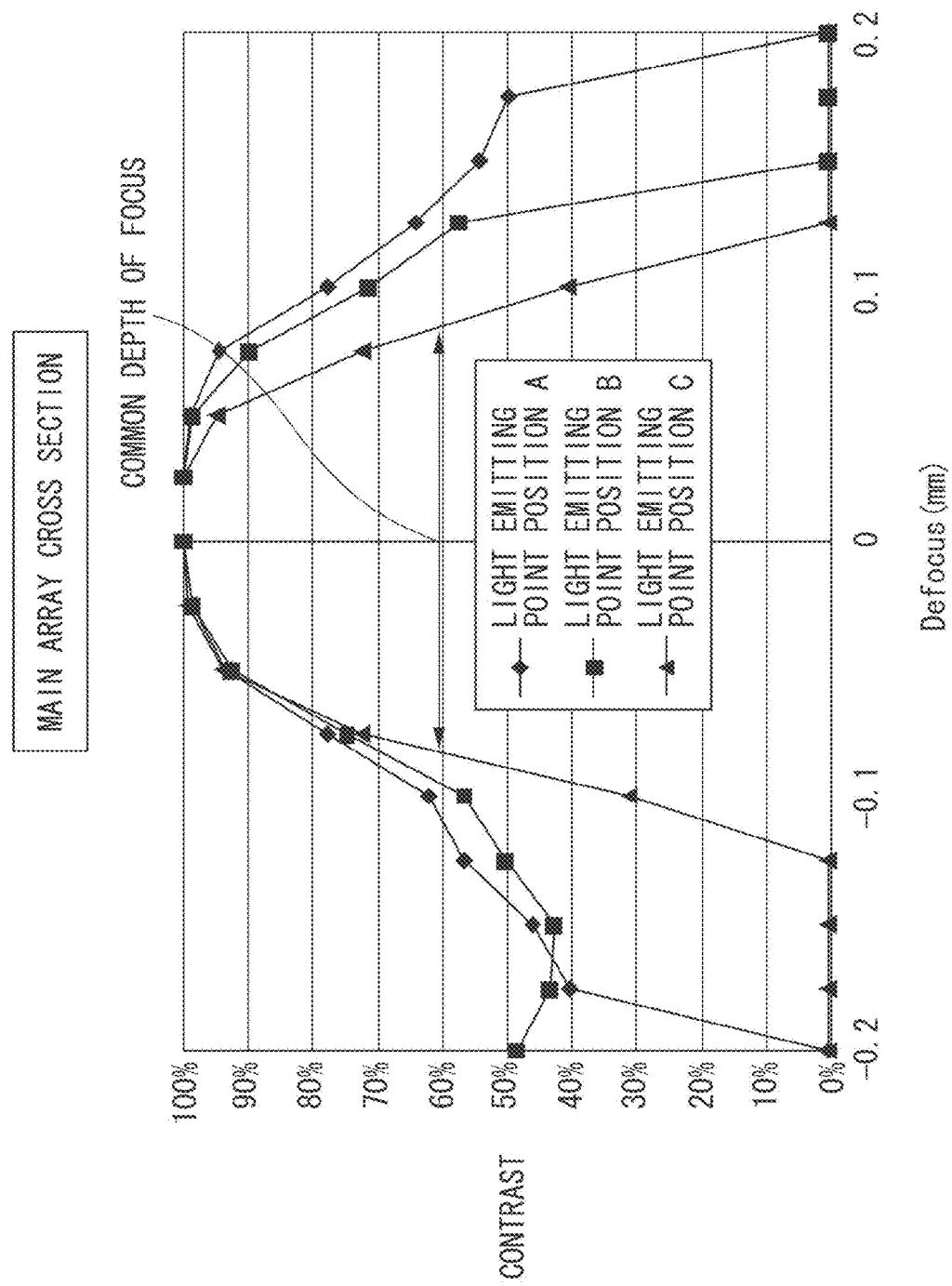
FIGS. 16A and 16B are charts illustrating the imaging performance of the imaging light fluxes from the respective light emitting point positions according to the second exemplary embodiment.
Figure 16B:
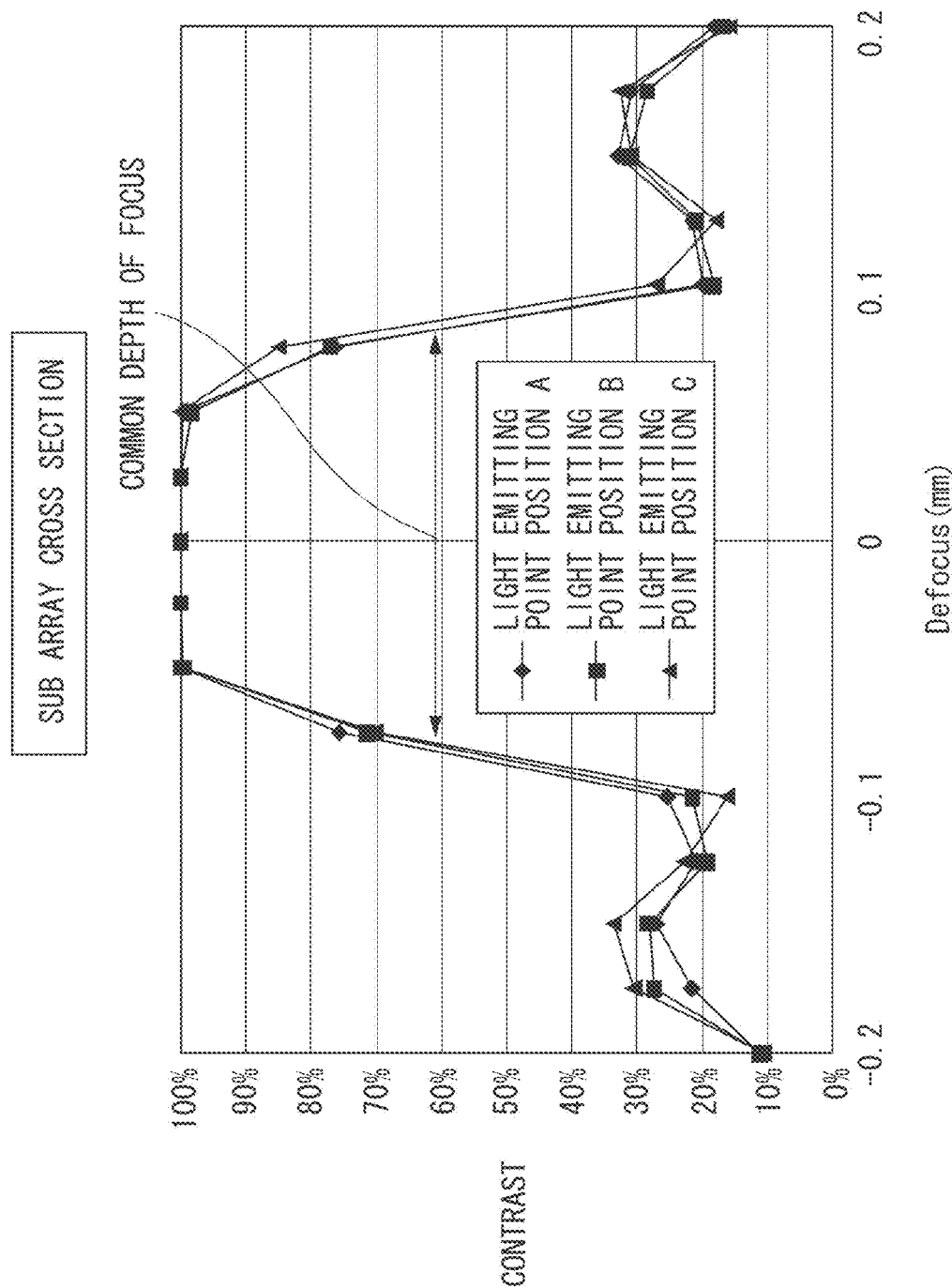

FIGS. 16A and 16B illustrate the imaging performance of the imaging light fluxes from the light emitting points A to C according to the present exemplary embodiment. A comparison with the comparative example (see FIGS. 12A and 12B) shows that in the main array cross section, the depths of focus of the light emitting point positions A to C for contrast values of 60% and above vary less, and variations in the imaging performance are smaller. For contrast values of 60% and above, the common depth of focus in the main array cross section is 0.167 mm, which is found to be greater than the common depth of focus in the comparative example (0.160 mm).

As described above, in the imaging optical system according to the present exemplary embodiment, the numbers and types of lens light fluxes constituting the imaging light fluxes can be increased to average the imaging light fluxes in the respective light emitting point positions. This provides the effect of reducing variations in the imaging light amount and the imaging performance.

As described above, the imaging optical system according to the present exemplary embodiment forms inverted imaging systems in the sub array cross section and uses the shifted arrangement. This can ensure compatibility between the imaging light amount and the imaging performance, and reduce variations in the imaging light amount and the imaging performance.

Unlike the first exemplary embodiment where the minimum distance $\Delta Y$ is strictly set to $(\frac{1}{2})p$, the present exemplary embodiment can average the imaging light fluxes by setting the minimum distance $\Delta Y=(\frac{1}{4})p$. An exemplary embodiment of the present invention can similarly provide a sufficient effect if the minimum distance falls within the range of $(\frac{1}{4})p \leq \Delta Y \leq (\frac{3}{4})p$.

Even in the present exemplary embodiment, the number of lens optical system rows k is two (i.e., n=2). The top and bottom rows have an array pitch p=0.76 mm. The optical axes rows have a minimum distance $\Delta Y=(\frac{1}{4})p$. The minimum distance $\Delta Y$ is thus found to satisfy expression (2) for n=2, i.e., $p/4 \leq \Delta Y \leq 3p/4$.

A third exemplary embodiment of the present invention will be described below. The same or similar components to those of the first exemplary embodiment are designated by the same reference numerals. A description thereof will be simplified or omitted.

Figure 17:
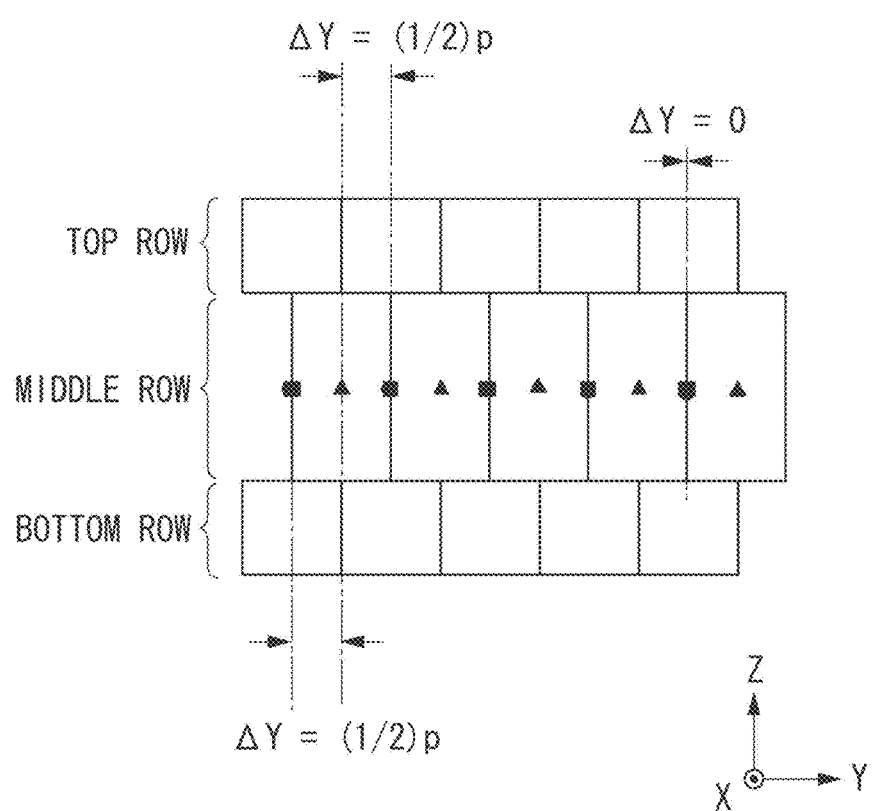
FIG. 17 is a front cross-sectional view of an imaging optical system according to a third exemplary embodiment.

FIG. 17 is a schematic diagram illustrating an imaging optical system according to the present exemplary embodiment. Unlike the first exemplary embodiment, the present exemplary embodiment is configured so that three lens optical system rows are arranged in the sub array direction (Z direction). The lens optical system rows will be defined as a bottom row (third lens optical system row), a middle row (second lens optical system row), and a top row (first lens optical system row) in order in the negative direction of the sub array direction (−Z direction). In FIG. 17, the optical axes of the lens optical systems of the top row are represented by unfilled circles (○), those of the lens optical systems of the middle row by unfilled triangles (Δ), and those of the lens optical systems of the bottom row by unfilled squares (□). As can be seen from FIG. 17, the imaging optical system according to the present exemplary embodiment is configured so that the optical axes of all the lens optical systems of the top, middle, and bottom rows are located on the same line. The optical axes of the lens optical systems of the top and bottom rows are located in the same positions. The lens optical systems of the top and bottom rows are symmetrically arranged in the sub array direction about the optical axis row.

In FIG. 17, suppose that the optical axis rows are located at Z=0. The lens surfaces of the bottom row lie in the range of Z=−1.22 mm to −0.61 mm. The lens surfaces of the middle row lie in the range of Z=−0.61 mm to 0.61 mm. The lens surfaces of the top row lie in the range of Z=0.61 mm to 1.22 mm. Without the shifted arrangement, the imaging optical system according to the present exemplary embodiment and the imaging optical system 102 according to the first exemplary embodiment have the same optical design values including the surface shapes of the lens optical systems. The top, middle, and bottom lens optical system rows all have an array pitch p=0.76 mm in the main array direction.

Since the optical axes of the lens optical systems of the top and bottom rows are located in the same positions, the distance $\Delta Y$ from the optical axis of a lens optical system of the bottom row to the optical axis of a lens optical system of the top row closest to the optical axis in the main array direction is 0 mm. The minimum distance $\Delta Y$ from the optical axis of a lens optical system of the middle row to the optical axis of a lens optical axis of the top row (bottom row) closest to the optical axis is $(\frac{1}{2})p$ (=0.38 mm). Table 4 shows such array design values.

TABLE 4

|  | Top row | Middle row | Bottom row |
| --- | --- | --- | --- |
| Range of Z (mm) | 1.22 to 0.61 | 0.61 to −0.61 | −0.61 to −1.22 |
| Array pitch p (mm) | 0.76 | 0.76 | 0.76 |
| $\Delta Y$ (top - middle) (mm) | 0.38 | | |
| $\Delta Y$ (middle - bottom) (mm) | 0.38 | | |
| $\Delta Y$ (top - bottom) (mm) | 0 | | |

Figure 18A:
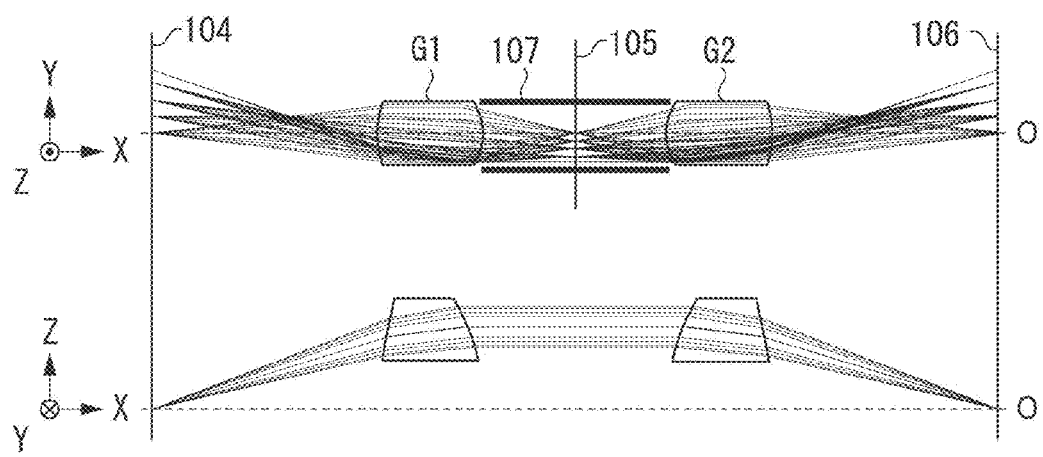
FIGS. 18A, 18B, and 18C are main array cross-sectional views and sub array cross-sectional views of lens optical systems according to the third exemplary embodiment.
Figure 18B:
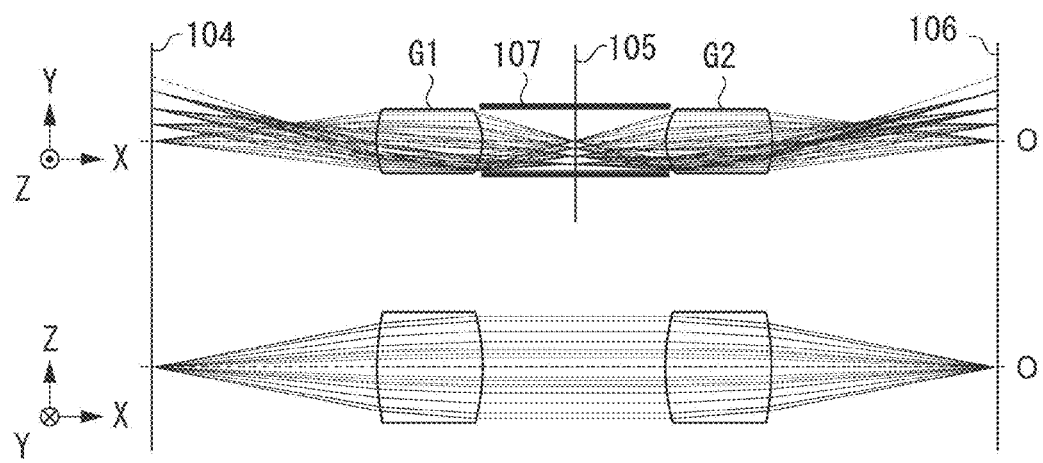
Figure 18C:
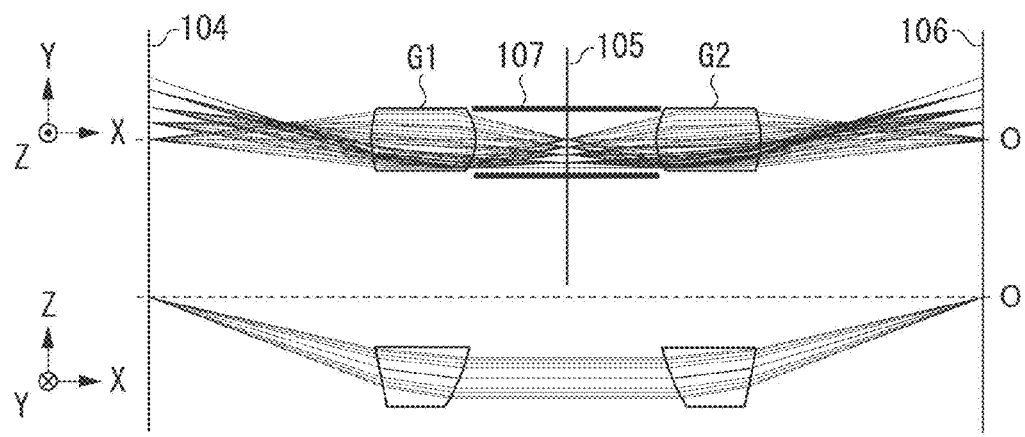

FIGS. 18A, 18B, and 18C illustrate a main array cross-sectional view (XY cross-sectional view) and a sub array cross-sectional view (ZX cross-sectional view) of a lens optical system constituting the top, middle, and bottom rows, respectively. As can be seen from FIGS. 18A, 18B, and 18C, the lens optical systems constituting the top, middle, and bottom rows have the same configuration in the main array cross section, but different configurations in the sub array cross section. The lens optical systems of the top and bottom rows, when seen in the sub array cross section, are symmetrically configured in the sub array direction about the optical axis O.

Like the first exemplary embodiment, imaging light fluxes including light fluxes emitted from the respective light emitting point positions A to C according to the present exemplary embodiment will be described.

The imaging light flux from the light emitting point position A (object plane position on the optical axis of a lens optical system of the middle row) includes a lens light flux of the lens optical system of the middle row with an object height of 0 (on the optical axis), two lens light fluxes of lens optical systems of the top row with an object height of $(\frac{1}{2})p$, and two lens light fluxes of lens optical systems of the bottom row with an object height of $(\frac{1}{2})p$. The imaging light flux from the light emitting point position B includes two lens light fluxes of lens optical systems of the middle row with an object height of $(\frac{1}{4})p$ and $(\frac{3}{4})p$, respectively, two lens light fluxes of lens optical systems of the top middle row with an object height of $(\frac{1}{4})p$ and $(\frac{3}{4})p$, respectively, and two lens light fluxes of lens optical systems of the bottom row with an object height of $(\frac{1}{4})p$ and $(\frac{3}{4})p$, respectively. The imaging light flux from the light emitting point position C includes two lens light fluxes of lens optical systems of the middle row with an object height of (½)p, a lens light flux of a lens optical system of the top row on the optical axis, and a lens light flux of a lens optical system of the bottom row on the optical axis.

That is, like the first exemplary embodiment, the numbers and types of lens light fluxes constituting the imaging light fluxes can be increased to average the imaging light fluxes in the respective light emitting point positions. In the present exemplary embodiment, the types of the lens light fluxes refer to not only different object heights but also different lens optical system rows emitting the lens light fluxes (referring to the top, middle, and bottom rows).

Figure 19:
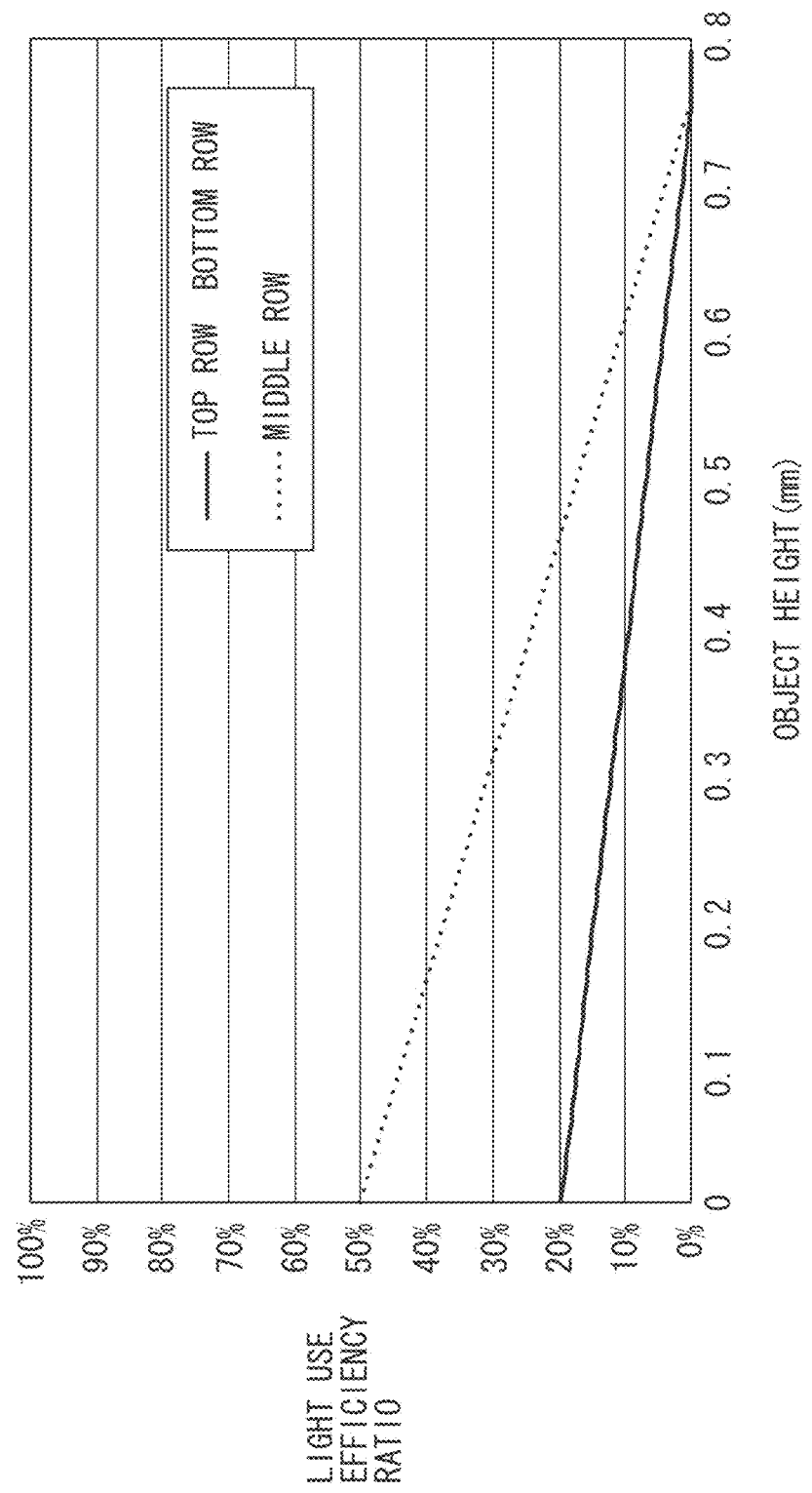
FIG. 19 is a chart illustrating the relationship between the object height and the light use efficiency ratio according to the third exemplary embodiment.
Figure 20A:
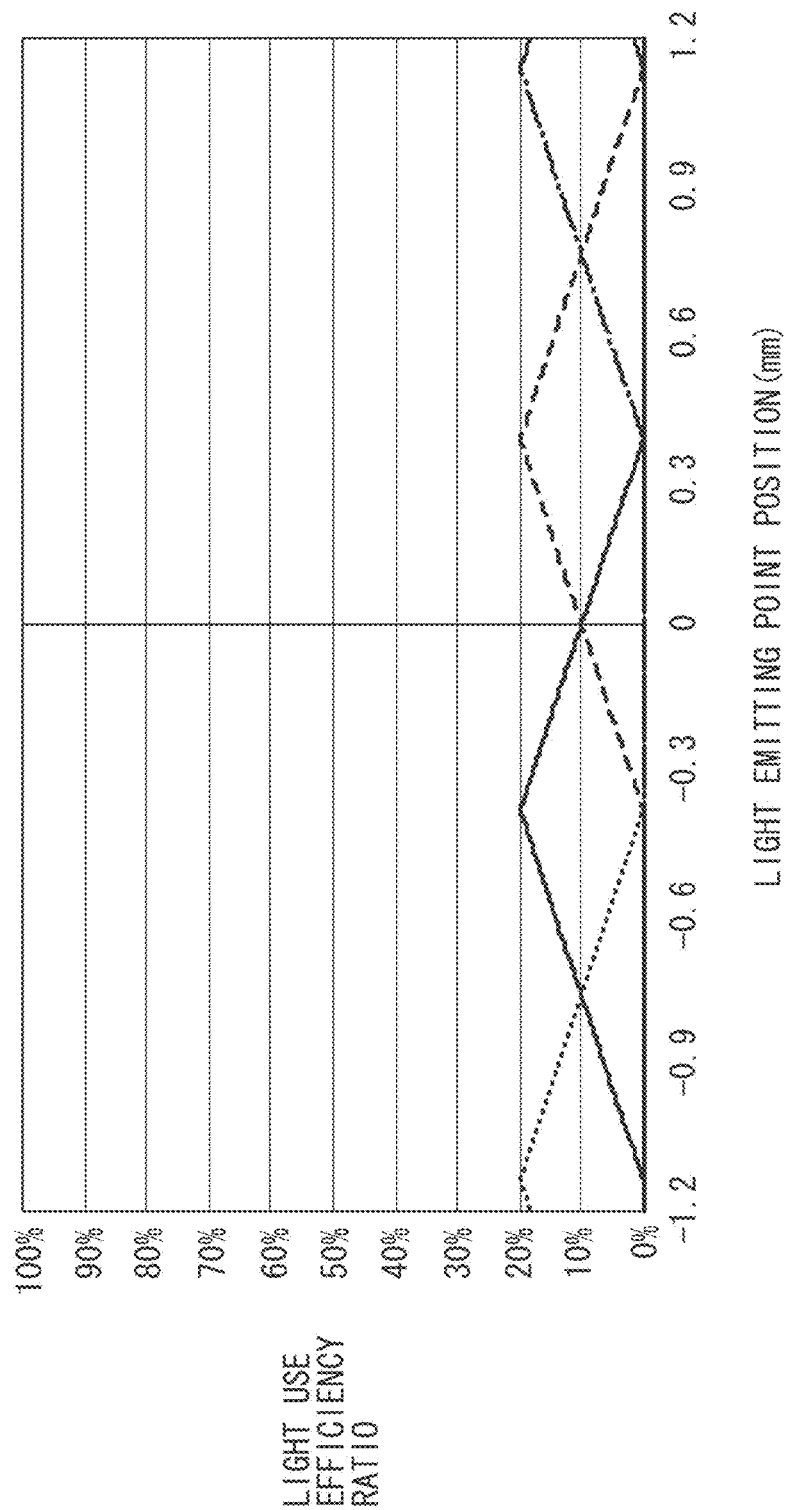
FIGS. 20A, 20B, and 20C are charts illustrating the relationship between the light emitting point position and the light use efficiency ratio according to the third exemplary embodiment.
Figure 20B:
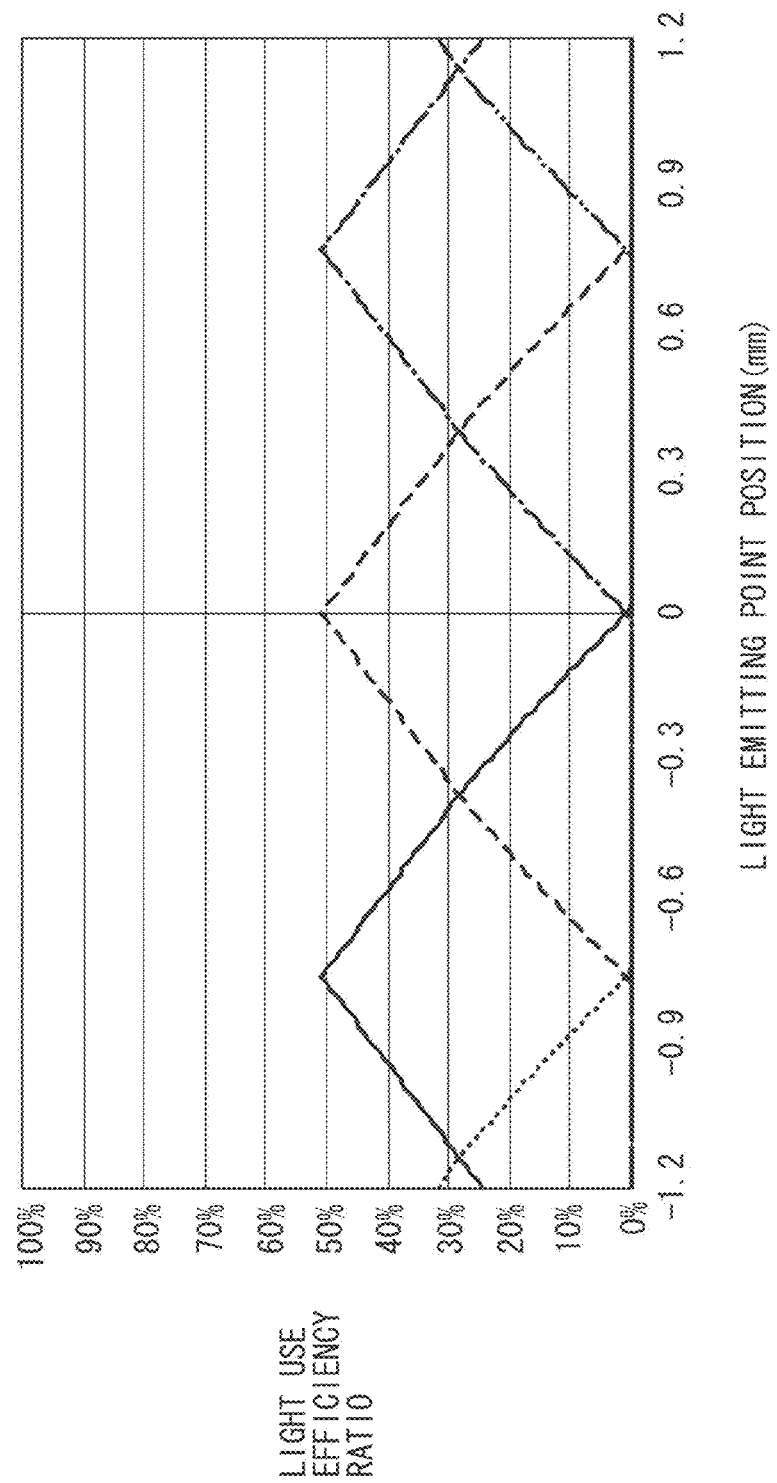
Figure 20C:
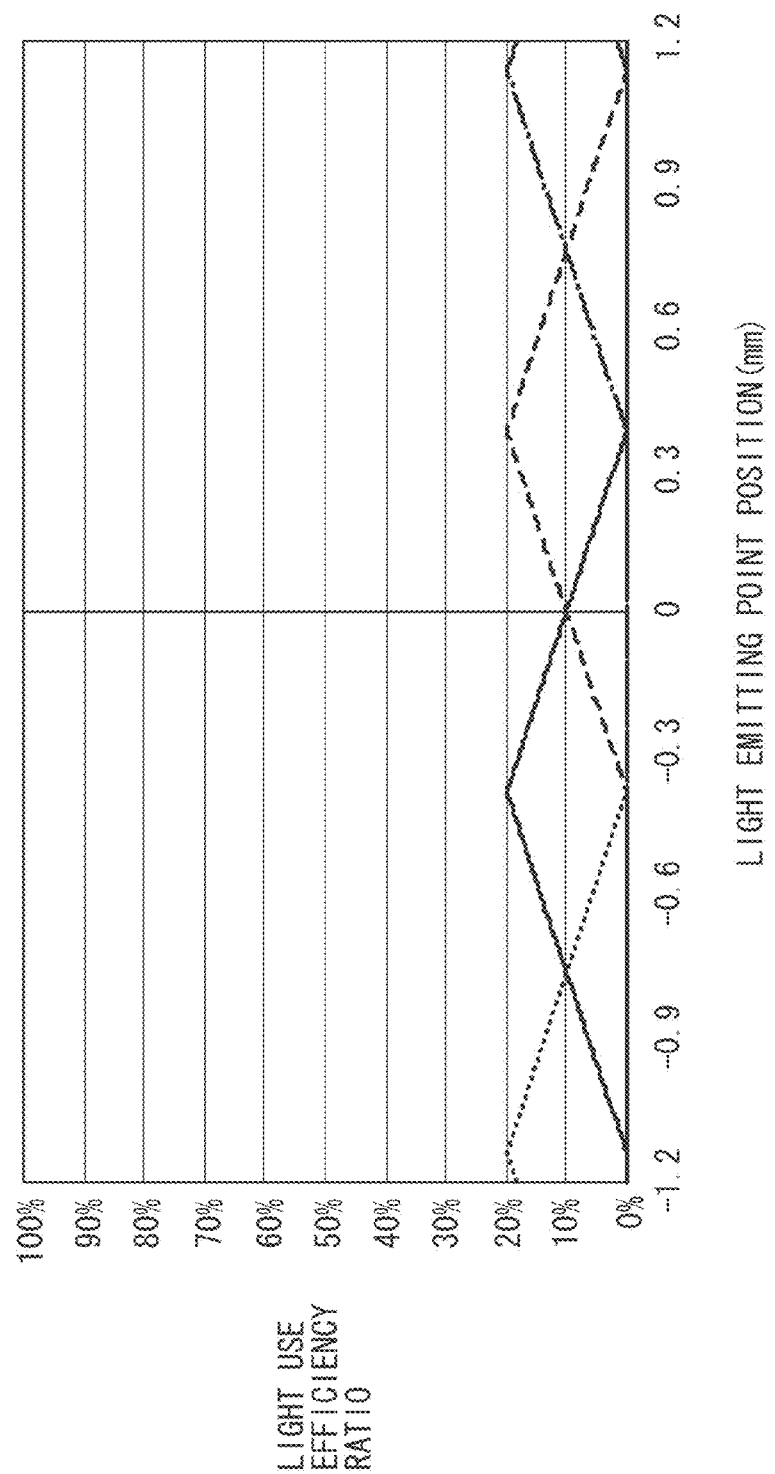

FIG. 19 illustrates the light use efficiency ratios of the lens optical systems of the top, middle, and bottom rows according to the present exemplary embodiment at each object height. The light use efficiency ratios of the present exemplary embodiment are scaled to the first exemplary embodiment (see FIG. 7). The lens optical systems of the top and bottom rows are symmetrically configured in the sub array direction, and have the same light use efficiency ratio at each object height. The lens optical systems of the top and bottom rows and those of the middle row have different configurations when seen in the sub array cross section, and are found to have largely different light use efficiency ratios at each object height. FIGS. 20A, 20B, and 20C illustrate the light use efficiency ratios of the top, middle, and bottom rows, respectively, at each light emitting point position. The distributions of the light use efficiency ratios are found to be shifted by the minimum distance $\Delta Y$ between the optical axes of the respective lens optical system rows.

Figure 21:
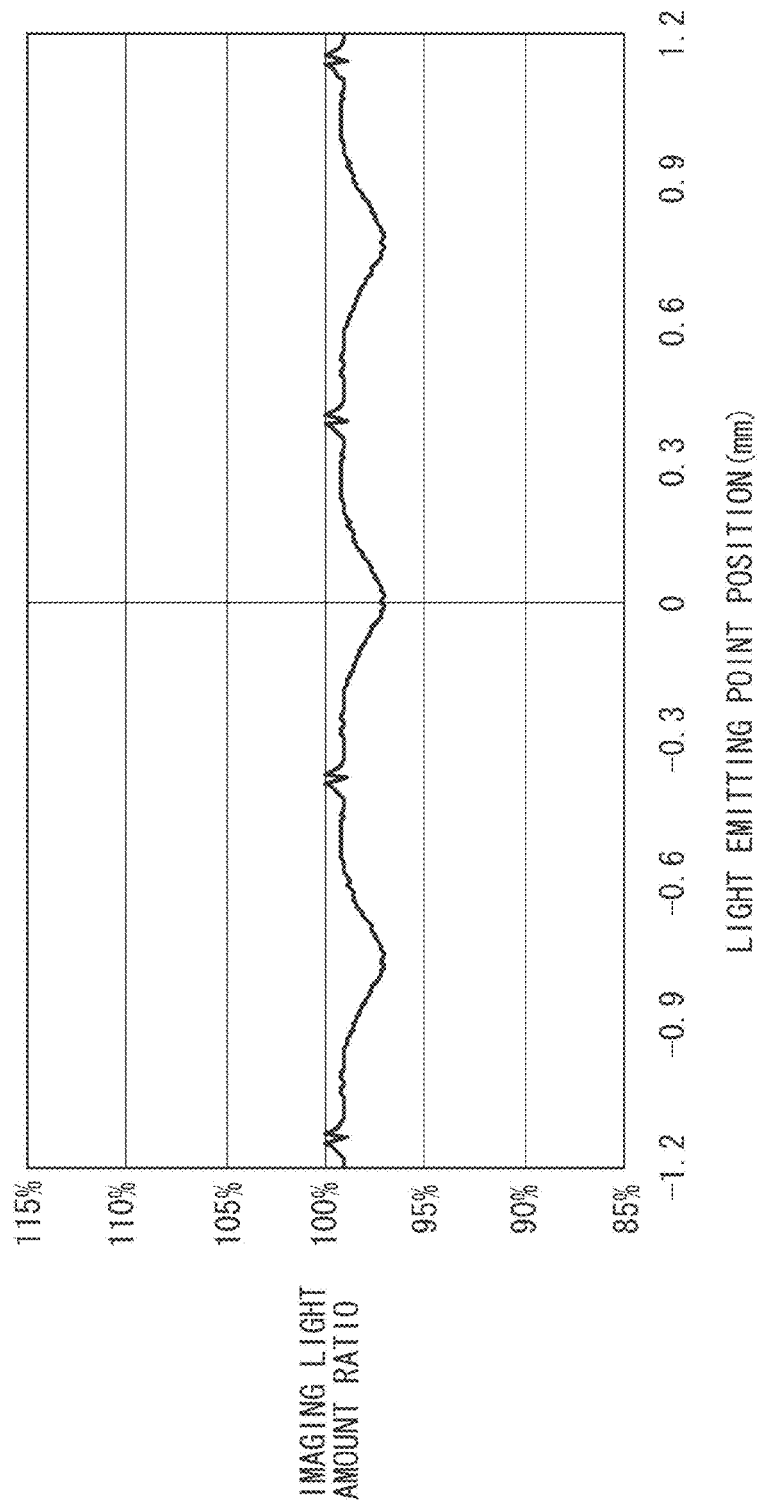
FIG. 21 is a chart illustrating the relationship between the light emitting point position and the imaging light amount ratio according to the third exemplary embodiment.

FIG. 21 illustrates the imaging light amount ratio at each light emitting point position according to the present exemplary embodiment. In the present exemplary embodiment, the maximum and minimum values of the imaging light amount ratio have a difference of 2.9%, which is smaller than that of the comparative example (6.2%) illustrated in FIG. 10. This shows that variations in the imaging light amount are smaller.

Figure 22A:
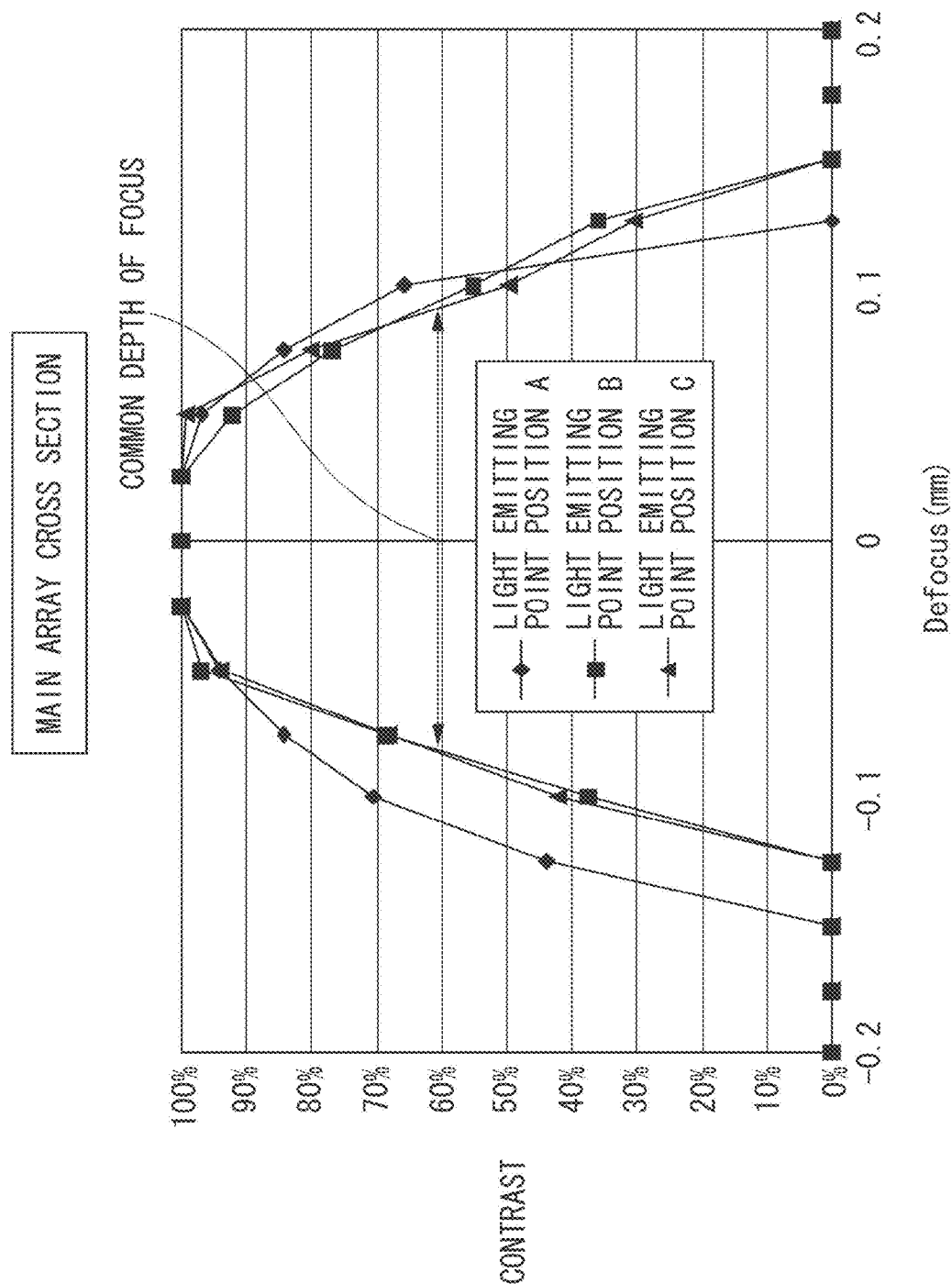
FIGS. 22A and 22B are charts illustrating the imaging performance of the imaging light fluxes from the respective light emitting point positions according to the third exemplary embodiment.
Figure 22B:
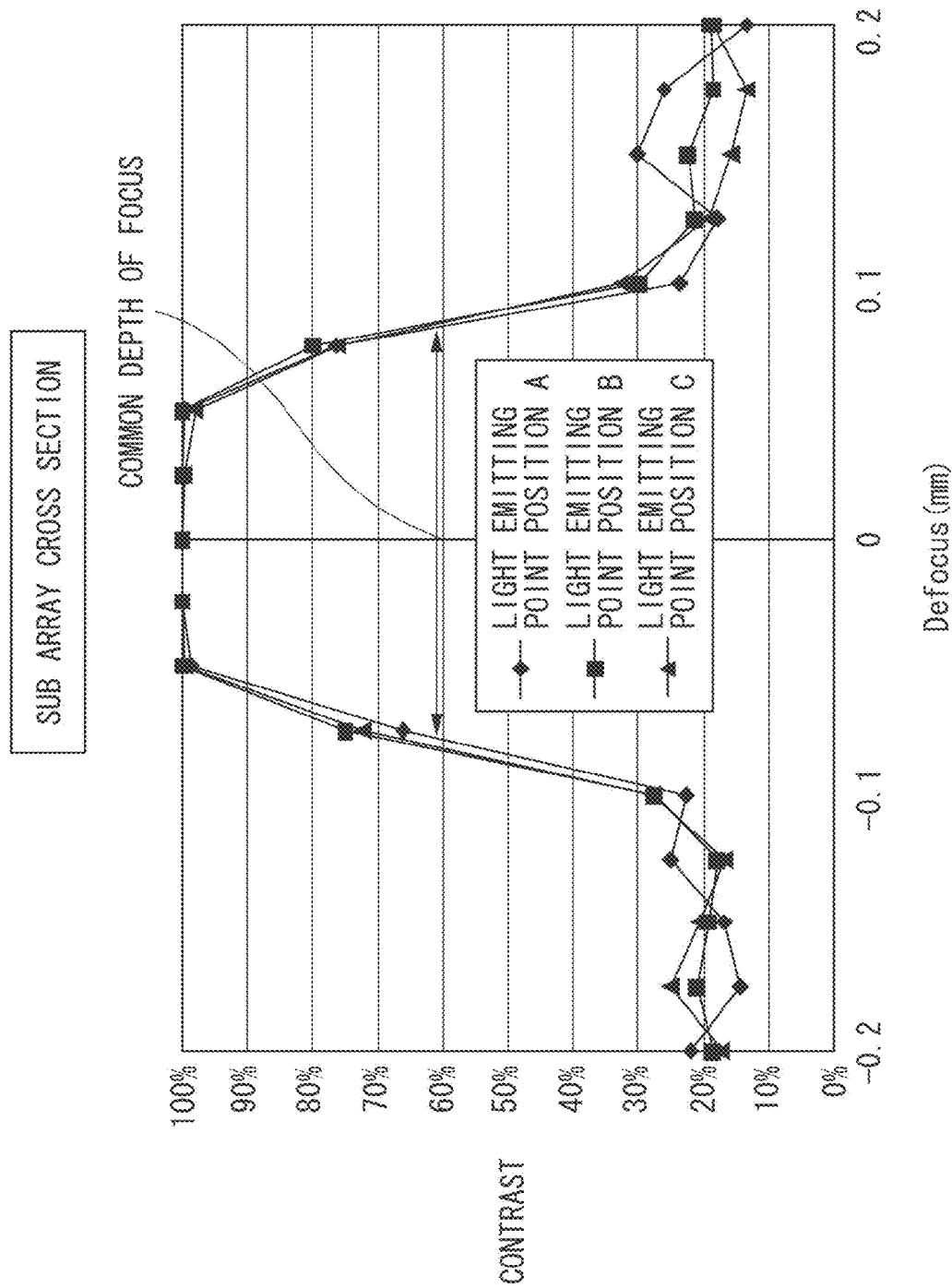

FIGS. 22A and 22B illustrate the imaging performance of the imaging light fluxes from the respective light emitting point positions A to C according to the present exemplary embodiment. A comparison with the comparative example (see FIGS. 12A and 12B) shows that the depths of focus of the light emitting point positions A to C vary less, and variations in the imaging performance are smaller. For contrast values of 60% and above, the common depth of focus in the main array cross section is 0.173 mm, which is found to be greater than the common depth of focus in the comparative example (0.160 mm).

In the imaging optical system according to the present exemplary embodiment, the numbers and types of lens light fluxes constituting the imaging light fluxes can be increased to average the imaging optical fluxes in the respective light emitting point positions. This provides the effect of reducing variations in the imaging light amount and the imaging performance.

As described above, the imaging optical system according to the present exemplary embodiment forms inverted imaging systems in the sub array cross section and uses the shifted arrangement. This can ensure compatibility between the imaging light amount and the imaging performance, and reduce variations in the imaging light amount and the imaging performance.

In the present exemplary embodiment, the number of lens optical system rows is k=3. The top, middle, and bottom rows have an array pitch p=0.76 mm. The minimum distance between the optical axis rows of the top and middle rows is $\Delta Y=(½)p$. The minimum distance between the optical axis rows of the middle and bottom rows is $\Delta Y=(½)p$. In the imaging optical system according to the present exemplary embodiment, the lens optical system rows are symmetrically arranged in the sub array direction about the optical axis rows. More specifically, the imaging optical system includes two combinations of similar lens optical system rows (the top and middle rows and the middle and bottom rows). That is, (n−1)=1 yields n=2. The combination of the top and middle rows and the combination of the middle and bottom rows both are found to satisfy expression (2), i.e., $p/4 \leq \Delta Y \leq 3p/4$. In other words, like the first exemplary embodiment, general peaks (and general bottoms) of variations of the imaging light amount and the imaging performance of the middle row with the light emitting point position and general bottoms (and general peaks) of those of the top and bottom rows can be cancelled out for a higher averaging effect.

A fourth exemplary embodiment of the present invention will be described below. The same or similar components to those of the first exemplary embodiment will be designated by the same reference numerals. A description thereof will be simplified or omitted.

Figure 23:
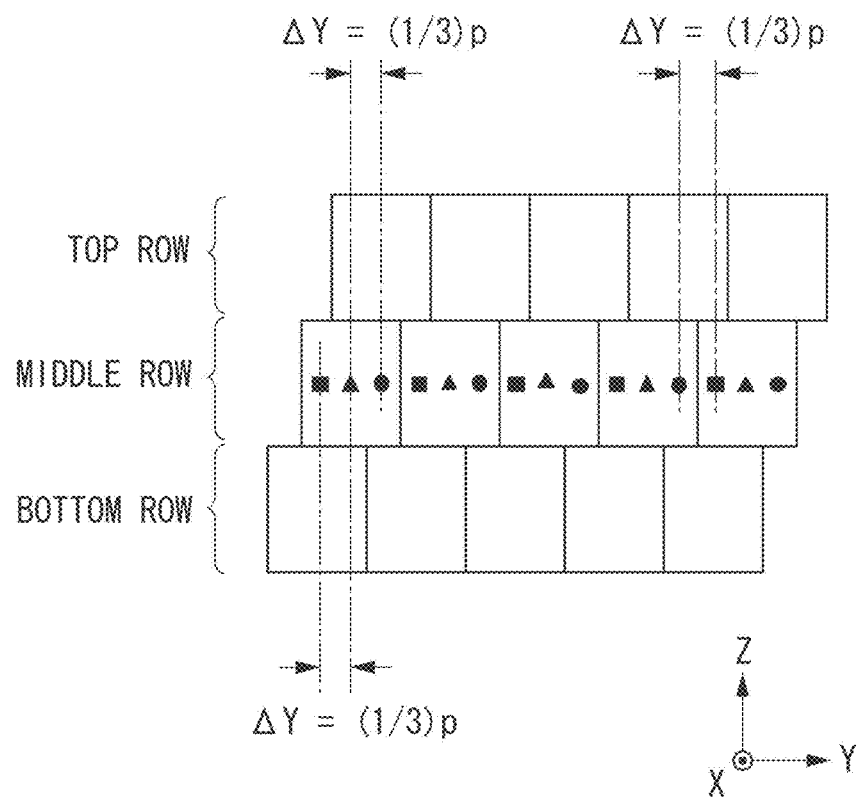
FIG. 23 is a front cross-sectional view of an imaging optical system according to a fourth exemplary embodiment.

FIG. 23 is a schematic diagram illustrating an imaging optical system according to the present exemplary embodiment. Like the third exemplary embodiment, the present exemplary embodiment includes three lens optical system rows arranged in the sub array direction. The present exemplary embodiment differs from the third exemplary embodiment in the ranges of the lens optical systems of the top, middle, and bottom rows in the Z direction and the minimum distance $\Delta Y$ between the optical axes. In FIG. 23, the optical axes of the lens optical systems of the top row are represented by filled circles (●), those of the lens optical systems of the middle row by filled triangles (▲), and those of the lens optical systems of the bottom row by filled squares (■). As can be seen from FIG. 23, the imaging optical system according to the present exemplary embodiment is configured so that the optical axis rows of all the lens optical systems of the top, middle, and bottom rows are located on the same line.

In FIG. 23, suppose that the optical axis rows are located at Z=0. The lens surfaces of the bottom row lie in the range of Z=−1.22 mm to −0.41 mm. The lens surfaces of the middle row lie in the range of Z=−0.41 mm to 0.41 mm. The lens surfaces of the top row lie in the range of Z=0.41 mm to 1.22 mm. Without the shifted arrangement, the imaging optical system according to the present exemplary embodiment and the imaging optical system 102 according to the first exemplary embodiment have the same optical design values including the surface shapes of the lens optical systems. The top, middle, and bottom lens optical system rows all have an array pitch p=0.76 mm in the main array direction.

With reference to the optical axis of a lens optical system of the bottom row, the distance $\Delta Y$ to the optical axis of a lens optical system of the top row (bottom row) closest to the optical axis in the main array direction is $(⅓)p$ (=0.253 mm). Similarly, with reference to the optical axis of a lens optical system of the bottom row, the minimum distance $\Delta Y$ to the optical axis of a lens optical axis of the top row closest to the optical axis is $(⅓)p$ (=0.253 mm). Table 5 shows such array design values.

TABLE 5

| | Top row | Middle row | Bottom row |
| --- | --- | --- | --- |
| Range of Z (mm) | 1.22 to 0.41 | 0.41 to −0.41 | −0.41 to −1.22 |
| Array pitch p (mm) | 0.76 | 0.76 | 0.76 |

TABLE 5-continued

| | Top row | Middle row | Bottom row |
|---|---|---|---|
| ΔY (top - middle) (mm) | 0.253 | | |
| ΔY (middle - bottom) (mm) | 0.253 | | |
| ΔY (top - bottom) (mm) | 0.253 | | |

Figure 24A:
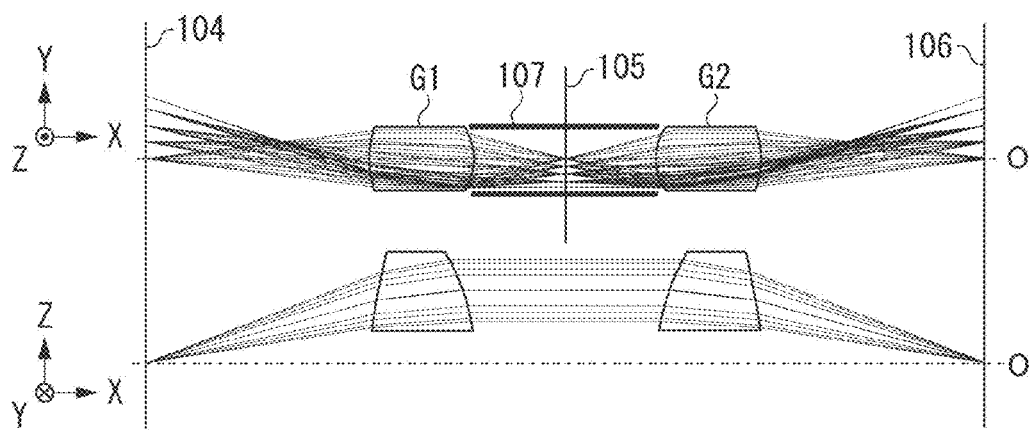
FIGS. 24A, 24B, and 24C are main array cross-sectional views and sub array cross-sectional views of lens optical systems according to the fourth exemplary embodiment.
Figure 24B:
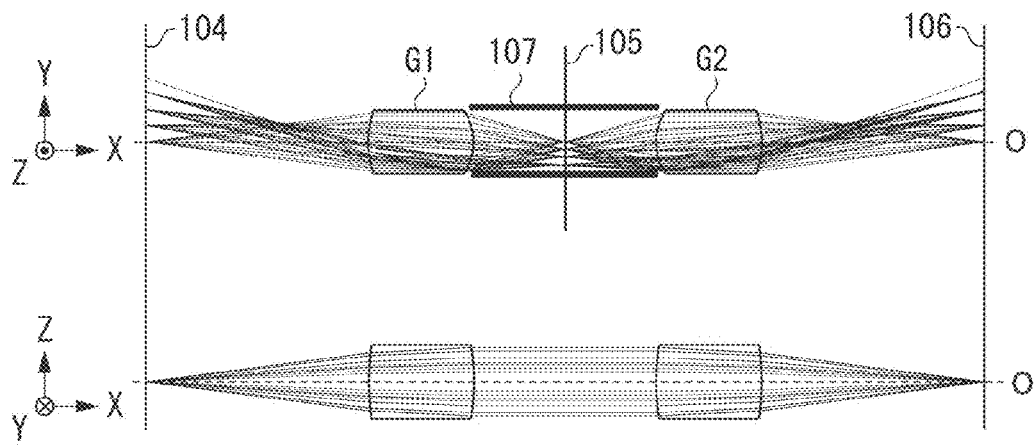
Figure 24C:
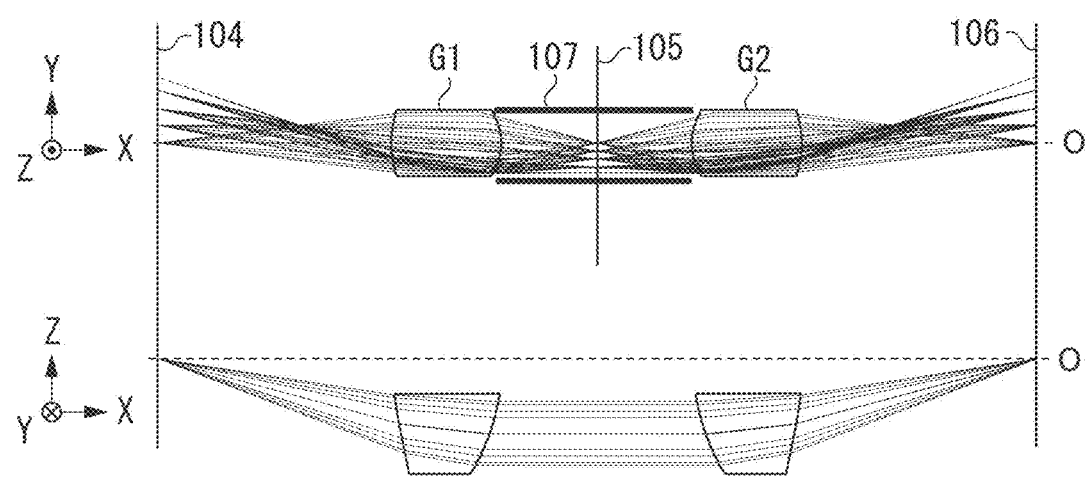

FIGS. 24A, 24B, and 24C illustrate a main array cross-sectional view (XY cross-sectional view) and a sub array cross-sectional view (ZX cross-sectional view) of a lens optical system constituting the top, middle, and bottom rows, respectively. As can be seen from FIGS. 24A, 24B, and 24C, the lens optical systems constituting the top, middle, and bottom rows have the same configuration in the main array cross section, but different configurations in the sub array cross section. In the sub array cross section, the lens optical systems constituting the top and bottom rows are symmetrically arranged in the sub array direction about the optical axis O.

Like the first exemplary embodiment, imaging light fluxes including light fluxes emitted from the respective light emitting point positions A to C according to the present exemplary embodiment will be described.

The imaging light flux from the light emitting point position A (object plane position on the optical axis of a less optical system of the middle row) includes a lens flux of the lens optical system of the middle row with an object height of 0 (on the optical axis), two lens light fluxes of lens optical systems of the top row with an object height of (⅓) p and (⅔)p, respectively, and two lens light fluxes of lens optical systems of the bottom row with an object height of (⅓)p and (⅔)p, respectively. The imaging light flux from the light emitting point position B includes two lens light fluxes of lens optical systems of the middle row with an object height of (¼)p and (¾)p, respectively, two lens light fluxes of lens optical systems of the top row with an object height of (¹/₁₂)p and (¹¹/₁₂)p, respectively, and two lens light fluxes of lens optical systems of the bottom row with an object height of (⁵/₁₂)p and (⁷/₁₂)p, respectively. The imaging light flux from the light emitting point position C includes two lens light fluxes of lens optical systems of the middle row with an object height of (½)p, two lens light fluxes of lens optical systems of the top row with an object height of (⅙)p and (⅚)p, respectively, and two lens light fluxes of lens optical systems of the bottom row with an object height of (⁵/₁₂)p and (⅙)p, respectively.

That is, like the first exemplary embodiment, the numbers and types of lens light fluxes constituting the imaging light fluxes can be increased to average the imaging light fluxes in the respective light emitting point positions.

Figure 25:
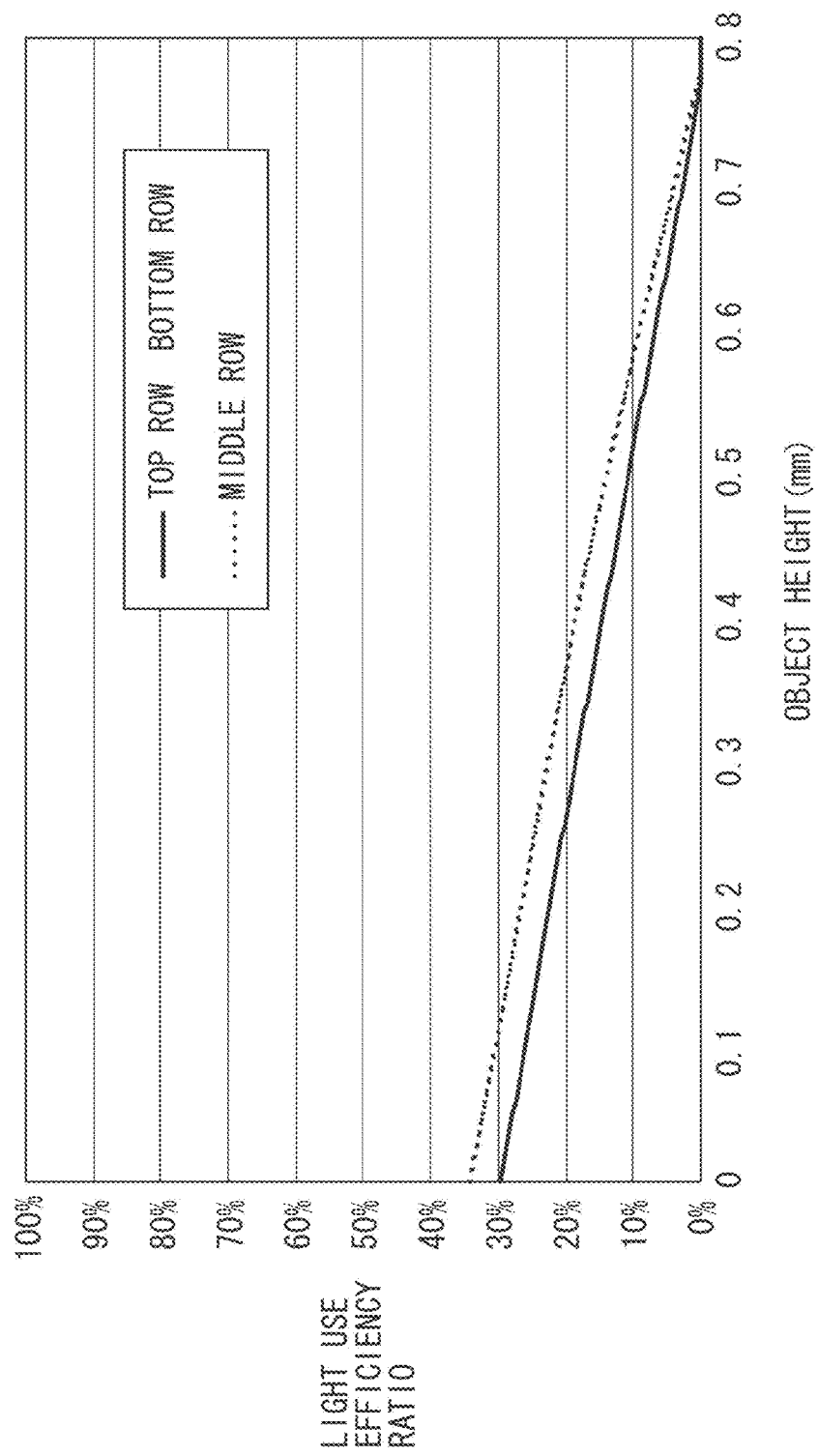
FIG. 25 is a chart illustrating the relationship between the object height and the light use efficiency ratio according to the fourth exemplary embodiment.
Figure 26A:
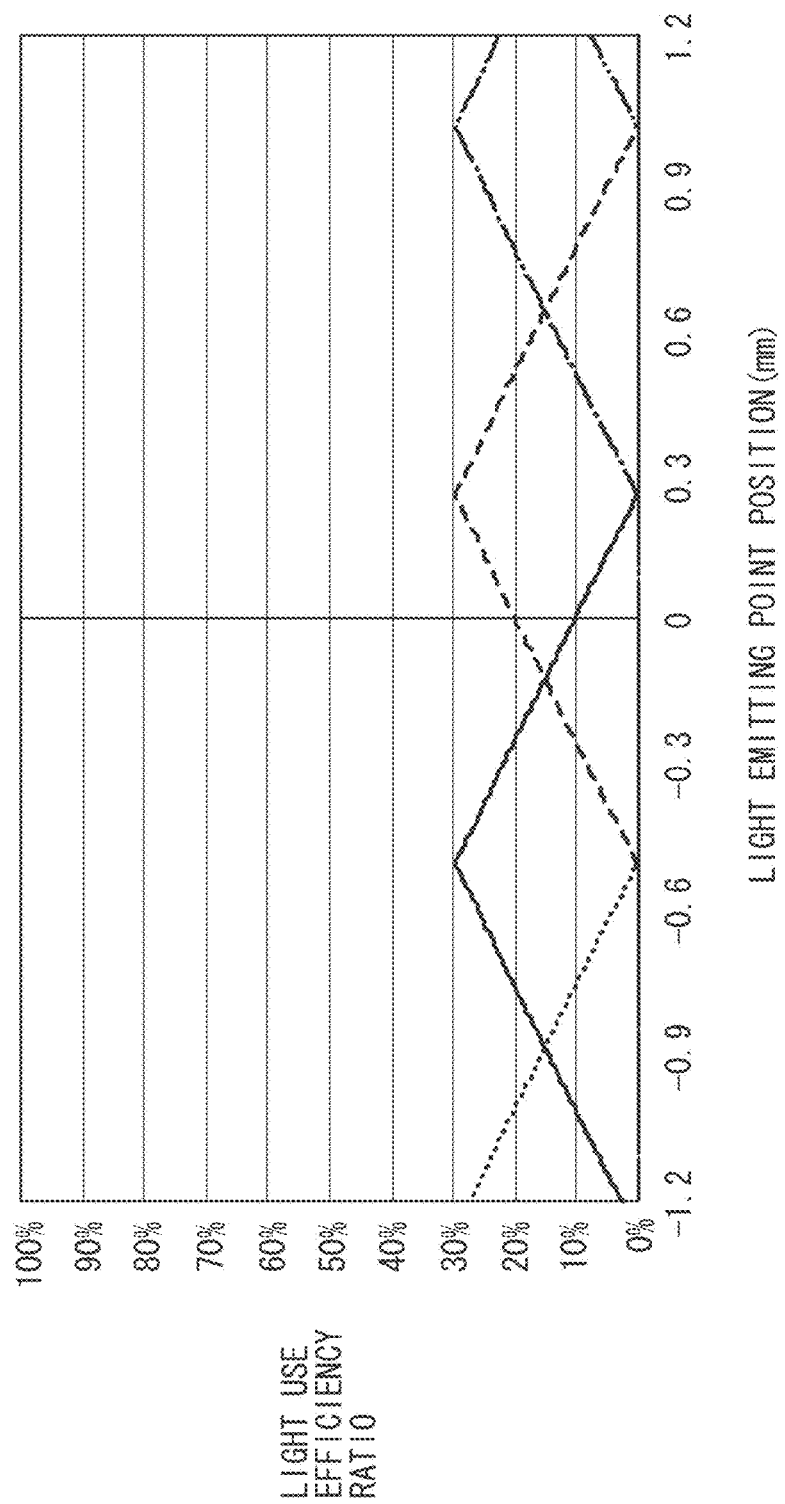
FIGS. 26A, 26B, and 26C are charts illustrating the relationship between the light emitting point position and the light use efficiency ratio according to the fourth exemplary embodiment.
Figure 26B:
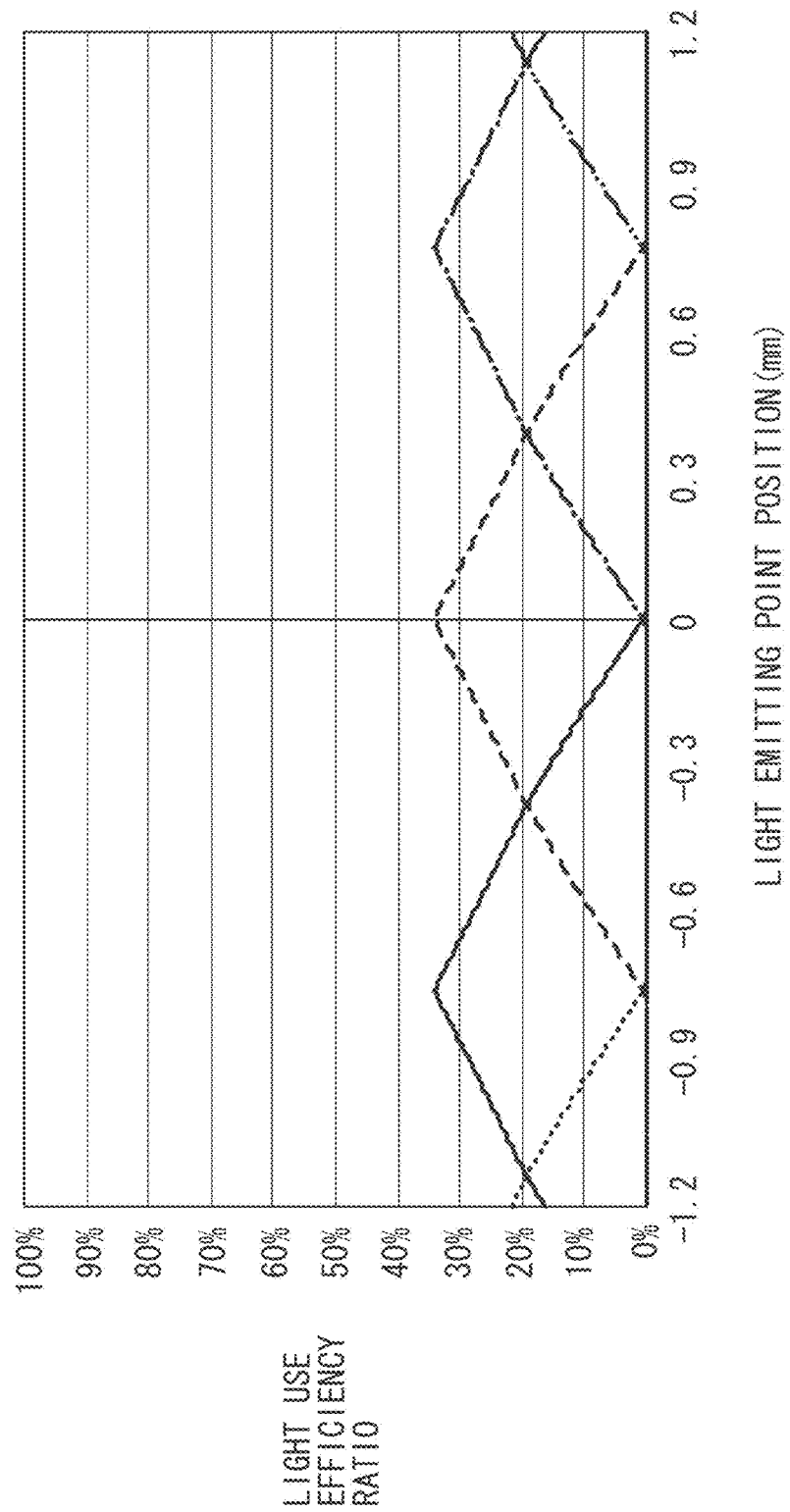
Figure 26C:
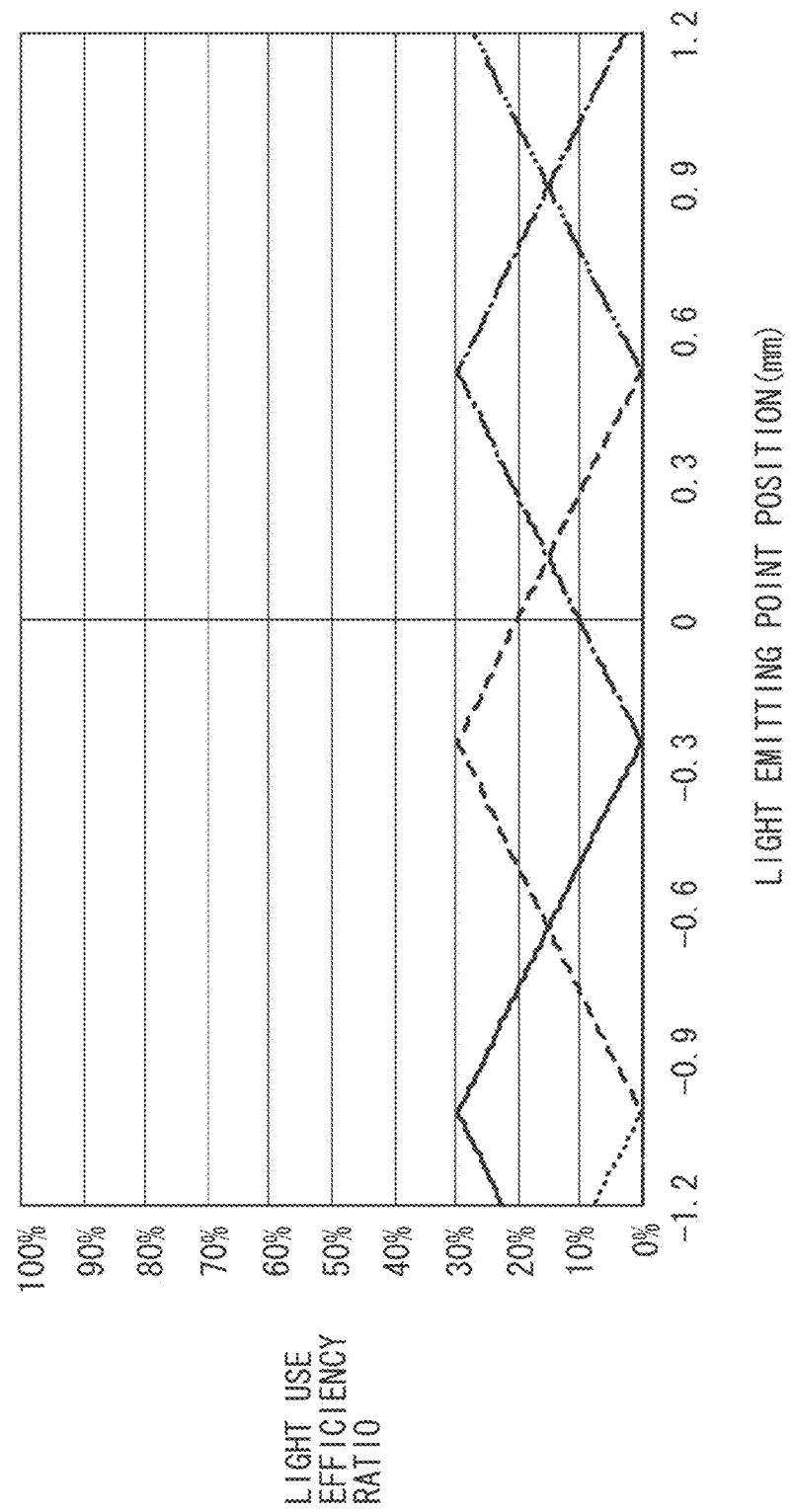

FIG. 25 illustrates the light use efficiency ratios of the lens optical systems of the top, middle, and bottom rows according to the present exemplary embodiment at each object height. The light use efficient ratios according to the present exemplary embodiment are also scaled to the first exemplary embodiment (see FIG. 7). The lens optical systems of the top and bottom rows are symmetrically configured in the sub array direction, and have the same light use efficiency ratio at each optical height. The top and bottom rows and the middle row are found to have largely different light use efficiency ratios at each object height. FIGS. 26A, 26B, and 26C illustrate the light use efficiency ratios of the top, middle, and bottom rows at each light emitting point position, respectively. The distributions of the light use efficiency ratios are found to be shifted from each other by the minimum distance ΔY between the optical axes of the respective lens optical system rows.

Figure 27:
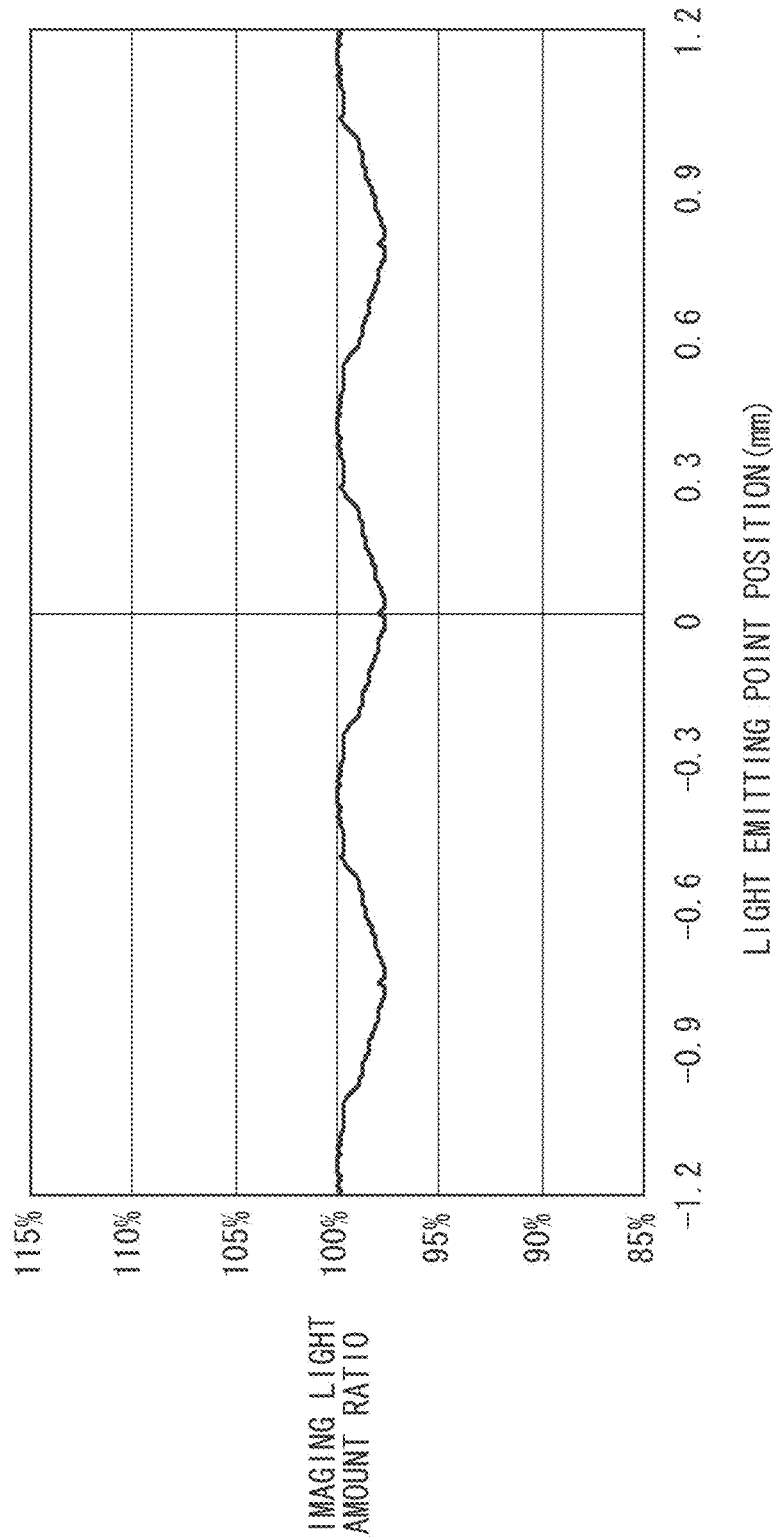
FIG. 27 is a chart illustrating the relationship between the light emitting point position and the imaging light amount ratio according to the fourth exemplary embodiment.

FIG. 27 illustrates the imaging light amount at each light emitting point position according to the present exemplary embodiment. In the present exemplary embodiment, the maximum and minimum values of the imaging light amount have a difference of 2.4%, which is smaller than that of the comparative example (6.2%) illustrated in FIG. 10. This shows that variations in the imaging light amount are smaller.

Figure 28A:
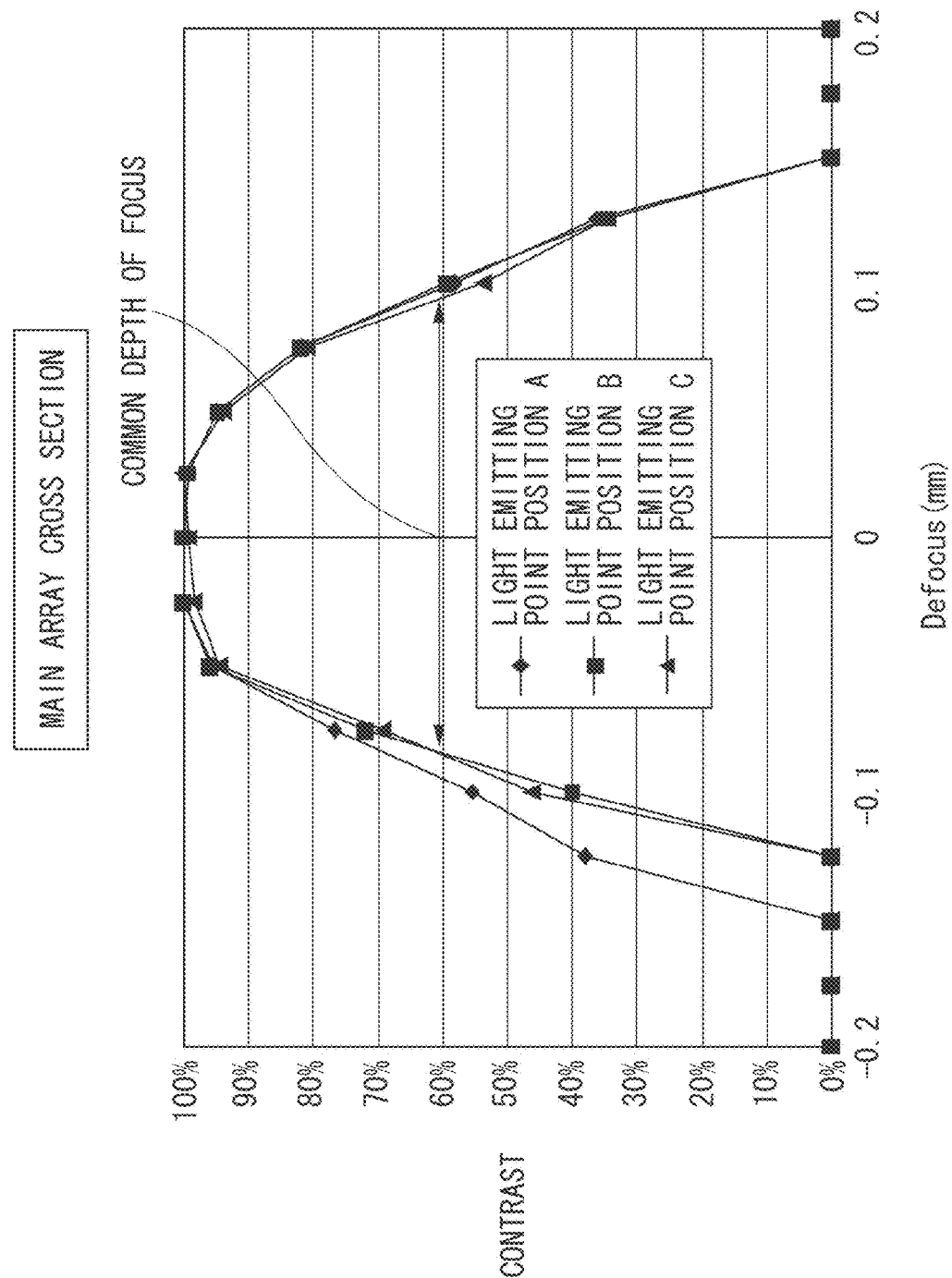
FIGS. 28A and 28B are charts illustrating the imaging performance of the imaging light fluxes from the respective light emitting point positions according to the fourth exemplary embodiment.
Figure 28B:
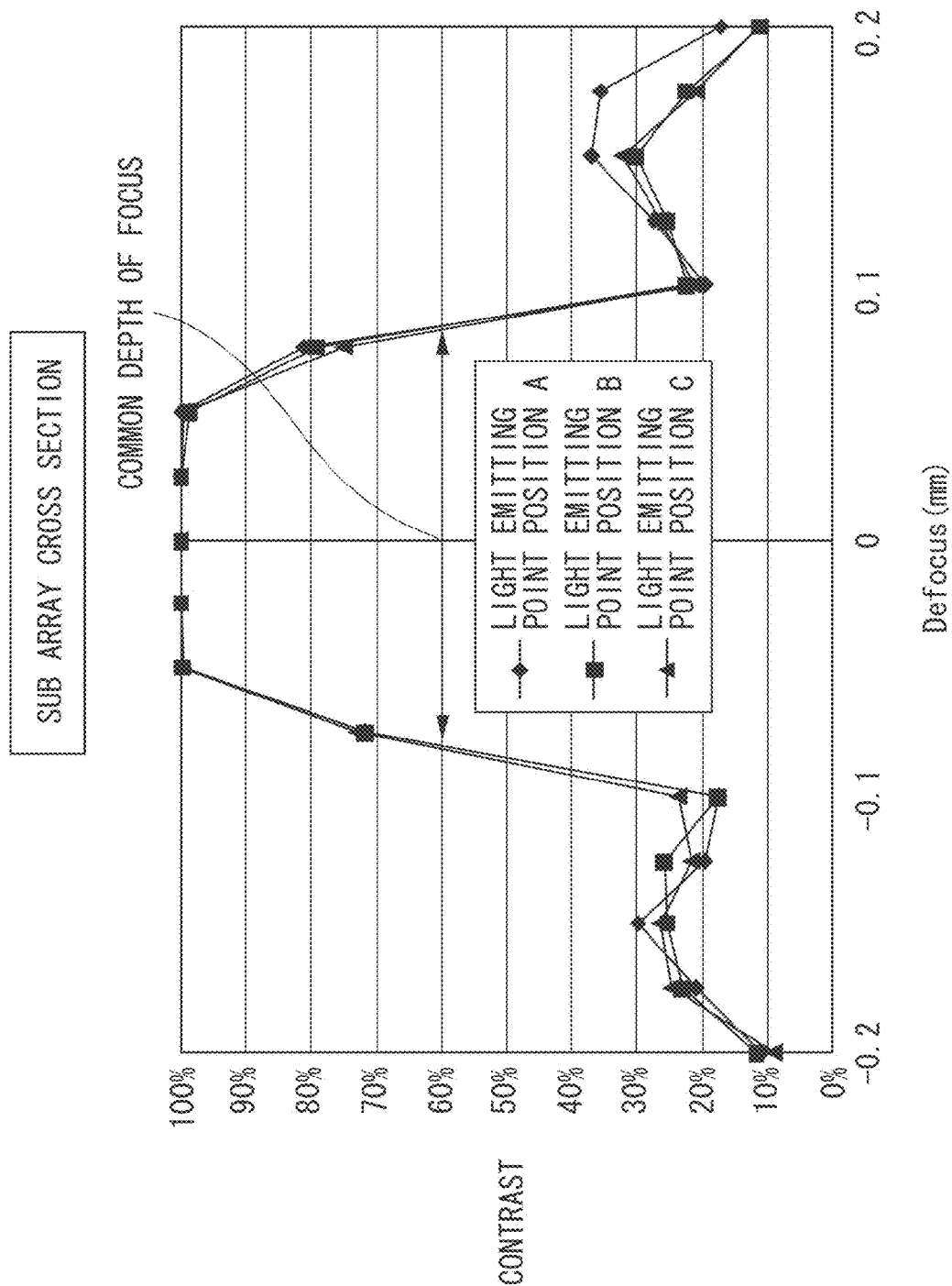

FIGS. 28A and 28B illustrate the imaging performance of the imaging light fluxes from the respective light emitting point positions A to C according to the present exemplary embodiment. A comparison with the comparative example (see FIGS. 12A and 12B) shows that the depths of focus of the light emitting point positions A to C vary less, and variations in the imaging performance are smaller. For contrast values of 60% and above, the common depth of focus in the main array cross section is 0.179 mm, which is found to be greater than the common depth of focus (0.160 mm) according to the comparative example.

In the imaging optical system according to the present exemplary embodiment, the numbers and types of lens light fluxes constituting the imaging light fluxes can be increased to average the imaging light fluxes in the respective light emitting point positions. This provides the effect of reducing variations in the imaging light amount and the imaging performance.

As described above, the imaging optical system according to the present exemplary embodiment forms inverted imaging systems in the sub array cross section and uses the shifted arrangement. This can ensure compatibility between the imaging light amount and the imaging performance, and reduce variations in the imaging light amount and the imaging performance.

In the foregoing first and second exemplary embodiments, general peaks (and general bottoms) and general bottoms (and general peaks) of variations of the imaging light amount and the imaging performance of the lens optical system rows with the light emitting point position are cancelled out to provide a higher averaging effect. More specifically, a single combination of lens optical system rows (top and bottom rows) is used to average variations in the imaging light amount and the imaging performance. In the imaging optical system according to the third exemplary embodiment, the lens optical system rows are symmetrically arranged in the sub array direction about the optical axis rows, so that the optical axis rows of the top and bottom rows coincide with each other in the main array direction. In other words, the imaging optical system includes two combinations of similar lens optical system rows (the top and middle rows and the middle and bottom rows). In each of the combinations of the top and middle rows and the middle and bottom rows, general peaks (and general bottoms) and general bottoms (and general peaks) are cancelled out as in the first and second exemplary embodiments, whereby variations in the imaging light amount and the imaging performance are averaged.

In the present exemplary embodiment, the lens optical system rows are asymmetrically arranged in the sub array direction about the optical axis rows. The optical axes of the top and bottom rows are separate from one another in the main array direction. In other words, the top and middle rows and the middle and bottom rows average variations in the imaging light amount and the imaging performance by using two different combinations of lens optical system rows ((n−1)=2 yields n=3). Like the present exemplary embodiment, a configuration including three or more lens optical system rows may cancel general peaks (and general bottoms) of a lens optical system row (corresponding to the middle row in the present exemplary embodiment) by summing up two other lens optical system rows (corresponding to the top and bottom rows in the present exemplary embodiment).

In the present exemplary embodiment, the optical axis rows of the top and middle rows have a minimum distance $\Delta Y=(\frac{1}{3})p$. The optical axis rows of the middle and bottom rows have a minimum distance $\Delta Y=(\frac{1}{3})p$. The optical axis rows of the bottom and top rows have a minimum distance $\Delta Y=(\frac{1}{3})p$. That is, in the present exemplary embodiment, the minimum distance between the optical axes is set to $\Delta Y=(\frac{1}{3})p$. Such a setting enables the configuration including the two different combinations of lens optical system rows to provide a higher averaging effect. In the present exemplary embodiment, the number of lens optical system rows is k=3. The top, middle, and bottom rows have an array pitch p=0.76 mm. The combinations of the lens optical system rows are found to satisfy expression (2) for n=3, i.e., $p/6 \leq \Delta \leq Y$ p/2. The configuration satisfying the foregoing expression (2) provides the effect of significantly reducing variations in the imaging light amount and the imaging performance.

The imaging optical system according to an exemplary embodiment of the present invention has only to include at least two lens optical system rows, and is not limited to the configurations including two or three lens optical system rows as described in the foregoing exemplary embodiments. For example, a configuration including four lens optical system rows or more can provide the effects of an exemplary embodiment of the present invention. Note that the simplest configuration for providing effects of an exemplary embodiment of the present invention is one including two lens optical system rows. Such a simplest configuration is advantageous in terms of formability and assemblability. The foregoing description has dealt with the imaging optical systems in which the lens optical system rows include the same lens optical systems. However, the lens optical systems constituting the lens optical system rows need not be the same ones. For examples, the top row and the bottom row may include respective different lens optical systems.

The exemplary embodiments have dealt with the cases where the lens optical systems in each of the lens optical system rows of the imaging optical system have the same array pitch. However, the lens optical system rows may have different array pitches. The exemplary embodiments have also dealt with the cases where adjoining lens optical system rows satisfy the foregoing expression (2). However, a configuration in which lens optical system rows not adjoining each other satisfy expression (2) can also provide the foregoing effects. For example, suppose that an imaging optical system includes three or more lens optical system rows, one or some of which has/have a different array pitch of lens optical systems from that of the other lens optical system rows. In such a configuration, the foregoing effects can be obtained if any two lens optical system rows having the same array pitch satisfy expression (2).

In the first and second exemplary embodiments, the lens optical systems constituting the lens optical system rows are each shaped like a lens optical system cut by the main array cross section including the optical axis. However, an exemplary embodiment of the present invention is not limited thereto. The lens optical systems may have a shape cut by any plane. In the exemplary embodiments, the lens optical systems are symmetrical in the optical array direction about their optical axis. Lens optical systems asymmetrical about their optical axis can also provide the effects of an exemplary embodiment of the present invention. The lens optical systems are each configured so that the first and second optical systems are optically symmetrical about the intermediate imaging plane. The lens optical systems are not limited to such a configuration as long as the requirements of an exemplary embodiment of the present invention are satisfied.

In the exemplary embodiments, the lens optical system rows have the same array pitch p. However, the effects of an exemplary embodiment of the present invention can be obtained even if the lens optical system rows have respective different array pitches. The lens optical system rows are arranged so that their ranges in the Z direction do not overlap each other. However, the lens optical system rows may be arranged so that their ranges in the Z direction overlap in part. The lens optical systems according to the exemplary embodiments constitute erect equal-magnification imaging systems in the main array cross section. However, the lens optical systems need not be configured as strictly equal-magnification ones as long as the effects of an exemplary embodiment of the present invention can be obtained. In the sub array cross section, the lens optical systems may be expanding systems.

In the exemplary embodiments, the optical axis rows are located on a lens optical system row or rows (in the first and second exemplary embodiments, on the border between the top and bottom rows; in the third and fourth exemplary embodiments, on the middle row). However, the effects of an exemplary embodiment of the present invention can be obtained even if the optical axis rows are not located on a lens optical system row.

The foregoing exemplary embodiments have dealt with the configurations where the optical axes of the lens optical system rows are located on the same line. The optical axes are defined to be on the same line if the following conditional expression (4) is satisfied:

$$\Delta < (\tfrac{1}{2})H \qquad (4)$$

where H is the size of the light emitting point of each light emitting unit of the image forming apparatus in the sub array direction, and $\Delta$ is the maximum amount of separation between the optical axis rows of the lens optical system rows in the sub array direction.

If the amount of separation between the optical axes in the sub array direction falls within the range of the foregoing conditional expression (4), the images of the lens optical system rows remain not separate from one another, in which case the effects of an exemplary embodiment of the present invention can be sufficiently obtained. An image reading apparatus may include a plurality of light receiving units (line sensor). Such an image reading apparatus may be configured to satisfy conditional equation (4), where H is the size of a light receiving surface (sensor surface) of each light receiving unit in the sub array direction. In the present exemplary embodiment, the light emitting points of the light emitting units each have a size H of 25.3 μm in the sub array direction. The effects of an exemplary embodiment of the present invention can be sufficiently obtained if the maximum amount of separation $\Delta$ between the optical axes of all the lens optical systems in the sub array direction is smaller than $(\frac{1}{2})H=(\frac{1}{2})\times 25.3$ μm=12.7 μm.

[Image Forming Apparatus]

FIG. 1A is a schematic diagram (ZX cross-sectional view) illustrating essential components of an image forming apparatus 5 according to an exemplary embodiment of the present invention. The image forming apparatus 5 includes the exposure unit 1. The exposure unit 1 includes an imaging optical system according to any one of the foregoing exemplary embodiments. The exposure unit 1 is arranged so that the sub array direction of the imaging optical system coincides with a sub scanning direction (Z direction) that is a rotation direction of a photosensitive drum 2. The application of the imaging optical system to the image forming apparatus 5 according to the present exemplary embodiment can reduce the size and cost of the entire image forming apparatus 5 as compared to when an optical scanning unit is used.

As illustrated in FIG. 1A, an external device 15 such as a personal computer inputs code data Dc to the image forming apparatus 5. The image forming apparatus 5 includes a printer controller 10, which converts the code data Dc into image data (dot data) Di. The image data Di is input to the exposure unit 1 which includes the imaging optical system according to any one of the foregoing exemplary embodiments. The exposure unit 1 emits exposure light 14 that is modulated according to the image data Di. A photosensitive surface of the photosensitive drum 2 is exposed by the exposure light 4. The printer controller 10 not only converts the data but also controls the components of the image forming apparatus 5 such as a motor 13.

The motor 13 rotates the photosensitive drum 2 serving as an electrostatic latent image bearing member (photosensitive member) clockwise. With the rotation, the photosensitive surface of the photosensitive drum 2 moves in the sub scanning direction with respect to the exposure light 4. A charging roller 3 for uniformly charging the surface of the photosensitive drum 2 is arranged above the photosensitive drum 2, in contact with the surface of the photosensitive drum 2. The exposure light 4 from the exposure unit 1 successively forms an image in the sub scanning direction on the surface of the photosensitive drum 2 charged by the charging roller 3.

As described above, the exposure light 4 is modulated based on the image data Di. The irradiation of the exposure light 4 forms an electrostatic latent image on the surface of the photosensitive drum 2. A developing device 6 is arranged downstream of the irradiation position of the exposure light 4 in the rotation direction of the photosensitive drum 2, in contact with the photosensitive drum 2. The developing device 6 develops the electrostatic latent image into a toner image.

A transfer device (transfer roller) 7 is arranged below the photosensitive drum 2 and opposed to the photosensitive drum 2. The transfer device 7 transfers the toner image developed by the developing device 6 to a sheet 11 serving as a transfer material. Sheets 11 are stored in a sheet cassette 8 in front of (in FIG. 1A, on the right of) the photosensitive drum 2. Sheets 11 may be manually fed. A feeding roller 9 is arranged at an end of the sheet cassette 8. The feeding roller 9 feeds a sheet 11 in the sheet cassette 8 into a conveyance path.

The sheet 11 to which the unfixed toner image is transferred as described above is further conveyed to a fixing device behind (in FIG. 1, on the left of) the photosensitive drum 2. The fixing device includes a fixing roller 12 and a pressure roller 14. The fixing roller 12 includes a fixing heater (not illustrated) inside. The pressure roller 14 is pressed into contact with the fixing roller 12. The fixing device fixes the unfixed toner image on the sheet 11 conveyed from the transfer device 7 by pressing and heating the sheet 11 in the pressing portion between the fixing roller 12 and the pressure roller 14. A discharge roller (not illustrated) is further arranged behind the fixing roller 12. The discharge roller discharges the fixed sheet 11 to outside the image forming apparatus 5.

[Color Image Forming Apparatus]

FIG. 1B is a schematic diagram (ZX cross-sectional view) illustrating essential components of a color image forming apparatus 33 according to an exemplary embodiment of the present invention. As illustrated in FIG. 1B, the color image processing apparatus 33 is a color image processing apparatus of tandem type in which four exposure units are juxtaposed to record image information on the surfaces of respective photosensitive drums serving as image bearing members in parallel. The color image processing apparatus 33 includes exposure units 17, 18, 19, and 20, photosensitive drums 21, 22, 23, and 24, developing devices 25, 26, 27, and 28, a conveyance belt 34, and a fixing device 37. The exposure units 17, 18, 19, and 20 each include any one of the imaging optical systems described in the foregoing exemplary embodiments. The photosensitive drums 21, 22, 23, and 24 serve as the respective image bearing members. The exposure units 17, 18, 19, and 20 are arranged so that the sub array directions of their imaging optical systems coincide with a sub scanning direction (Z direction) that is the rotation direction of the photosensitive drums 21, 22, 23, and 24.

In FIG. 1B, an external device 35 such as a personal computer inputs red (R), green (G), and blue (B) color signals to the color image forming apparatus 33. The color image forming apparatus 33 includes a printer controller 36, which converts the color signals into cyan (C), magenta (M), yellow (Y), and black (K) image data (dot data). Such pieces of image data are input to the exposure units 17, 18, 19, and 20, respectively. The color exposure units 17, 18, 19, and 20 emit exposure light 29, 30, 31, and 32 that is modulated according to the respective pieces of image data. The photosensitive surfaces of the photosensitive drums 21, 22, 23, and 24 are successively exposed by the corresponding exposure light 29, 30, 31, and 32 in the sub scanning direction.

The developing devices 25, 26, 27, and 28 develop the latent images of the respective colors formed on the photosensitive surfaces of the photosensitive drums 21, 22, 23, and 24 into respective color toner images. Not-illustrated transfer devices transfer the color toner images to a transfer material in a superposed manner. The fixing device 37 then fixes the color toner images to form a full color image. The application of the imaging optical systems can reduce the size and cost of the entire color image forming apparatus 33 according to the present exemplary embodiment as compared to when optical scanning units are used.

[Image Reading Apparatus]

The imaging optical systems according to the foregoing exemplary embodiments may be used for an image reading apparatus. More specifically, an image reading apparatus may be configured to include any of the foregoing imaging optical systems and a plurality of light receiving units. Examples of the plurality of light receiving units include a line sensor such as a charge-coupled device (CCD) sensor and a complementary metal-oxide semiconductor (CMOS) sensor. The application of the imaging optical system can reduce the size and cost of the entire image reading apparatus according to the present exemplary embodiment as compared to when conventional optical systems are used.

In such a configuration, an illumination unit including a light source irradiates a document. A plurality of light fluxes (reflected light or transmitted light) from the document can be collected by the imaging optical system and received by the sensor surfaces of the plurality of light receiving units. If the sub array direction of the imaging optical system is arranged to coincide with a direction in which a driving unit moves a relative position of the document and the imaging optical system (sub scanning direction), the image reading apparatus can successively read the document in the sub scanning direction.

The image reading apparatus may be connected as the foregoing external device 35 to the color image forming apparatus 33, whereby a color digital copying machine can be configured.

[Method for Manufacturing Lens Array]

A method for manufacturing a lens array according to an exemplary embodiment will be described in detail below. The lens array refers to a configuration including an array of a plurality of first lenses G1 (second lenses G2) constituting an imaging optical system. For example, the lens array according to the first exemplary embodiment includes two lens rows arranged in the sub array direction, the lens rows each including a plurality of lenses arranged in the main array direction.

A method for manufacturing a lens array in which the minimum distance $\Delta Y$ between the optical axes of adjoining top and bottom lens rows is ½ the array pitch p as in the first exemplary embodiment will be described along the flow of FIG. 30 with reference to FIG. 29.

In step S1, blanks 200a' and 200b' are initially formed. The blanks 200a' and 200b' are intended to make mirror finished surface pieces 200a and 200b for molding top and bottom lens rows constituting the lens array.

In step S2, using a mirror finished surface piece machining jig 300 (a machining holding base 310 and abutting reference pins 311a and 311b), the blanks 200a' and 200b' are held in close contact with each other in positions shifted in the main array direction (Y direction) by the minimum distance $\Delta Y$ (½ the array pitch p) between the optical axes of the adjoining lens rows. In the present exemplary embodiment, the blank 200b' is held as shifted by the minimum distance $\Delta Y$ in the Y direction with respect to the blank 200a'. A plurality of mirror finished surfaces corresponding to the respective lens surfaces of the adjoining top and bottom lens rows is formed to make the mirror finished surface pieces 200a and 200b. Specifically, machining is simultaneously applied across the blanks 200a' and 200b' so that mirror finished surfaces 210a of the mirror finished surface piece 200a and mirror finished surfaces 210b of the mirror finished surface piece 200b form continuous curved surfaces (or curved surfaces that can be expressed by the same equation). As illustrated in FIG. 29, the abutting reference pins 311a and 311b are capable of independent adjustment in the Y direction. With the blanks 200a' and 200b' temporarily assembled, the relative position of the blanks 200a' and 200b' can be adjusted to within ±2 μm of the minimum distance $\Delta Y$ of the optical axis rows by using the abutting reference pins 311a and 311b.

Figure 31:
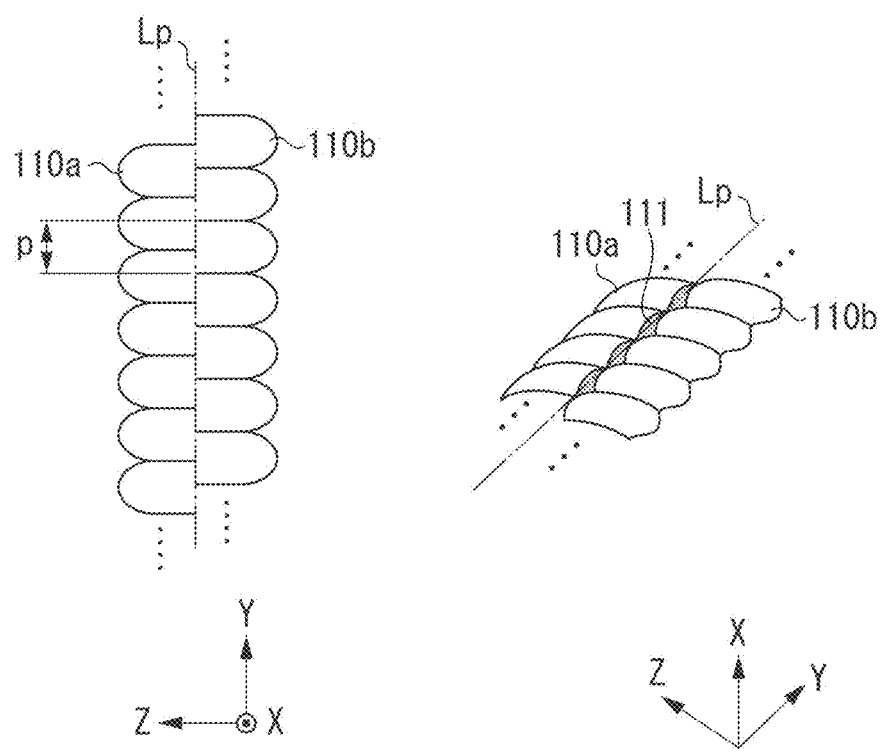
FIG. 31 is a front view and a perspective view of the lens array according to the present exemplary embodiment.

Conventionally, final shape processing for forming the mirror finished surfaces 210a and 210b has needed extremely complicated machining to form discontinuous lens surfaces 110a and 110b having steps 111 along an optical axis row Lp as illustrated in FIG. 31. In the present exemplary embodiment, the blanks 200a' and 200b' are shifted as described above and subjected to diamond cutting or precision grinding using a fine grind stone. The blanks 200a' and 200b' are thereby simultaneously machined to form the mirror finished surfaces 210a and 210b in order from an end in the Y direction. The mirror finished surfaces 210a and 210b having mutually continuous curved surfaces can thus be formed easily. In the process of machining the mirror finished surfaces 210a and 210b in order in the Y direction, the adjoining mirror finished surfaces can produce a machining error therebetween in the sub array direction (Z direction). Since such a machining error is extremely small, even an ordinary ultra-precision processing machine can guarantee a desired accuracy of the order of 0.1 μm or less.

In step S2, with the mirror finished surface pieces 200a and 200b held by the mirror finished surface piece machining jig 300, score lines L1 and L2 are also formed in the mirror finished surface pieces 200a and 200b in the Z direction by using the ultra-precision processing machine. The score lines L1 and L2 are spaced out by the same distance as the minimum distance $\Delta Y$ between the optical axes, and formed across the mirror pieces 200a and 200b.

In step S3, the mirror finished surface pieces 200a and 200b which have been held as shifted by the minimum distance $\Delta Y$ in the Y direction in step S2 are restored to their original positions and put in close contact with each other. The mirror finished surface pieces 200a and 200b in such a state are set into a mirror finished surface piece holding member 400 (a mirror finished surface piece holding base 410 and abutting reference pins 411a and 411b) serving as a die. Since the mirror finished surface pieces 200a and 200b can be attached to the mirror finished surface piece machining jig 300 and the mirror finished surface piece holding member 400 in similar ways, a high relative accuracy can be obtained between the mirror finished surfaces 210a and 210b.

Figure 29:
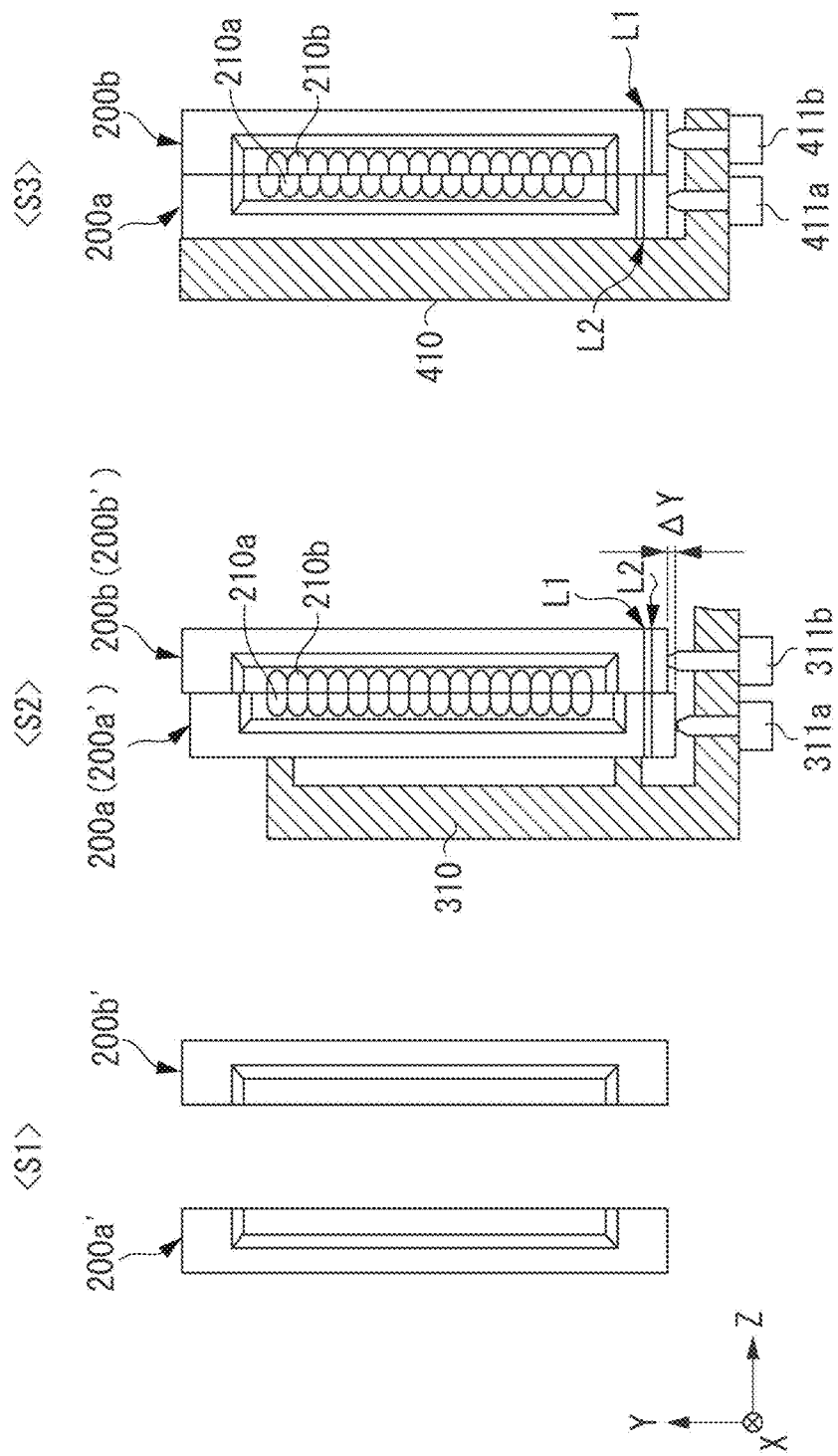
FIG. 29 is an explanatory diagram illustrating a method for manufacturing a lens array according to an exemplary embodiment.
Figure 30:
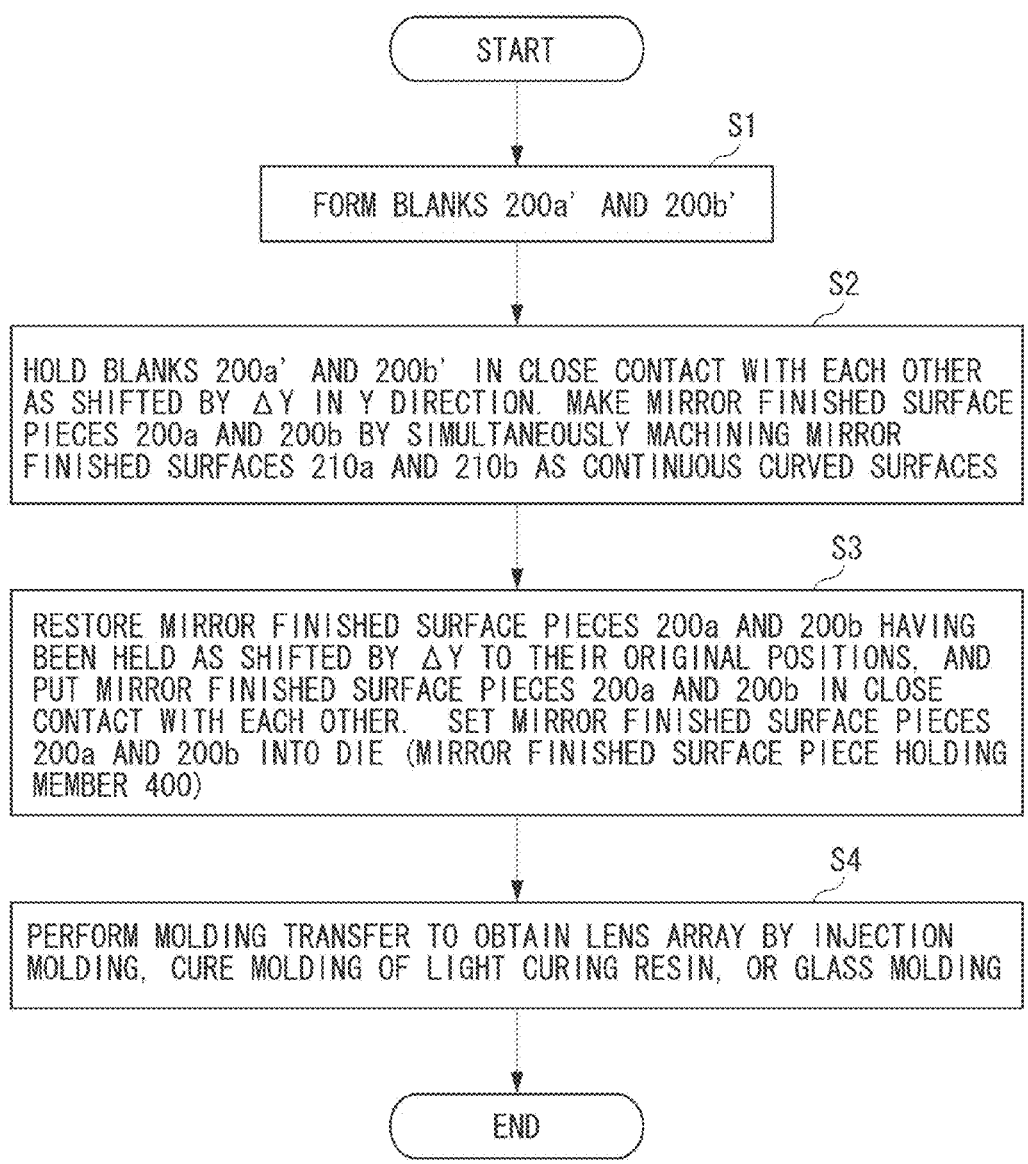
FIG. 30 is a flowchart of the method for manufacturing a lens array according to the present exemplary embodiment.

To adjust the relative position of the mirror finished surface pieces 200a and 200b in the Y direction with high accuracy, the abutting reference pins 411a and 411b such as illustrated in FIG. 29 can be used. Adjustments may be made with reference to the score lines L1 and L2 formed in step S2. In the present exemplary embodiment, the mirror finished surface pieces 200a and 200b may be positioned so that the score lines L1 and L2 (the score line L2 on the mirror finished surface piece 200a and the score line L1 on the mirror finished surface piece 200b) are aligned on a straight line. Adjustments can thus be made to shift the mirror finished surface pieces 200a and 200b by $\Delta Y$.

In step S4, with the mirror finished surface pieces 200a and 200b set and held in the mirror finished surface piece holding member 400, molding transfer is performed by injection molding, cure molding of a light curing resin, or glass molding. As a result, a lens array in which either one of lens rows adjoining with an optical axis row therebetween is shifted by $\Delta Y$ with respect to the other can be obtained.

Figure 32:
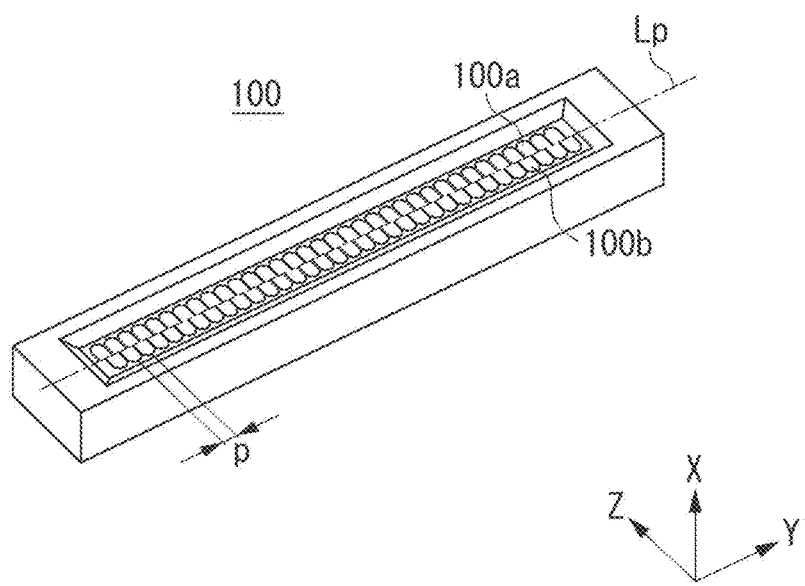
FIG. 32 is a perspective view of the lens array according to the present exemplary embodiment.

FIG. 32 illustrates an overview of a lens array 100 manufactured by the manufacturing method according to the present exemplary embodiment. In the lens array 100, the optical axes of the lenses are arranged on the same line in the sub array direction (Z direction) perpendicular to the main array direction (Y direction). The row of the optical axes of the lenses is referred to as an optical axis row Lp. The lens array 100 is configured so that the relative position between the lens surfaces 110a on one side of the optical axis row Lp and the lens surfaces 110b on the other side is shifted by ½ the array pitch p in the Y direction. The border between the mirror finished surface pieces 200a and 200b put in close contact with each other during the manufacturing of the lens array 100 corresponds to the optical axis row Lp.

The lens array 100 according to the present exemplary embodiment is a transparent plastic member having a length of 220 mm, a width of 10 mm, and a thickness of 5 mm. The lenses constituting the lens array 100 are uniformly arranged in the Y direction at array pitches of p=0.76 mm. The shift amount of the relative position between the lens surfaces 110a and 110b is $\Delta Y=(½)p=0.38$ mm. As illustrated in FIG. 31, the lens surfaces 110a and 110b are configured so that a plurality of anamorphic free curved surfaces having a curvature in the optical axis direction and differing in shape in the Y and Z directions is arranged to adjoin in the Y direction. The lens surfaces 110a and 110b are not limited to the illustrated shape, and may have a generally rectangular shape described above.

The steps of the foregoing flow will be described in more detail.

In the foregoing step S1, the blanks 200a' and 200b' intended to make the mirror finished surface pieces 200a and 200b are formed by machining a stainless steel (SUS) material with an ordinary processing machine. The surfaces of the blanks 200a' and 200b' are plated with 200 μm of NiP which is intended for diamond cutting. The surfaces of the blanks 200a' and 200b' except where final shape machining is to be performed are subjected to grinding, whereby the external dimensions of the blanks 200a' and 200b' are finished.

The mirror finished surface pieces 200a and 200b are supposed to be set in a die. The contact surfaces of the blanks 200a' and 200b' are finished by polishing so that the contact surfaces are in a mirror finished surface state with a surface roughness of RA=0.05 μm or less. The process of forming the blanks 200a' and 200b' may use steel materials other than the SUS material depending on the material and molding form of the lens array. Examples include copper and aluminum materials capable of direct diamond cutting, and super-hard materials and SiC intended for glass molding. The materials and the machining method of the blanks 200a' and 200b' are not limited to those of the present exemplary embodiment.

Figure 33A:
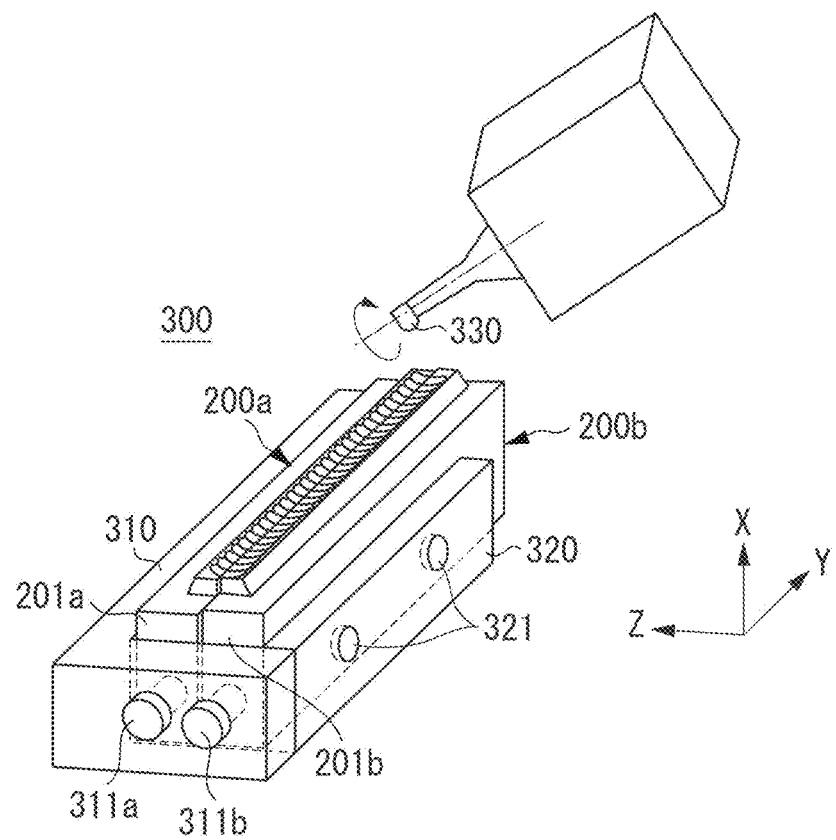
FIGS. 33A and 33B are explanatory diagrams illustrating the final shaping of mirror finished surfaces of mirror finished surface pieces according to the present exemplary embodiment.

FIG. 33A illustrates the mirror finished surface piece machining jig 300 used in the final shape machining of the metal surfaces 210a and 210b. The metal surface piece machining jig 300 includes the machining holding base 310, the two abutting reference pins 311a and 311b, and a machining fixing member 320. The machining holding base 310 has not-illustrated screw holes. The abutting reference pins 311a and 311b are $\Delta Y$ different in length. The machining fixing members 320 has screw holes 321.

In the foregoing step S2, the abutting reference pins 311a and 311b are attached to the machining holding base 310. The blanks 200a' and 200b' are then put into contact with the abutting reference pins 311a and 311b, respectively. The blanks 200a' and 200b' can thus be held in a relative position shifted by $\Delta Y$ in the Y direction. The blanks 200a' and 200b' may have through holes. In such a case, the mirror finished surface pieces 200a and 200b can be sandwiched between the machining holding base 310 and the machining fixing member 320 and fixed with screws.

In the present exemplary embodiment, a relative distance between an end face 201a of the blank 200a' on the abutting reference pin side and an end face 201b of the blank 200b' on the abutting reference pin side is measured by a probe type three-dimensional measuring instrument. Either of the abutting reference pins 311a and 311b is cut and adjusted to $\Delta Y$=0.38 mm with an error of 2 μm or less. With the relative position of the blanks 200a' and 200b' thus set and held with high accuracy, the mirror finished surface piece machining jig 300 is fixed to an ultra-precision processing machine for the final shape machining of the mirror finished surfaces 210a and 210b.

Figure 33B:
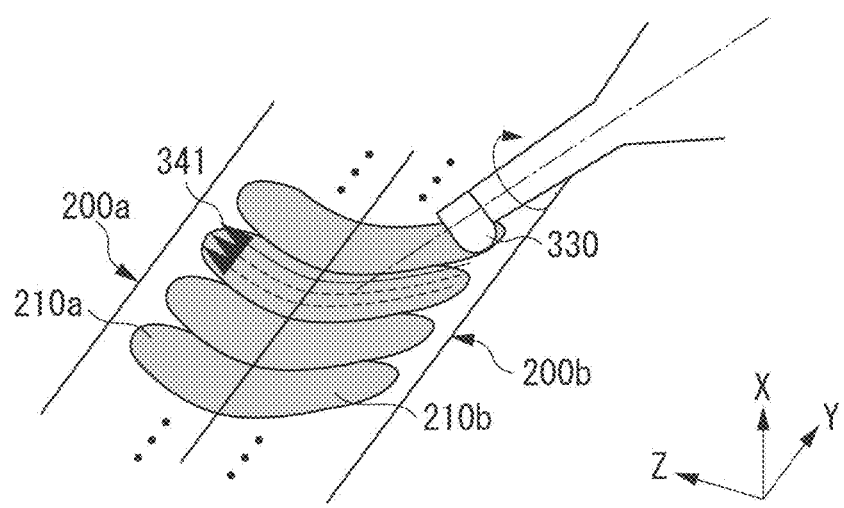

The final shape machining according to the present exemplary embodiment uses a cutting tool having a rotating spindle to which an R-shaped diamond tool 330 is attached via a shank. As illustrated in FIG. 33B, the diamond tool 330 is attached obliquely to the rotating axis of the rotating spindle. The diamond tool 330 is rotated to machine the mirror finished surfaces 210a and 210b one by one so that machining paths 341 extend across the blanks 200a' and 200b'. In such a manner, the mirror finished surfaces 210a and 210b both can be simultaneously machined as continuous surfaces. The direction of the machining paths 341 is not limited to the Z direction and may be the Y direction. The mirror finished surfaces 210a and 210b can be machined in order from one end to the other of the blanks 200a' and 200b' in the Y direction. This can provide a high relative position accuracy between the adjoining lens surfaces even if the machining takes a long time.

Figure 34:
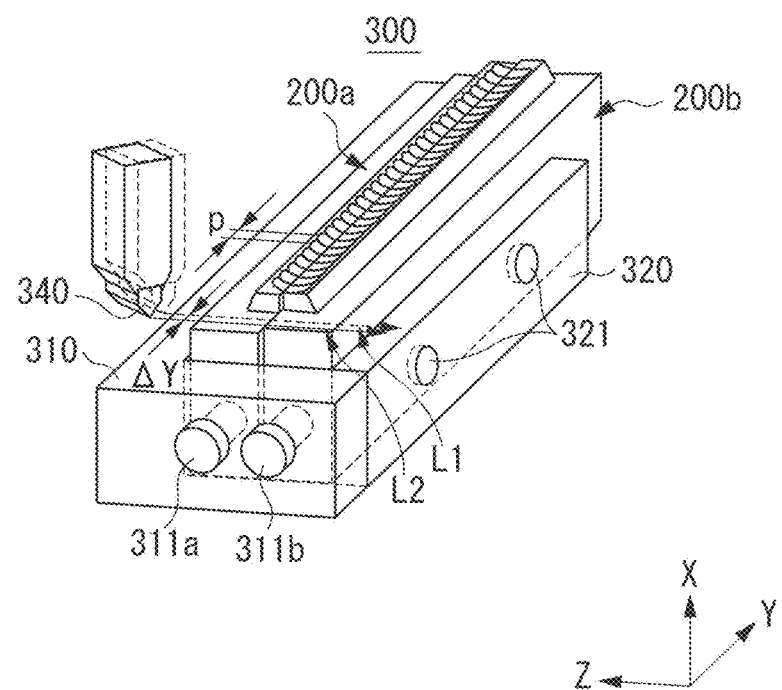
FIG. 34 is an explanatory diagram illustrating the machining of score lines in the mirror finished surface pieces according to the present exemplary embodiment.

After the completion of the mirror finished surface pieces 200a and 200b by the final shape machining of the mirror finished surfaces 210a and 210b, the mirror finished surface pieces 200a and 200b held by the mirror finished surface piece machining jig 300 are machined to form the two score lines L1 and L2 in the Z direction. The machining uses a diamond tool 340 having an inverse triangular face at the tip as illustrated in FIG. 34. The score lines L1 and L2 are formed across the mirror finished surface pieces 200a and 200b at a distance of $\Delta Y=(\frac{1}{2})p$ from each other according to numerical control (NC) commands of the processing machine.

Figure 35:
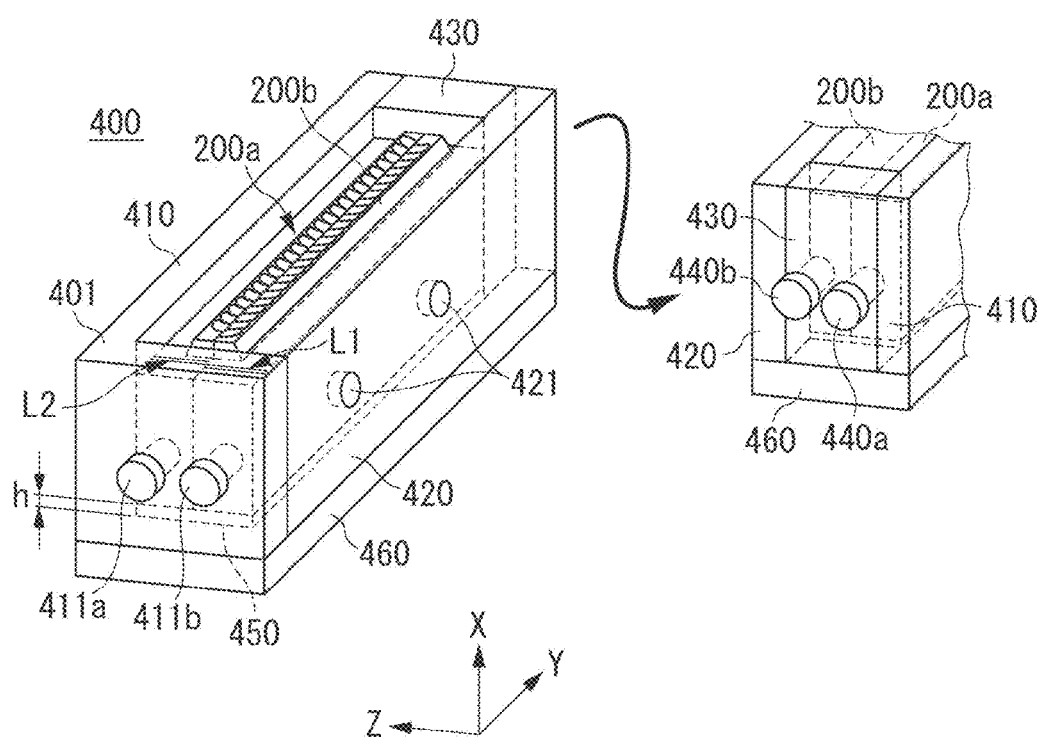
FIG. 35 is a perspective view of a mirror finished surface piece holding member according to the present exemplary embodiment.
Figure 36:
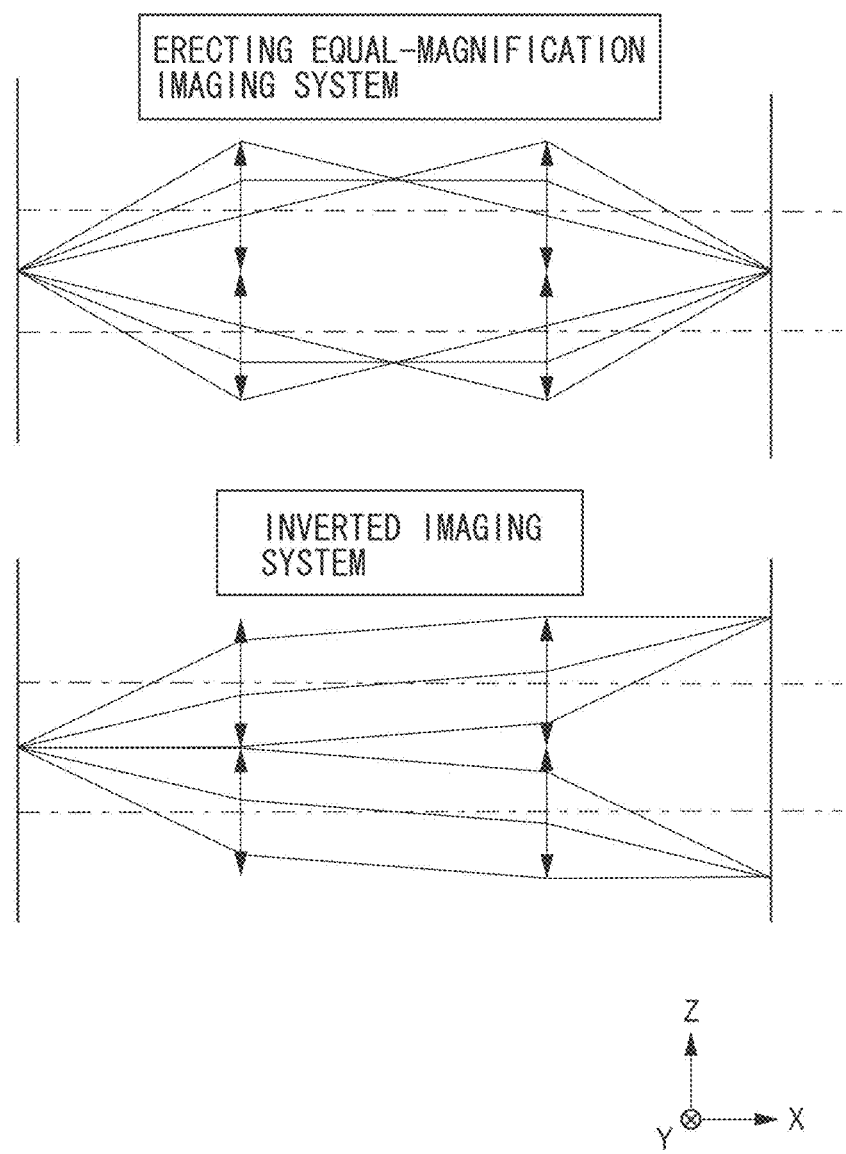
FIG. 36 is a conceptual diagram illustrating sub array cross sections of conventional lens arrays having a staggered arrangement.

In the foregoing step S3, the mirror finished surface pieces 200a and 200b after the completion of the final shape processing of the mirror finished surfaces 210a and 210b are restored to their original positions. The mirror finished surface pieces 200a and 200b are then set into the mirror finished surface piece holding member 400 such as illustrated in FIG. 35. The mirror finished surface piece holding member 400 according to the present exemplary embodiment includes the surface piece holding base 410, the two abutting reference pins 411a and 411b, a die pressing member 420, a mirror finished surface piece pressing member 430, a height adjustment member 450, and a die base 460. The mirror finished surface piece holding base 410 has an L shape and has not-illustrated screw holes. The abutting reference pins 411a and 411b have the same length. The die pressing member 420 has two screw holes 421. The mirror sauce piece pressing member 430 has two screw holes. The thickness of the height adjustment member 450 has been measured on the order of micrometers in advance.

In step S3, the mirror finished surface piece holding base 410 and the die pressing member 420 are initially attached to the die base 460. The height adjustment member 450 is placed on the die base 460 along the L shape of the mirror finished surface piece holding base 410. The mirror finished surface pieces 200a and 200b are arranged on the height adjustment member 450.

Next, the abutting reference pins 411a and 411b are attached to the mirror finished surface piece holding baser 410. The mirror finished surface pieces 200a and 200b are put into contact with the abutting reference pins 411a and 411b, respectively. In such a state, the mirror finished surface pieces 200a and 200b are sandwiched between the mirror finished surface piece holding base 410 and the die pressing member 420, and screws are passed through the screw holes and through holes to fix the mirror finished surface pieces 200a and 200b. At the same time, the mirror finished surface pieces 200a and 200b are fixed in firm contact with the abutting reference pins 411a and 411b. Specifically, screws 440a and 440b are inserted through the screw holes of the mirror finished surface piece pressing member 430. The screws 440a and 440b press and fix the mirror finished surface pieces 200a and 200b to the abutting reference pins 411a and 411b. The height adjustment member 450 also has through holes, into which screws are inserted from the side of the die base 460 to further fix the mirror finished surface pieces 200a and 200b.

In such a state, whether the score line L2 formed in the mirror finished surface piece 200a and the score line L1 formed in the mirror piece 200b are aligned on a straight line is observed under a microscope. If the mirror finished surface pieces 200a and 200b are made and assembled as specified by the design values, the two score lines L1 and L2 coincide exactly with each other on a straight line. To make a positional adjustment to shift the relative position of the mirror finished surface pieces 200a and 200b by ΔY, steps S2 and S3 need to use respective different abutting pins (the abutting reference pins 311a and 311b and the abutting reference pins 411a and 411b). This causes the problem of an error occurring in the positions of the two score lines L1 and L2 because of manufacturing errors of the abutting pins themselves and resulting slight differences in the assembled state. Then, according to the result of observation of the microscope, the components of the mirror finished surface piece holding member 400 are once disassembled to make adjustments to the abutting reference pins 411a and 411b and the height adjustment member 450.

For example, in the present exemplary embodiment, the result of observation of the microscope showed that the score line L1 of the mirror finished surface piece 200b was 2.5 μm farther from the abutting reference pin side than the score line L2 of the mirror finished surface piece 200a. A top surface 401 of the mirror finished surface piece holding member 410 corresponds to a parting surface which makes contact with the opposite side of the die base 460. A difference in height between the top surface 401 and the mirror finished surfaces 210a and 210b was measured by using an ultra-precision three-dimensional measuring instrument. The measurement showed that the lens surfaces were 15 μm higher than the designed height. In the present exemplary embodiment, the components of the mirror finished surface piece holding member 400 were once disassembled. The abutting reference pin 411b intended for the mirror finished surface piece 200b was cut short by 2.5 μm. The height adjustment member 450 was machined and reduced in thickness by 15 μm. After such adjustments, the mirror finished surface pieces 200a and 200b are set into the mirror finished surface piece holding member 400 again. In such a manner, the relative difference between the straight lines, namely, the score line L2 of the mirror finished surface piece 200a and the score line L1 of the mirror finished surface piece 200b can be suppressed to less than 0.5 μm. The difference in height between the top surface 401 of the mirror finished surface piece holding base 410 and the mirror finished surfaces 210a and 210b can be suppressed to less than 1 μm.

Mirror finished surface pieces for molding the lens surfaces on the back side of the lens array are formed in a manner similar to the series of steps described above. The resulting mirror finished surface pieces are combined with the mirror finished surface pieces 200a and 200b on the front side to make a die of the lens array. With the die attached to a molding machine, injection molding can be performed to obtain a lens array in which either one of the lens rows is shifted by ½ the array pitch p with respect to the other with the optical axis rows therebetween.

The manufacturing method according to an exemplary embodiment of the present invention is not limited to the method for manufacturing a lens array according to the first exemplary embodiment. More specifically, the present exemplary embodiment has dealt with the method for manufacturing a lens array including two lens rows like the first exemplary embodiment. An exemplary embodiment of the present invention is not limited thereto, and may be applied to a configuration including an array of three or more lens rows. In the present exemplary embodiment, the minimum distance ΔY between the optical axis rows is (½)p. However, a method for manufacturing a lens array according to an exemplary embodiment of the present invention may be applied to ΔY of any value. The lens array can be manufactured so that ΔY satisfies the foregoing expression (2).

As has been described above, according to the method for manufacturing a lens array according to the present exemplary embodiment, a lens array having a shifted arrangement (staggered arrangement) can be manufactured with high accuracy so that the minimum distance ΔY between the optical axes of adjoining lens rows has a desired value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-226900 filed Oct. 12, 2012, which is hereby incorporated by reference herein in its entirety.

The invention claimed is:

1. An imaging optical system comprising a plurality of lens optical system rows each including a plurality of lens optical systems arranged in a first direction,
   wherein the plurality of lens optical system rows is arranged in a second direction perpendicular to the first direction and to an optical axis direction,
   wherein each of the plurality of lens optical systems in each of the plurality of lens optical system rows is configured to form an erect equal-magnification image in a cross section perpendicular to the second direction and configured to form an inverted image in a cross section perpendicular to the first direction, and
   wherein, in a cross section perpendicular to the optical axis direction, optical axes of the respective plurality of lens optical systems in adjoining ones of the plurality of lens optical system rows are separated from one another in the first direction and are located on a same line.

2. The imaging optical system according to claim 1, wherein each of the plurality of lens optical systems in each of at least two of the plurality of lens optical system rows is arranged at regular array pitches p in the first direction and satisfies a condition given by:

$$p/(2n) \leq \Delta Y \leq 3p/(2n),$$

where k is the number of the plurality of lens optical system rows, ΔY is a minimum distance in the first direction between the optical axes of the respective plurality of lens optical systems in any two of the at least two lens optical system rows, n is a positive integer satisfying k≥n≥2, and the any two lens optical system rows have (n−1) combinations of arrangement.

3. The imaging optical system according to claim 1, wherein each of the plurality of lens optical systems in each of the plurality of lens optical systems rows includes an intermediate imaging plane between an object plane and an image plane, and
   wherein each of the plurality of lens optical systems in each of the plurality of lens optical system rows satisfies a condition given by:

$$|R/(2\beta p)| \leq 2,$$

where R is an effective diameter on the intermediate imaging plane, β is a paraxial imaging magnification on the intermediate imaging plane, and p is an array pitch in the first direction.

4. The imaging optical system according to claim 1, wherein each of the plurality of lens optical systems in each of the plurality of lens optical system rows includes a first optical system and a second optical system that are arranged on the same optical axis.

5. The imaging optical system according to claim 4, wherein the first and second optical systems have optically symmetrical structures about the intermediate imaging plane of the lens optical system.

6. The imaging optical system according to claim 4, wherein the first optical system consists of a single lens with both an entrance surface and an exit surface having positive refractive power in the vicinity of the optical axis, the refractive power of the exit surface in the vicinity of the optical axis being larger than that of the entrance surface in the vicinity of the optical axis within a cross section perpendicular to the second direction.

7. The imaging optical system according to claim 4, wherein the first optical system consists of a single lens with both an entrance surface and an exit surface convex in the vicinity of the optical axis, a radius of curvature of the exit surface in the vicinity of the optical axis being smaller than that of the entrance surface in the vicinity of the optical axis within a cross section perpendicular to the second direction.

8. The imaging optical system according to claim 4, wherein the second optical system consists of a single lens with both an entrance surface and an exit surface having positive refractive power in the vicinity of the optical axis, the refractive power of the entrance surface in the vicinity of the optical axis being larger than that of the exit surface in the vicinity of the optical axis within a cross section perpendicular to the second direction.

9. The imaging optical system according to claim 4, wherein the second optical system consists of a single lens with both an entrance surface and an exit surface convex in the vicinity of the optical axis, a radius of curvature of the entrance surface in the vicinity of the optical axis being smaller than that of the exit surface in the vicinity of the optical axis within a cross section perpendicular to the second direction.

10. The imaging optical system according to claim 4, wherein each of the plurality of lens optical systems in each of the plurality of lens optical system rows includes a light blocking member configured to block a light flux passed through the first optical system and incident on the second optical system of another lens optical system in the cross section perpendicular to the second direction.

11. The imaging optical system according to claim 10, wherein the light blocking member blocks only a light flux that does not contribute to imaging.

12. The imaging optical system according to claim 1, wherein each of the lens optical systems of each of the plurality of lens optical system rows restricts a light flux that contributes to imaging by each corresponding lens surface within a cross section perpendicular to the second direction.

13. The imaging optical system according to claim 1, wherein adjoining ones of the plurality of lens optical system rows are configured so that respective lens surfaces thereof can be expressed by the same equation if an amount of separation between the optical axes of the respective plurality of lens optical systems in the first direction is 0.

14. The imaging optical system according to claim 1, wherein each of the plurality of lens optical systems in each of the plurality of lens optical system rows includes a rectangular aperture plane.

15. The imaging optical system according to claim 1, wherein each of the plurality of lens optical systems in each of the plurality of lens optical system rows includes an anamorphic surface having power in the first and second directions.

16. The imaging optical system according to claim 1, wherein each of the plurality of lens optical systems in each of the plurality of lens optical system rows is arranged at the same regular array pitches in the first direction, and wherein adjoining ones of the plurality of lens optical system rows are configured so that a minimum distance between the optical axes of the respective plurality of optical systems in the first direction is ½ the array pitch.

17. An image forming apparatus comprising:
an imaging optical system including a plurality of lens optical system rows each including a plurality of lens optical systems arranged in a first direction,
wherein the plurality of lens optical system rows is arranged in a second direction perpendicular to the first direction and to an optical axis direction,
wherein each of the plurality of lens optical systems in each of the plurality of lens optical system rows is configured to form an erect equal-magnification image in a cross section perpendicular to the second direction and configured to form an inverted image in a cross section perpendicular to the first direction, and
wherein optical axes of the respective plurality of lens optical systems in adjoining ones of the plurality of lens optical system rows are separated from one another in the first direction and are located on a same line;
a light source including a plurality of light emitting units;
a developing device configured to develop an electrostatic latent image into a toner image, the imaging optical system forming the electrostatic latent image on a photosensitive surface of a photosensitive member by using a light flux emitted from the light source, the photosensitive surface being arranged on an image plane of the imaging optical system;
a transfer device configured to transfer the developed toner image to a transfer material; and
a fixing device configured to fix the transferred toner image to the transfer material,
wherein the imaging optical system is arranged so that a rotation direction of the photosensitive member is in the second direction.

18. The image forming apparatus according to claim 17, wherein the imaging optical system satisfies a condition given by:

$$\Delta < (1/2)H,$$

where $\Delta$ is a maximum amount of separation between the optical axes of the plurality of lens optical systems of the lens optical system rows in the second direction, and H is a size of a light emitting point of each of the plurality of light emitting units.

19. An image reading apparatus comprising:
an imaging optical system including a plurality of lens optical system rows each including a plurality of lens optical systems arranged in a first direction,
wherein the plurality of lens optical system rows is arranged in a section direction perpendicular to the first direction and to an optical axis direction,
wherein each of the plurality of lens optical systems in each of the plurality of lens optical system rows is configured to form an erect equal-magnification image in a cross section perpendicular to the second direction and configured to form an inverted image in a cross section perpendicular to the first direction, and
wherein optical axes of the respective plurality of lens optical systems in adjoining ones of the plurality of lens optical system rows are separated from one another in the first direction and are located on a same line;

an illumination unit configured to illuminate a document;

a plurality of light receiving units configured to receive a light flux from the document, collected by the imaging optical system; and a drive unit configured to move a relative position of the imaging optical system and the document in the second direction.

20. The image reading unit according to claim 19, wherein the imaging optical system satisfies a condition given by:

$$\Delta < (1/2)H,$$

where $\Delta$ is a maximum amount of separation between the optical axes of the plurality of lens optical systems of the lens optical system rows in the second direction, and H is a size of a light receiving surface of each of the plurality of light receiving units.

21. A method for manufacturing a lens array constituting an imaging optical system including a plurality of lens optical system rows each including a plurality of lens optical systems arranged in a first direction, the plurality of lens optical system rows being arranged in a second direction perpendicular to the first direction and to an optical axis direction, the method comprising:

forming a minor finished surface including a continuous curved surface across a plurality of blanks put in close contact with each other in the second direction, thereby forming a plurality of minor finished surfaces on the plurality of blanks in the first direction to form a plurality of mirror finished surface pieces;

setting the minor finished surface pieces into a die in such a state that the mirror finished surface pieces are shifted from each other in the first direction and put in close contact with each other; and transferring the minor finished surfaces of the plurality of mirror finished surface pieces by molding to obtain a lens array.

22. The method for manufacturing a lens array according to claim 21, wherein the forming includes forming two score lines in the second direction across the plurality of minor finished surface pieces in portions of the plurality of mirror finished surface pieces other than where the mirror finished surfaces are formed, and wherein the setting includes setting the minor finished surface pieces into the die in such a state that the minor finished surface pieces are shifted from each other in the first direction and put in close contact with each other in positions where the two score lines are aligned on a straight line.

23. The method for manufacturing a lens array according to claim 21, wherein a plurality of minor finished surfaces of each of at least two of the plurality of mirror finished surface pieces is formed at regular array pitches P in the first direction and satisfies a condition given by:

$$p/(2n) \leq \Delta Y \leq 3p/(2n),$$

where k is the number of minor finished surface pieces, $\Delta Y$ is an amount by which any two of the at least two mirror finished surface pieces are shifted from each other in the first direction in the setting, n is a positive integer satisfying $k \geq n \geq 2$, and the any two mirror finished surface pieces have (n−1) combinations of arrangement.

24. The method for manufacturing a lens array according to claim 21, wherein the forming includes forming the plurality of mirror finished surfaces on the plurality of blanks at the same regular array pitches in the first direction, and wherein in the setting, adjoining ones of the plurality of mirror finished surface pieces are shifted from each other in the first direction by ½ the array pitch and put in close contact with each other.

\* \* \* \* \*